US010728053B2

(12) United States Patent
Maseng et al.

(10) Patent No.: US 10,728,053 B2
(45) Date of Patent: Jul. 28, 2020

(54) SYSTEM AND METHOD FOR REMOTE MONITORING AND CONTROLLING OF BUILDING AUTOMATION DEVICES

(71) Applicant: ODIN Building Automation Systems, LLC, Nashua, NH (US)

(72) Inventors: Erik Maseng, Nashua, NH (US); Peter Ierardi, Nashua, NH (US)

(73) Assignee: ODIN Building Automation Systems, LLC, Nashua, NH (US)

( * ) Notice: Subject to any disclaimer, the term of this patent is extended or adjusted under 35 U.S.C. 154(b) by 0 days.

(21) Appl. No.: 15/927,009

(22) Filed: Mar. 20, 2018

(65) Prior Publication Data

US 2018/0278434 A1 Sep. 27, 2018

Related U.S. Application Data

(60) Provisional application No. 62/474,588, filed on Mar. 21, 2017.

(51) Int. Cl.
*H04L 12/28* (2006.01)

(52) U.S. Cl.
CPC ...... *H04L 12/2836* (2013.01); *H04L 12/2809* (2013.01); *H04L 12/2814* (2013.01); *H04L 12/2818* (2013.01)

(58) Field of Classification Search
CPC ............. H04L 12/2809; H04L 12/2814; H04L 12/2818; H04L 12/2836
USPC .............................................................. 700/9
See application file for complete search history.

(56) References Cited

U.S. PATENT DOCUMENTS

| | | | | |
|---|---|---|---|---|
| 6,438,534 | B1 * | 8/2002 | Sorgel | B21B 37/00 700/48 |
| 8,965,994 | B2 | 2/2015 | Matsen et al. | |
| 9,258,137 | B2 * | 2/2016 | Ajitomi | H04L 12/2832 |
| 2003/0154297 | A1 * | 8/2003 | Suzuki | H04L 29/06 709/229 |
| 2010/0004763 | A1 * | 1/2010 | Murakami | H04L 12/2809 700/83 |
| 2010/0279652 | A1 | 11/2010 | Sharp et al. | |
| 2012/0316658 | A1 | 12/2012 | Glew | |
| 2013/0218347 | A1 | 8/2013 | Jung et al. | |
| 2014/0304129 | A1 | 10/2014 | Colosso et al. | |
| 2015/0039752 | A1 | 2/2015 | Hague | |
| 2015/0148961 | A1 * | 5/2015 | Kim | H04L 12/2803 700/275 |

* cited by examiner

*Primary Examiner* — Chun Cao
(74) *Attorney, Agent, or Firm* — Loginov & Associates, PLLC; William A. Loginov

(57) ABSTRACT

A Building Automation Monitor and Control System (BAMCS) can discover building automation control devices operating on various communication protocols, and can enable a user to control multiple building automation control devices that use different communication protocols through a single user interface. A dealer can create a user site, discover building automation control devices, and sell a license to a user to be able to access a site control module over the internet.

21 Claims, 39 Drawing Sheets

Alarms

Site Name: Site 1

Show: 10 entries    Search: _____

| Name | Reference Objects | Device Name | Alarm Location | Events | Edit | Delete |
|---|---|---|---|---|---|---|
| AUTOCAL-STATE - Alarm | AUTOCAL-STATE | CEMPC-4 ( NetworkG/3 ) | Algorithmic (BAC App) | View Events | Edit | Delete |
| CLG-MAXFLOW - Alarm | CLG-MAXFLOW | CEMPC-4 ( NetworkG/3 ) | Algorithmic (BAC App) | View Events | Edit | Delete |

SYSTEM AND METHOD FOR REMOTE MONITORING AND CONTROLLING OF BUILDING AUTOMATION DEVICES

RELATED APPLICATION

This application claims the benefit of U.S. Provisional Application Ser. No. 62/474,588, filed Mar. 21, 2017, entitled SYSTEM AND METHOD FOR REMOTE MONITORING AND CONTROLLING OF BUILDING AUTOMATION DEVICES, the entire disclosure of which is herein incorporated by reference.

FIELD OF THE INVENTION

This invention relates to building automation systems and more particularly to systems and methods for accessing and communicating with building automation devices over a network such as the Internet.

BACKGROUND OF THE INVENTION

Building automation systems have become a standard in commercial buildings including educational institutions, government installations, skyscrapers, factories, warehouses and business offices. These spaces employ a myriad of environmental controls, alarms, video surveillance devices and other components that serve the needs of the space, its managers, and occupants. One common form of automated device is the heating, ventilation, and air conditioning (HVAC) control system, which can include a plurality of zoned thermostats, humidistats and the like as well as various valves, baffles, fans, air exchangers, etc. that are can be interconnected with control boards and panels. These various components can be turned on or off, and otherwise controlled through a building automation system.

Such devices have been adapted to one or more common control standards—for example, the well-known BACnet standard, which is promulgated by the American Society of Heating, Refrigerating and Air-Conditioning Engineers (ASHRAE). Other standards include the X10 standard developed by Pico Electronics for in-home use in 1975, and the NEST standard, provided by Nest labs and suited for in-home use with HVAC, smoke alarms, in-home video cameras with remote viewing, etc. using a common language. These communication standards can be transmitted over a variety of wired and wireless modalities, including TCP/IP, the standard Ethernet protocol. Despite the standardization of such communication standards, many device manufactures produce their own proprietary communication standards, and interfaces for handling communications with (e.g.) BACnet enabled devices. Thus, building systems that include mixed-manufacturer installations may not be able to take full advantage of the ubiquity of any standard, as that manufacturer's proprietary interface may only function with its own equipment. Likewise, many manufacturers only provide localized control (within a building or facility), which does not allow for effective remote monitoring/control using (e.g.) Internet capable devices. The vast majority of commercial building automation devices robust monitoring and control use one of many different communication standards.

SUMMARY OF THE INVENTION

Existing building automation user interfaces can be overwhelming and complex for a non-technical user. The present invention can simplify and organize the HVAC data information over a reliable and secure connection. Features can include, but are not limited to, alarming capabilities, auditing trails and simple trending. This invention overcomes disadvantages of the prior art by providing a system and method for remote access, monitoring and control of building automation devices from a plurality of sources/manufacturers using multiple communication standards, such as TCP/IP, BACnet, Nest, etc. The communication arrangement can be organized so that individual sites and/or buildings with multiple sites are serviced by a designated dealer, and the responsible building manager accesses control and monitoring via a novel Building Automation Monitor and Control System (BAMCS). Individual devices can be monitored and controlled in the appropriate communication protocols by local site servers while a back-end server manages communication and data storage across multiple local site servers, and the dealer and users can communicate with the back-end server which communicates with the local site server(s). Features will include organizing the data into definable groups recognized by the users, alarming capabilities, creating schedules, auditing trails and simple trending. A subscription service, or other appropriate revenue model, can be employed between dealers and building managers. The backend server can be operated (e.g.) by the system operator and dealers can compensate the system operator for providing the overall communication environment.

In an illustrative embodiment a system for accessing, monitoring, and controlling building automation components can include a site-based server with a network interface for communicating with a plurality of automation components arranged to communicate using at least one automation protocol, a user interface having interface elements that allow access monitoring and control of discrete ones of the automation components through a network, and a protocol translation module for translating the various automation protocols into a different language and from the different language to the various automation protocols. At least one of the automation protocols can include BACnet protocol. At least one of the automation protocols can include NEST API. At least one of the automation protocols can include Modbus RTU. At least one of the communication protocols can include LON. At least one of the automation protocols can include X10. The different language can be a user interface compatible data set. The different language can be a second automation protocol. The network can include a dealer having a subscription arrangement with the user. The network can include a back-end server that communicates with the dealer and maintains account information with respect to dealers and users. The system can include a discovery module that discovers the devices on the network. The system can include a database that stores information about the devices that the discovery module discovers on the network.

In an illustrative embodiment, a system for accessing, monitoring, and controlling building automation components can include a plurality of building automation devices, at least one site server in communication with the building automation devices, an interface server in communication with the site server, wherein the interface server has a website module, and the website module has a user communication module that allows a user to monitor and control the plurality of building automation devices. The system can include a dealer communication module that allows a dealer to create a user site and sell the user license. The dealer communication module can allow a dealer to configure a user site and discover the building automation devices at the user site. The system can include a service provider communication module that allows a service provider to create a dealer license and a user license.

In an illustrative embodiment, a method for discovering and controlling building automation devices can include sending out commands to a network having building automation devices, gathering the responses from the building automation devices, assembling the responses from the building automation devices, presenting information about the assembled responses from the devices to a user, receiving instructions from the user to control the building automation devices, translating the instructions from the user into the communication protocols of the building devices, sending the instructions to the building automation devices in the communication protocol of the building automation devices. Assembling the responses from the devices can include assembling the responses from the devices according to installation configurations of the building automation devices. Translating the instructions from the user into the communication protocols of the building automation devices can include translating a first instruction into a first communication protocol of a first building automation device, and translating a second instruction into a second communication protocol of a second building automation device.

BRIEF DESCRIPTION OF THE DRAWINGS

The invention description below refers to the accompanying drawings, of which.

DETAILED DESCRIPTION

I. System Overview

Figure 1:
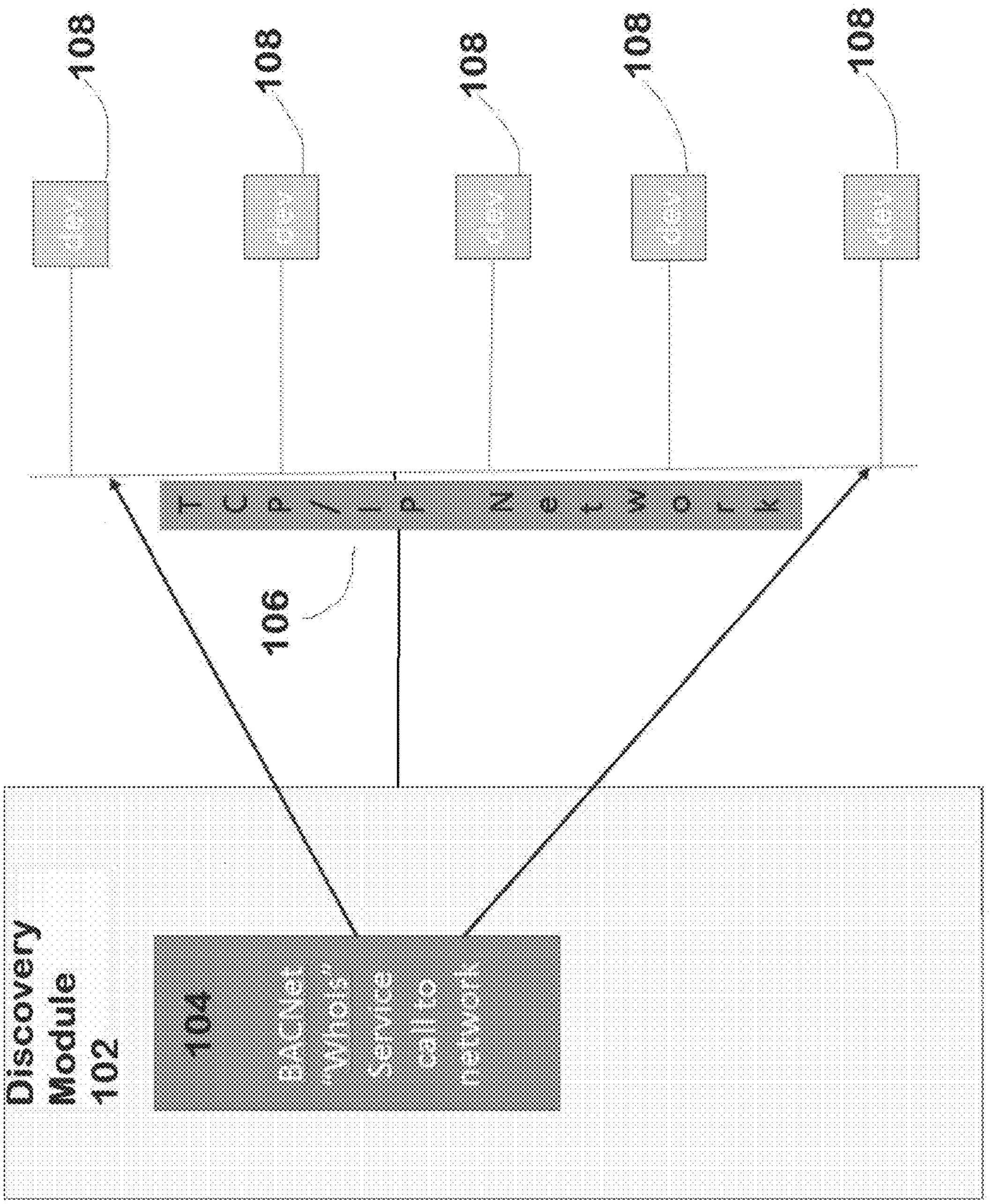
FIG. 1 is a schematic diagram of an embodiment of a building automation monitor and control system requesting information about building automation devices, according to an embodiment.

The present invention is a Building Automation Monitor and Control System (BAMCS) for Building Automation and Control Networks (BACnet) and other building automation systems. The BAMCS can coordinate a number of building automation systems that may use a variety of different communication protocols into a single system that a user can manage through a website application. This invention can enable the user to manage each of the building automation systems at a building site with a single website application from anyplace with an internet connection. By way of non-limiting example, BAMCS can communicate with BACnet (HVAC network protocol) devices, however, in addition to the exemplary BACnet protocol, BAMCS can also discover, control, monitor, and otherwise communicate with devices that use a variety of communication protocols, including NEST, X-10, and other protocols. Thus, as used herein, the terms BAC or BACnet should be taken to include reference to other automation control arrangements and protocols in a manner clear to those of skill. Controlling various devices can include turning lights on or off, adjusting thermostat settings, turning environmental control systems on or off, and other types of control that will be clear to those of skill. Controlling various devices can change the temperature or other environmental conditions within a building.

In an exemplary embodiment, a building site can have a site server with a site control module that can include a BACnet stack function that provides for BACnet data gathering on the Local Area Network (LAN) being monitored and/or controlled. The server can be a general purpose computing device (e.g. a desktop PC, laptop, net-top, etc.) or a customized device (for example, an FPGA). The site control module, can send and receive information to and from BACnet devices at the site. The site control module can also communicate with an interface module that can be part of a BAMCS application service, which can be installed on a cloud server or a LAN (on premises) computer or server that can be located at the building site. The interface module can communicate remotely with the site control module over the internet or using the local LAN.

Each building site to be monitored and controlled can have a site control module that communicates with the BAC devices at that site. A building can be divided into multiple sites, for example, each tenant or floor can be a separate site, and multiple sites can coexist on the same LAN. Each site can have a site control module. The interface module can communicate with each site control module in a building, and can also communicate with site control modules in separate, unrelated buildings, and with site control modules in any place with internet access.

The interface module can be cloud based or installed on a computer or server on the LAN being monitored and controlled. The interface module can connect to multiple local site control modules and provide real-time connectivity to site data. The interface module can also connect to and support computer, tablet, and smartphone browsers that provide user interface. This user interface can enable the user to monitor and/or control the BACnet devices at the building site through the user interface. The interface module can also provide licensing functions, installation functions, dealer configuration functions, email notification functions, database and security functions.

A building manager or other user can choose to have a local interface module installed on a local intranet or can choose to connect to a remote interface module in a remote place such as a cloud or a remote server. A user with a single site may choose to connect the site control module to a remote interface module that can operated by the BAMCS service provider or another party. A user with multiple sites within a single building can choose to connect each site control module to a remote interface module at a remote place, or the user can chose to have a local interface module on an intranet in the user's building, and can connect each site control module to the local interface module within the user's building. A BAMCS service provider can provide a license for a site control module to be connected to a remote interface module operated by the BAMCS service provider. A BAMCS service provider can provide a license for a local interface module to operate on a local intranet, and can provide licenses for local site control modules that will be connected to the local interface module.

II. Device Discovery

The present invention can discover devices at a site. In an embodiment, a BAMCS can acquire information about available BACnet devices on a BACnet network so that those devices can be monitored and controlled. It should be clear that the present invention is not limited to the BACnet protocol, but can also acquire information about NEST API devices, X10 devices, and/or devices using other communication protocols. Each BACnet certified device can support a basic level of Application Programmatic Interface (API) functionality that allows this type of functionality to work. These devices do not broadcast their existence on a network by default and therefore must be "discovered." The present invention can reach out and discover the existence of these BACnet devices by using a series of API function calls done in a repetitive fashion and with a data hierarchy and organization in place.

The process can begin with a network IP address range, based on network settings through a control application. This IP address range can contain BACnet devices connected to the network by a certain TCP/IP port. By way of non-limiting example, the BACnet Port range can typically be 47808-47823. The range of addresses can be determined by the network interface, which can be either Wi-Fi or direct connection.

Each user site can have a user site server with a site control module that can be in communication with the BACnet devices at the site. The site control module can be in communication with the BACnet devices using a TCP/IP-based network or LAN. FIG. 1 is a schematic diagram of the site control module of the BAMCS requesting information about building automation devices. The user site control module can have a discovery module 102. The discovery module 102 can recursively call BACnet's Whois API call that can broadcast a Whois message 104 over the TCP/IP network 106 to the IP address range on the specified port. BACnet compatible devices 108 on the TCP/IP network can receive the Whois message 104.

Figure 2:
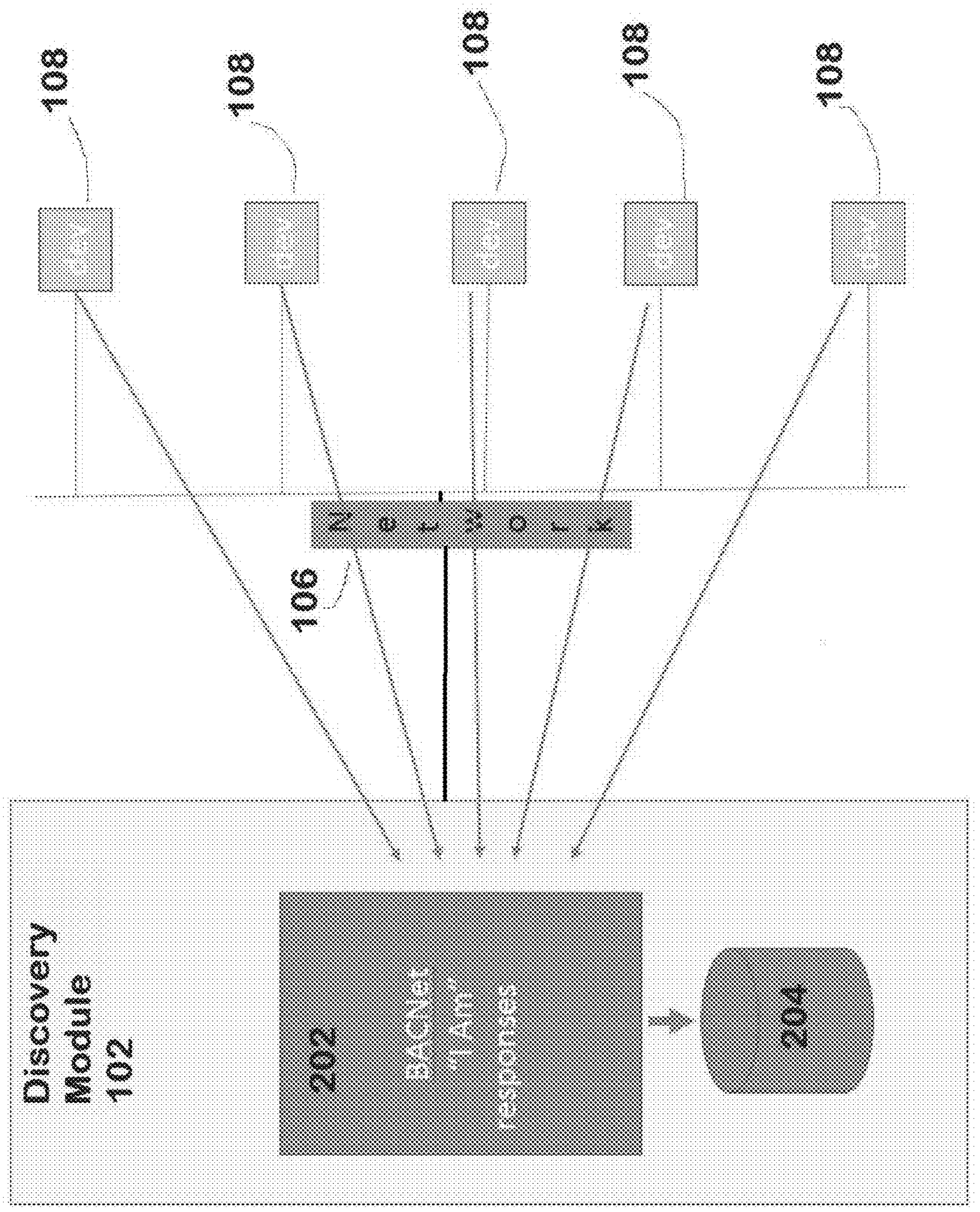
FIG. 2 is a schematic diagram of the building automation monitor and control system of FIG. 1 acquiring information about the building automation devices, according to an embodiment.

FIG. 2 is a schematic diagram of the BAMCS acquiring information about the building automation devices. BACnet compatible devices 108 will respond to the Whois call 104 with an I-Am response 202 over the network 106. The discovery module 102 can receive the I-Am responses 202 through network 106 from the BACnet compatible devices 108. The discovery module 102 can collect the device information as each I-Am response 202 comes in, and can cache and save the device collection information in database 204. This information can be assembled by the BAMCS according to dealers, sites, network addresses, and/or other criteria. The BAMCS functionality can allow this information to be visualized and organized. Without the functionality of the BAMCS, this data would be unorganized and unintelligible to the user.

Figure 3A:
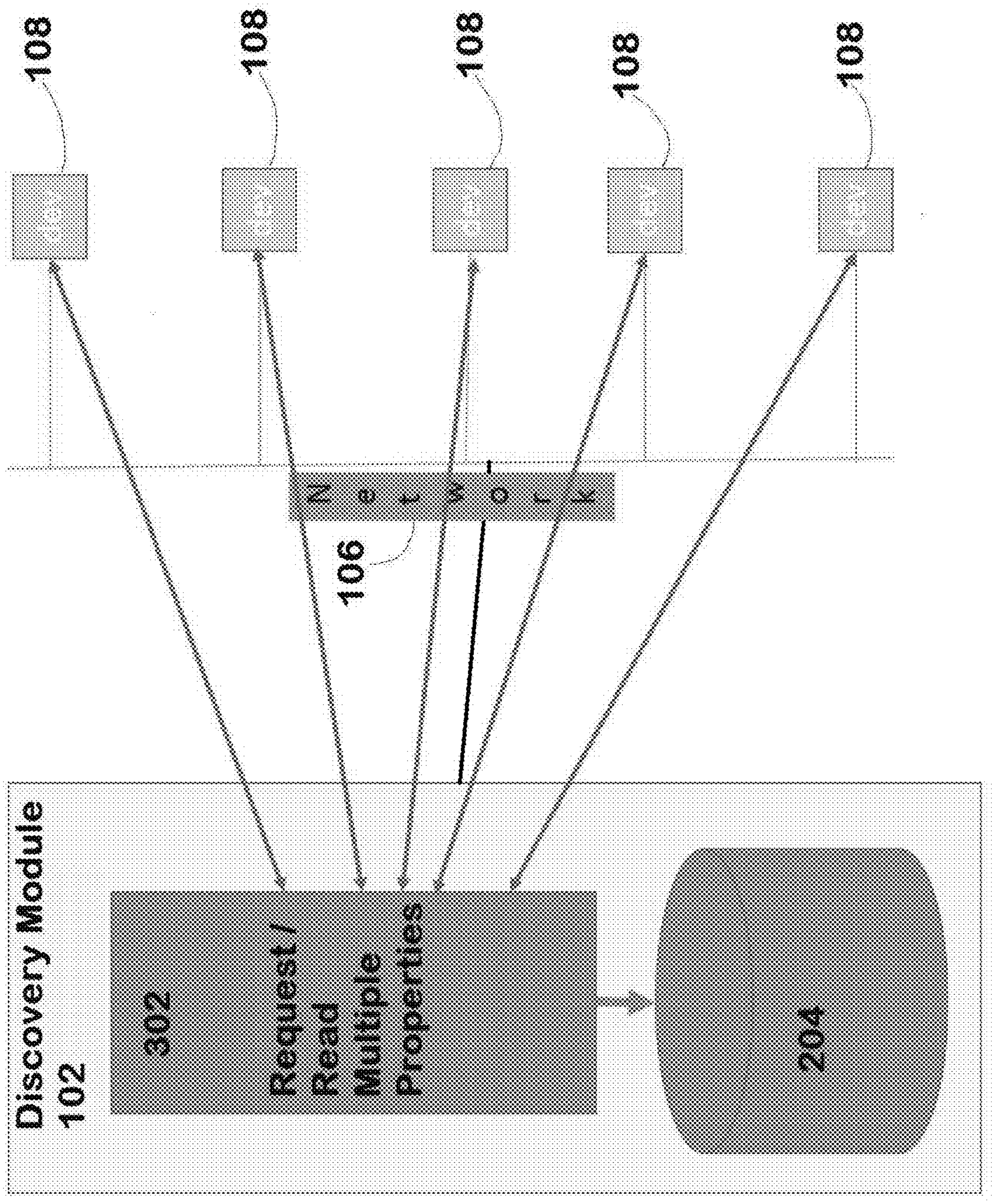
FIG. 3*a* is a schematic diagram of the building automation monitor and control system of FIG. 1 requesting and acquiring additional information about building automation devices, according to an embodiment.

FIG. 3*a* is a schematic diagram of the BAMCS requesting and acquiring additional information about building automation devices. The Discovery module 102 can issue a series of property and service calls over network 106 to BACnet compatible devices 108 to determine the level of property and service support available for each device 108. This information can be stored by the discovery module 102 in database 204. For each device that is discovered by discovery module 102, the control system can understand the device properties that can be read through either a BACnet Request for Parameter Multiple (RPM) or Request for Parameter (RP) request. The device properties can include, for example, "ObjectName," "ProtocolObjectTypesSupported," and/or "Protocol ServicesSupported." These properties can allow for functionality for a device to be enabled through the BAMCS. For example, if the Protocol ServicesSupported returns a value that indicates that Schedules are allowed, then the BAMCS can allow the user to discover, create and manage schedules on or for that device. Other BAMCS functionalities such as Trend Logs and Alarms can be dependent upon the discovery process determining the level of functional support of the device.

If RPM is rejected by the device the system can issue repetitive RP requests that can be based on all standard properties and services. The system can then save the BACnet devices and their objects, properties and services supported to the database 204 for management, manipulation and reference. This discovery feature of the system can be accomplished by using BACnet supported functions in conjunction with the BAMCS discovery module 102. There can be thousands of devices installed on a single building network, and the discovery module 102 can send out commands to the network and gather the responses in a uniform manner, and can assemble the data hierarchically according to the devices' installation configuration. The site control module can then present this assembled data to the site user so that it can be easy to understand and manage.

Figure 3B:
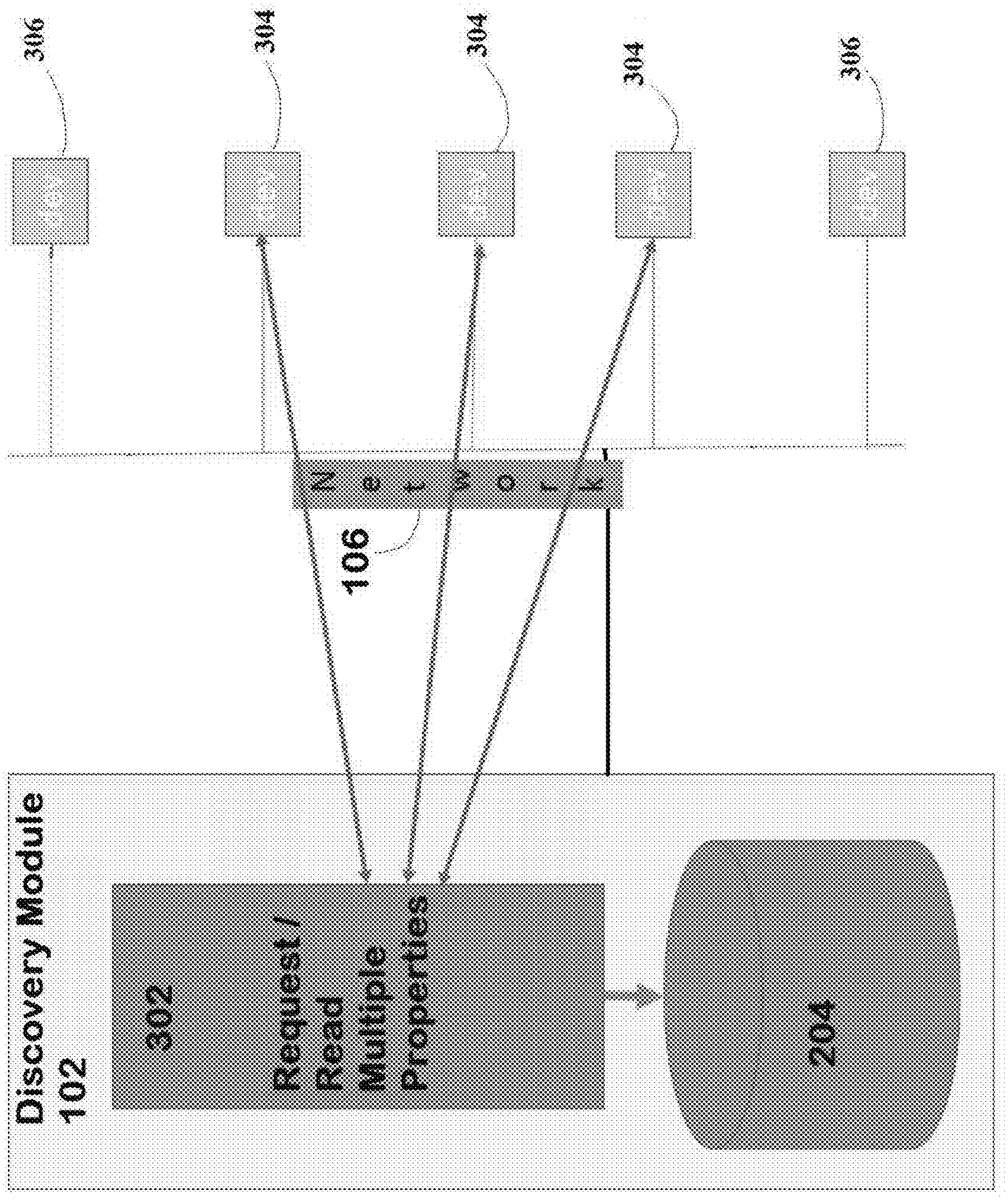
FIG. 3*b* is a schematic diagram of the building automation monitor and control system of FIG. 1 requesting and acquiring additional information about less than all of the building automation devices, according to an embodiment.

FIG. 3*b* is a schematic diagram of the building automation monitor and control system of FIG. 1 requesting and acquiring additional information about less than all of the building automation devices, according to an embodiment. Optionally, the discovery mechanism can perform partial discovery that can be focused on small groups of devices, instead of the entire network. A user can select selected devices 304 to be discovered, while unselected devices 306 can be ignored by the BAMCS. Selected devices 304 can be selected individually, or as a group based on various criteria. Partial discovery can allow for discrete selection of devices to discover objects from instead of the entire network. This can allow the user to more narrowly focus management of the device network data. This can be especially useful when the number of devices on the network is very large.

The discovered device data can be stored in two places. The discovered device data can be stored locally at the building site, where it can be stored in a database on the site server. The discovered device data can also be stored in a database that can be associated with an interface module of a BAMCS, and can be located on a local intranet or remote cloud or server. This data management and placement can allow the site control module and the controlled devices the ability to run functionality regardless of whether or not the site control module is connected to an interface module or other components of an application server at any given time. This can ensure continuous operation of the site control module and the controlled devices, and continuous operation of device management functions, such as schedules, trend logs, and or alarms. If the site control module becomes disconnected from a BAMCS server, the site control module can switch to its local datastore of device information and can continue to run normal functionality.

III. Site Control Module

Figure 4A:
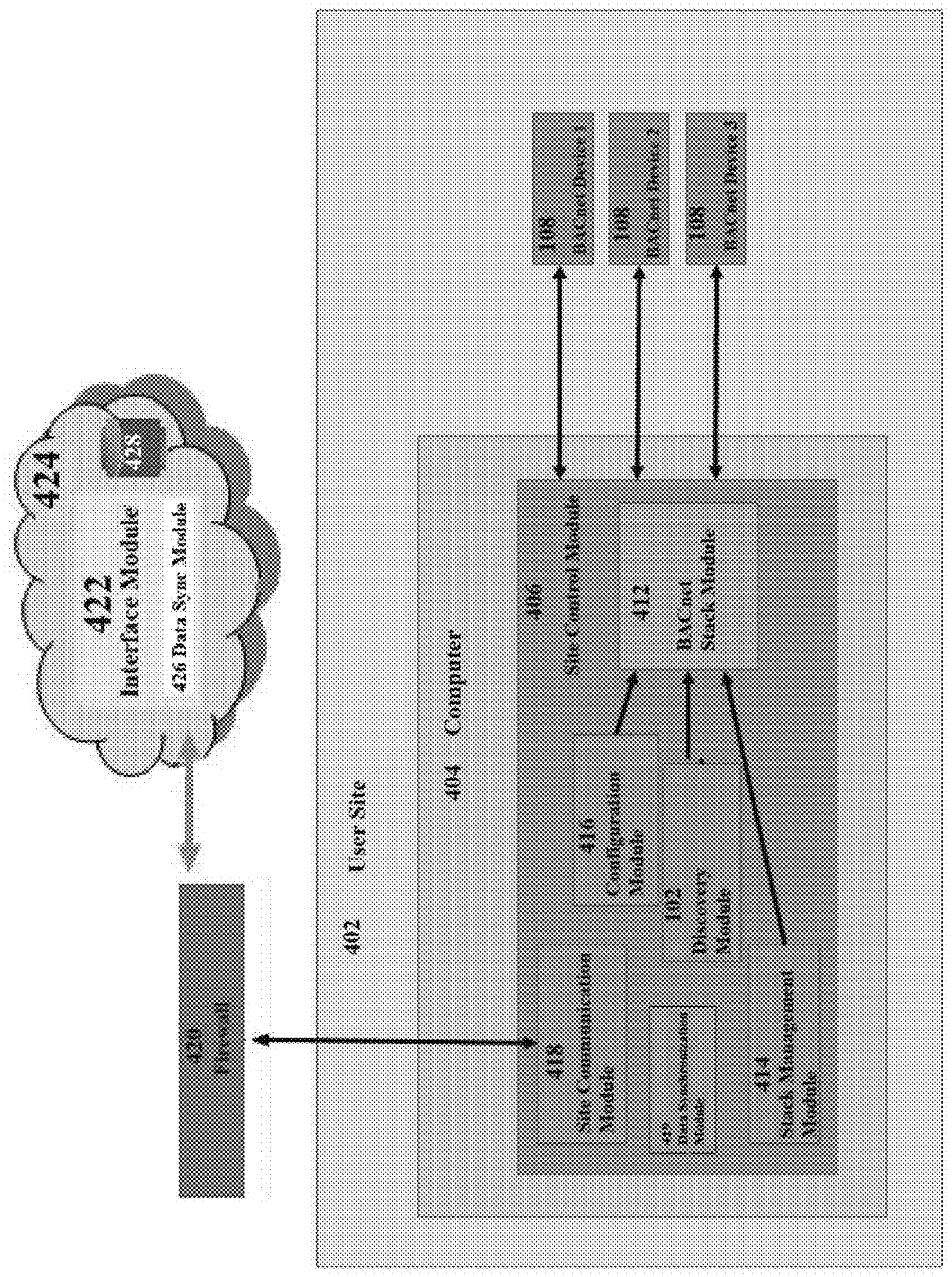
FIG. 4*a* is a schematic diagram showing an overview of an exemplary building site control module, according to an embodiment.

FIG. 4*a* is a schematic diagram showing an overview of an exemplary building site control module. The site control module can provide network monitoring and control of building automation systems. In an exemplary embodiment, building site 402 can have a local server or other local computer 404 connected to the LAN of the building site. Computer 404 can have a Site Control Module 406. The Site Control Module 406 can be in communication with one or more BACnet devices 108 over the LAN using BACnet TCP/IP and/or MS/TP. The Site Control Module 406 can include Discovery Module 102, BACnet Stack Module 412, Stack Management Module 414, Configuration Module 416, Site Communication Module 418, and Site Data Synchronization Module 419. As explained above, Discovery Module 102 can discover BACnet devices 108. By way of non-limiting example, the BACnet Stack Module 412 can be the BACnet stack from SoftDEL Systems Pvt. Ltd. The BACnet Stack Module 412 can communicate with the BACnet protocol. The BACnet Stack Module 412 can facilitate the communication of the BACnet data over IP in a request/send format using a web socket technique on a secure SSL connection to the cloud or to an internet-based interface module 422. This BACnet stack module 412 can be transferable and independent from special hardware requirements. The BACnet stack module 412 can be a component of the complete BAMCS that can also be used to develop other IP network protocol interfaces including LON and Modbus used in the HVAC industry. The Site Control Module 406 with the Stack Management Module 414 can host and run the BACnet Stack Module 412. Each building site can be configured by an authorized dealer using the Site Configuration Module 416, also known as manage sites. A site can be a building or a section of a building, depending on the size and business needs for managing a building. The Site Configuration Module 416 can capture settings that instructs the Site Communication Module 418 on how and where to look for BACnet devices on the building LAN. There are multiple parameters needed for the functionality to work based on the protocol standards, and the Site Configuration Module 416 can be flexible to allow connectivity into different networks and configurations. The Site Configuration Module 416 manages parameters that control segmentation and discovery of the BACnet devices for each Site Communication Module 418, such as unique port numbers and network interfaces, etc. The Site Communication Module 418 can communicate securely through a firewall 420 with the Interface Module 422 that can be based in a cloud 424. Multiple Site Communication Modules 418 can be used for a single geographic place, such as a building or campus. By way of non-limiting example, the Interface Module 422 can be run and installed in Windows Server OS in the cloud 424 and/or in a remote server, and can use a .Net Framework and a relational database. The building automation systems can be monitored remotely over the interne by the Interface Module 422. Interface Module 422 can have an Interface Data Synchronization Module 426 and an Interface Database 428, and Site Control Module 406 can have a Site Data Synchronization Module 419 and Site Database 204. The Data Synchronization Modules 419 and 426 can work together to synchronize the data being managed in the Interface Module Database 428 with the information being managed in the Site Database 204 of the Site Control Module 406.

Figure 4B:
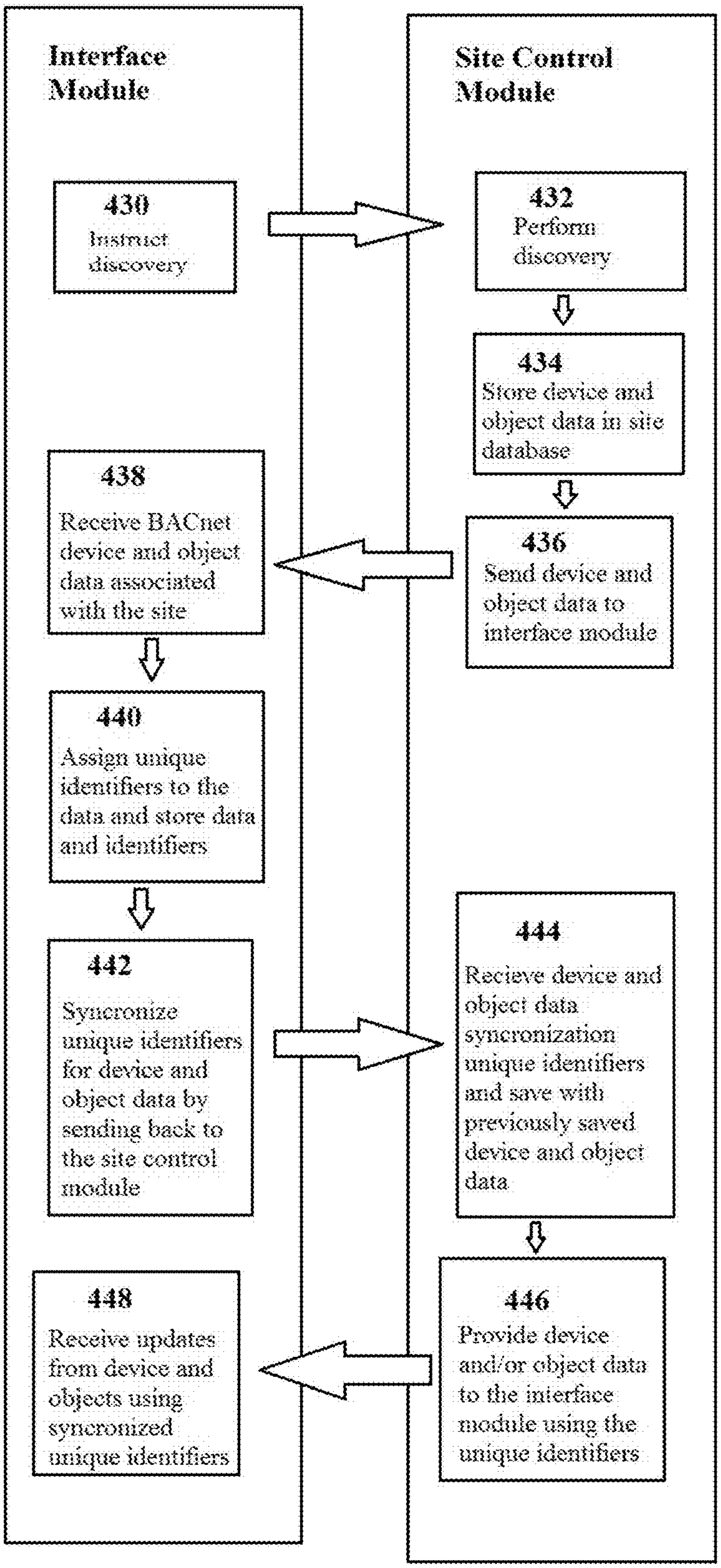
FIG. 4*b* is a schematic diagram of device and data object information being synchronized, according to an embodiment.

FIG. 4*b* is a schematic diagram of device and data object information being synchronized, according to an embodiment. BACnet devices and data objects can be identified by their network identifier and instance number. The data synchronization modules identify and track BACnet devices and objects uniquely, so that an integrated interface module in the cloud can run and keep track of the BACnet devices and objects in a globally unique way. At 430, an interface module 422 instructs a site control module 406 to discover BACnet devices and objects. At 432 the site control module discovers BACnet devices and objects. At 434, the site control module stores the BACnet device data and object data in the site database 204. At 436 the site control module sends the device data and object data to the interface module. At 438, the interface module receives the BACnet device data and object data associated with the site. At 440, the interface data synchronization module 426 of the interface module 422 can assign unique identifiers to the device data and object data, and can store the device data, object data, and unique identifiers in an interface module database 428 that can be a cloud-based database. At 442, the interface data synchronization module 426 synchronizes the unique identifiers for the BACnet device data and object data by sending the data and unique identifiers back to the site control module. At 444, the site data synchronization module 419 of the site control module 406 receives the device data, object data, and unique identifiers, and saves the unique identifiers along with the previously saved device data and object data in the site database 204. At 446, the unique identifiers are used to identify and provide data from the devices and/or objects, such as object present value updates, trend data, schedule execution, and alarm notifications (explained more fully below), to the interface module. At 448, the interface module receives updates from the devices and objects using the synchronized unique identifiers so that there is a direct 1:1 correlation. The two data synchronization modules 419 and 426 can work together to synchronize the data in the two databases 204 and 428 and maintain functionality for the devices.

Turning back to FIG. 4*a*, various devices 108 on a network may have different levels of functionality. For example, some devices may have the ability to create and run trend logs, schedules, and/or alarms for any object within the device. Other devices may not have the ability to create and run trend logs, schedules, and/or alarms for any object within that device. The BAMCS can have the ability to create and run trend logs, schedules, and/or monitor for alarms, even for building automation devices that do not have the ability to do so themselves. The BAMCS can create these device objects internally and can mange them on behalf of the devices. The site control module, and/or other parts of the BAMCS, can store, monitor, and manage various device objects that otherwise would not be able to exist for a device that does not support that functionality within the device. Previously, functionality such as trend logs, schedules, or alarm monitoring was limited to devices that support this functionality, while devices that do not support this functionality were left out of trend logs, schedules, and/or alarm monitoring. The BAMCS can allow for this functionality such trend logs, schedules, and/or alarms for various devices that do not support this functionality. Various functionalities, such as schedules, trends, and/or alarms, can be run within devices themselves and/or can be run and managed by a site control module of a BAMCS. The functionalities can run at a "location" that can be either a device itself (if supported by the device) or a site control module. A location can be defined as the place where a functionality is managed and run, and a location can be a device or a site.

A site user can have the ability to set up schedules that can run to modify and update device settings according to, for example, monthly, weekly, daily, and/or timely intervals. These schedules can be maintained by the BAMCS application service, for example, with database 428 in cloud 424, and can also be sent to the site controller module 406 to be run. If the site control module 406 is disconnected from the local or remote BAMCS application service, the site control module can automatically continue to run the schedules accordingly, and can maintain all schedule data within the site database 204. After the connection is restored between the site control module and the remote or local BAMCS application service, the site controller can synchronize the schedule data with the BAMCS application service to keep the interface database 428 of the local or remote BAMCS application service up to date. Schedules may be either intrinsic or extrinsic in nature. Intrinsic schedules can be managed and run at the device if the device allows that functionality. Extrinsic schedules can be managed and run at the site control module 406. If the device does not allow intrinsic schedules, then extrinsic schedules can be created and saved at the site control module and can be managed and run by the site control module. The place where the schedule is managed and run is the location of that schedule.

Similarly, the user may also configure and run trend logs intrinsically or extrinsically. Trend logs can track values over time for devices and their points (objects). If a device allows an intrinsic trend log to be created, a trend log can be sent to the device by the site control module, and the trend log can be run and managed at the device. A trend log can be managed extrinsically at the site control module 406 and/or intrinsically at the device 108. The place where the trend log is managed is the location of that trend log, and can be the site control module and/or the device. The trend logs can also be saved in a BAMCS application service database 428, where they can be retrieved later so that they can be viewed as charts, printed as charts, exported as spreadsheet data, and/or other uses. The site control module 406 can continue to run the trend logs if the site control module gets disconnected from the interface module of the BAMCS application service, and the site control module can synchronize the trend data with the database 428 of the BAMCS application service after the connection is restored.

Alarms can run on intrinsically on devices, if supported, and/or alarms can run extrinsically on the BAMCS. If a user wishes to configure an alarm for a device that does not support the alarm intrinsically, the BAMCS can allow for the creation of the alarm extrinsically, and can manage the alarm on behalf of the device. The place where the alarm runs is the location of that alarm, and can be the site control module and/or the device. The configuration parameters of an extrinsic alarm can be the same as the configuration parameters of an intrinsic alarm. If the site control module 406 is disconnected from the local or remote BAMCS application service, the site control module can continue to monitor the devices for alarm conditions, and the site control module can report the alarm conditions to the BAMCS application service when the connectivity is restored.

In an embodiment, multiple sites can coexist in the same building and can coexist on the same LAN. After discovery, individual site control modules can be assigned to monitor and control a specific list of discovered BACnet devices. The BAMCS can also provide multiple protocol interfaces as plug-and-play features, including installation in local Windows PC/.Net Frameworks, downloading and installation from a cloud server, downloading BAMCS licenses and functional code, and including a site control module 406, and BACnet Stack as a tool. The site control module 406 can host and run a BACnet stack, and can allow for cloud/server secured (SSL) connectivity. The site control module 406 can manage full time (constant) connection to BAMCS server functionality. Once established, the connection can be maintained on a full-time basis. This allows the system to generate alarm notifications via email as well as online to active users. It can also provide a framework for Plug and Play protocol interfaces and a framework for advanced integration applications including new and existing IP devices.

IV. Multiple Platform Operating Code

Figure 5:
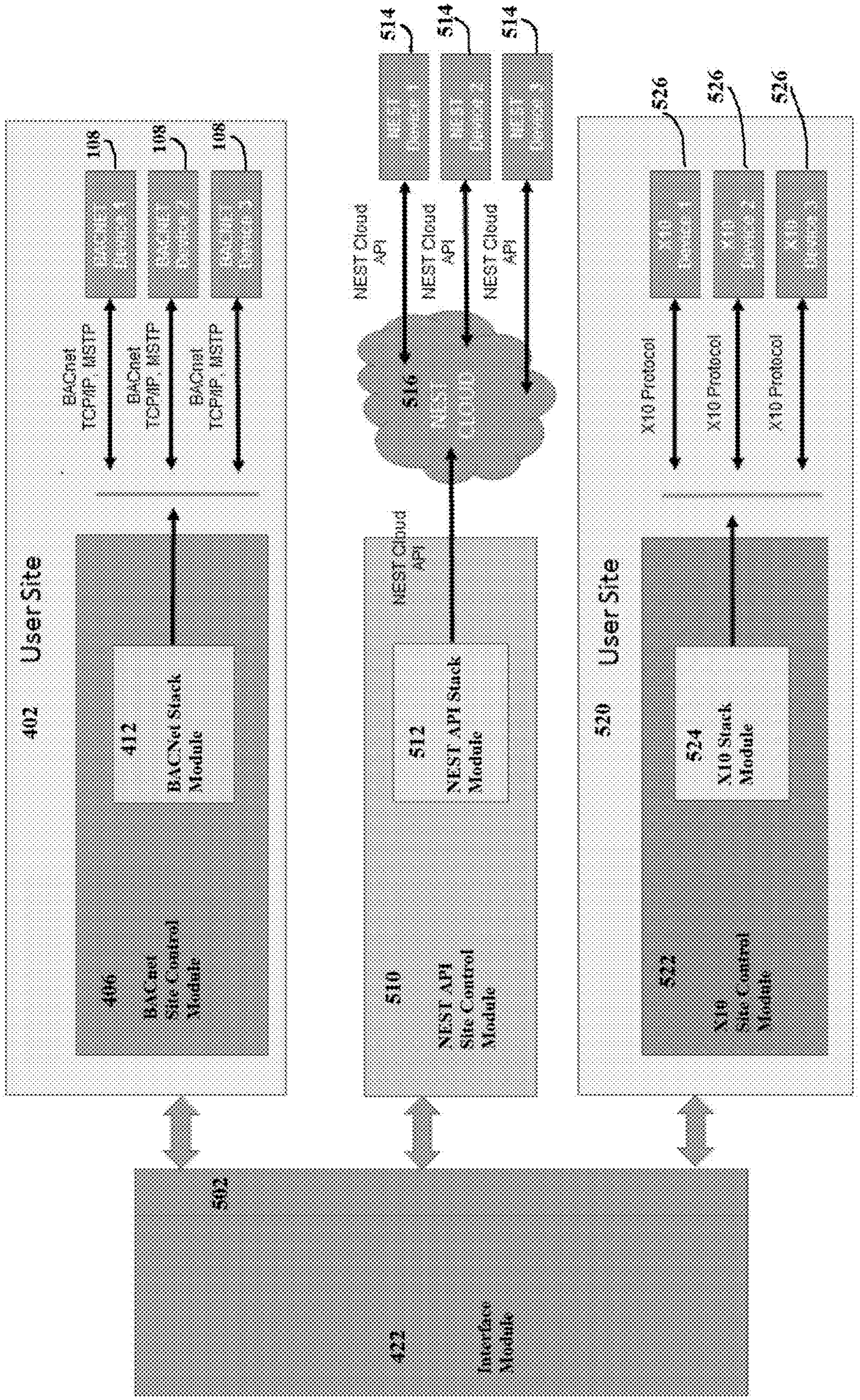
FIG. 5 is a schematic diagram showing an exemplary building automation monitor and control system with expansion plug and play architecture for disparate protocol interfaces, according to an embodiment.

FIG. 5 is a schematic diagram showing an exemplary BAMCS with expansion plug and play architecture for disparate protocol interfaces. The interface module 422, that can be part of a BAMCS application service, can have a communication protocol translation module 502. The communication protocol translation module 502 can use a multiple platform operating code to enable the interface module 422 to communicate with user sites using a variety of protocols, including BACnet with TCP/IP and/or MS/TP and industry API's. These various protocols are each a different communication language. Communication protocol translation module 502 functions as a universal translator that can translate each of the different languages into an API layer that enables various software applications. By translating the various languages into an API layer, the interface module 422 can allow a user to control each of the disparate systems using a single interface. The API layer can be a homogenous way of controlling the different protocol implementations. A dealer admin and/or a site user (building automation maintenance personnel) can access and manage various building automation devices via a single user interface and set of functionalities that can be translated into the specific protocols and commands for each building automation device without the user having to learn the different manufacturer and protocol functionalities. The interface module 422 can allow a user to control various devices that speak different languages through a single interface that can include a graphical user interface (GUI).

A remote interface module 422 can communicate through the internet with each of the disparate systems using the communication protocol translation module 502. As shown in FIGS. 4 and 5 and described above, the remote interface module 422 communicates through the internet with site control modules 406. A websocket communication channel can be created between a site control module 406 and the remote interface module 422, and the interface module 422 can have a service and data contact that implements a protocol that will allow data retrieved from the site control module 406 to be managed. The interface module 422 can be a wrapper around the specific protocol stacks and can know how to translate to the functionality of an interface module 422. An exemplary user site 402, as described above, has BACnet devices that can use the BACnet protocol. User site 402 can have a site control module 406 that can have a BACnet stack module 412 to facilitate communication with the BACnet devices 108. The interface module 422 can communicate with the BACnet devices 108 through the communication protocol translation module 502 and the site control module 406.

The interface module 422 can also communicate with user systems that use the NEST protocol. A NEST API site control module 510 has a NEST API stack module 512 that can facilitate communication with the NEST devices 514 through NEST cloud 516 using NEST cloud API protocol. The interface module 422 is able to communicate with the NEST devices 514 through the communication protocol translation module 502.

The interface module 422 can also communicate with a user site 520 that uses the X10 protocol. A site control module 522 can have an X10 stack module 524 that can facilitate communication with the X10 devices 526 using X10 protocol. The interface module 422 is able to communicate with the X10 devices through the communication protocol translation module 502.

Site control modules can also contain multiple stacks for facilitating multiple communication protocols, and a single site control module can monitor and control devices with different communication protocols within the same site.

Figure 6:
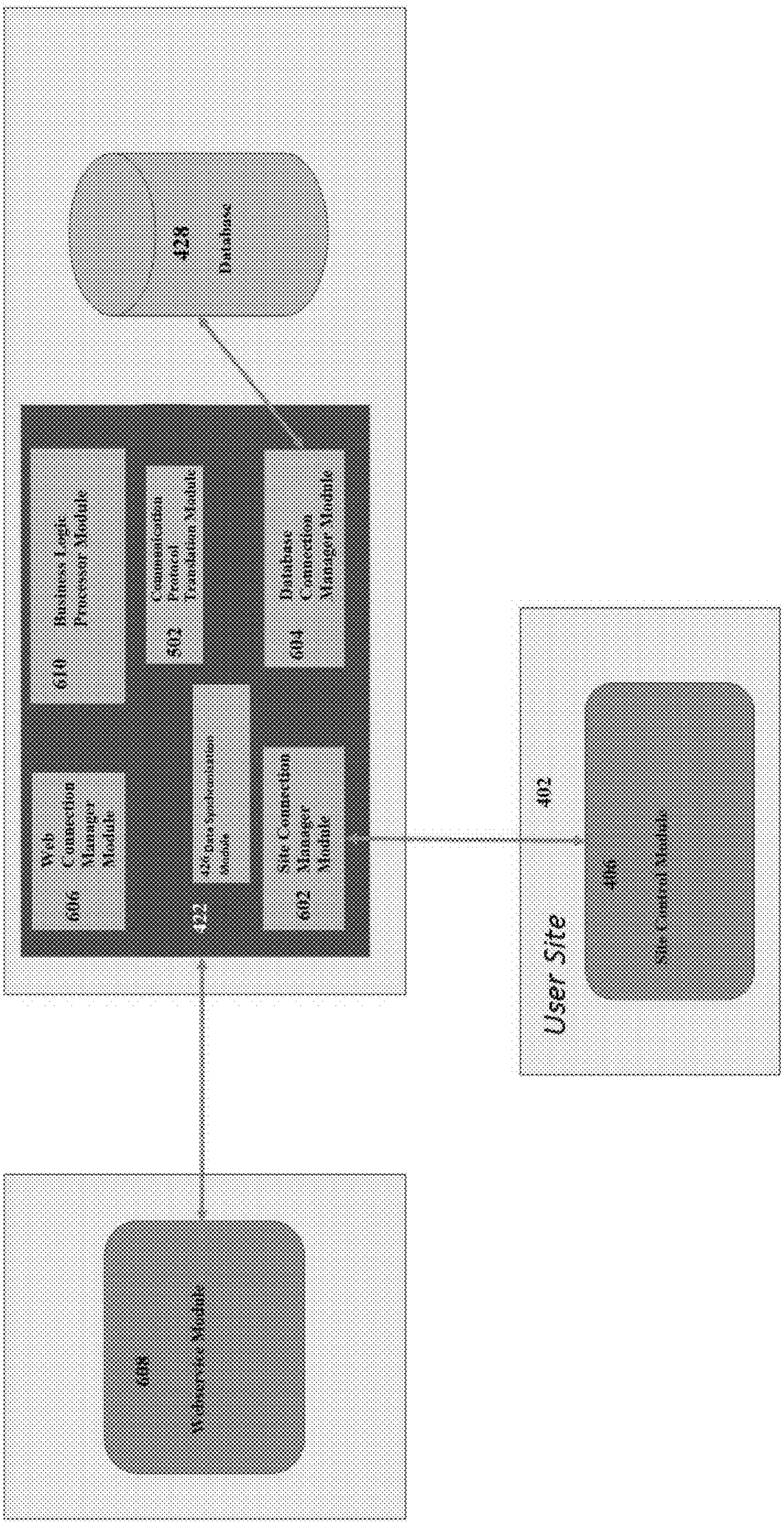
FIG. 6 is a schematic diagram showing an exemplary architecture for a building automation monitor and control system, according to an embodiment.

FIG. 6 is a schematic diagram showing an exemplary architecture for a building automation system, according to an embodiment. User site 402 can have a site control module 406 that can be in communication with the interface module 422. By way of non-limiting example, site control module 406 can use Web Socket over SSL (port 443) to communicate with interface module 422. User site 402 can have devices that use BACnet, NEST, X10, Modbus RTU, LON, other communication protocols, or a combination of communication protocols. Site control module 406 can have at least one stack to facilitate communication with the various devices. Site control module 406 can communicate information from the devices 108 to the interface module 422. Interface module 422 can use the communication protocol translation module 502 to translate the communications that may be in various communication protocols into an API layer. Interface module 422 can have a site connection manager module 602 that can manage the connection between the interface module 422 and the site control module 406. The site connection manager module 602 can be a WebAPI, or a set of services that allows the interface module 422 to communicate with the webservice module 608. The site connection manager module 602 enables web pages and/or mobile devices to be used to control the user site 402 through the site control module 406. Interface module 422 can also send communications such as commands back to the site control module 406. The interface module 422 can use the translation module 502 to translate the communications, such as commands, from the API layer into the appropriate communication protocol for the particular device 108. Interface Module 422 can use the Interface Data Synchronization Module 426 to synchronize the data being managed in the Interface Database 428 with the Site Control Module 406.

The interface module 422 can be located in a cloud 424, on a local intranet at the user site 402, or other suitable place. Interface module 422 can access an interface database 428, explained more fully below, that can be in the same place as interface module 422 or in a different place. Interface module 422 and interface database 428 can be part of the BAMCS application service. Interface module 422 can have a database connection manager module 604 that can manage the connection between the interface module 422 and the database 428. Interface module 422 can have a web connection manager module 606 that can manage a connection between the interface module 422 and a web server module 608. The webservice module 608 can be located in a cloud 424, on a local intranet at the user site 402, or other suitable place. The web server module 608 can allow a user to monitor and control the building automation devices at the user site 402, explained more fully below.

The interface module 422 can have a business logic processor module 610. The business logic processor module 610 can layer various software applications on top of the API layer. These software applications can then be accessed by the web server module 606. The business logic processor module 610 can perform the behavior and functionality of the system. By way of non-limiting examples, the business logic processor module 610 can embody the logic for the application to know when a connection to a site has dropped, when to save a record to the database for a device that was just discovered, when to create an audit record, and other behaviors and functions of the system. It can hold the information and functionality on how to allow a site user to access a site or prevent a user from updating device properties based on privilege settings. The business logic processor 610 can know about license details and what to allow and what to prevent from happening.

The webservice module 608 can allow a user who can be located anyplace with an internet connection to access the various software applications that can be layered on top of the API layer by the business logic processor module 610. The webservice module 608 can house the functionality to obtain, assemble, and manage the information necessary for the website to show and manage the BAMCS data. The website, or webpages, can provide views into the data, using the web controls and the user interface. The webservice can provide a link that allows a website, a mobile app, or another software application to talk to other parts of the system downstream. These software applications can facilitate the user controlling the devices 108 at the user site. A user can give a control command through the software layer that can then be translated into the appropriate communication protocol by the communication protocol translation module 502 and sent by the interface module 422 to the site control module 406.

V. Data Flow

Figure 7:
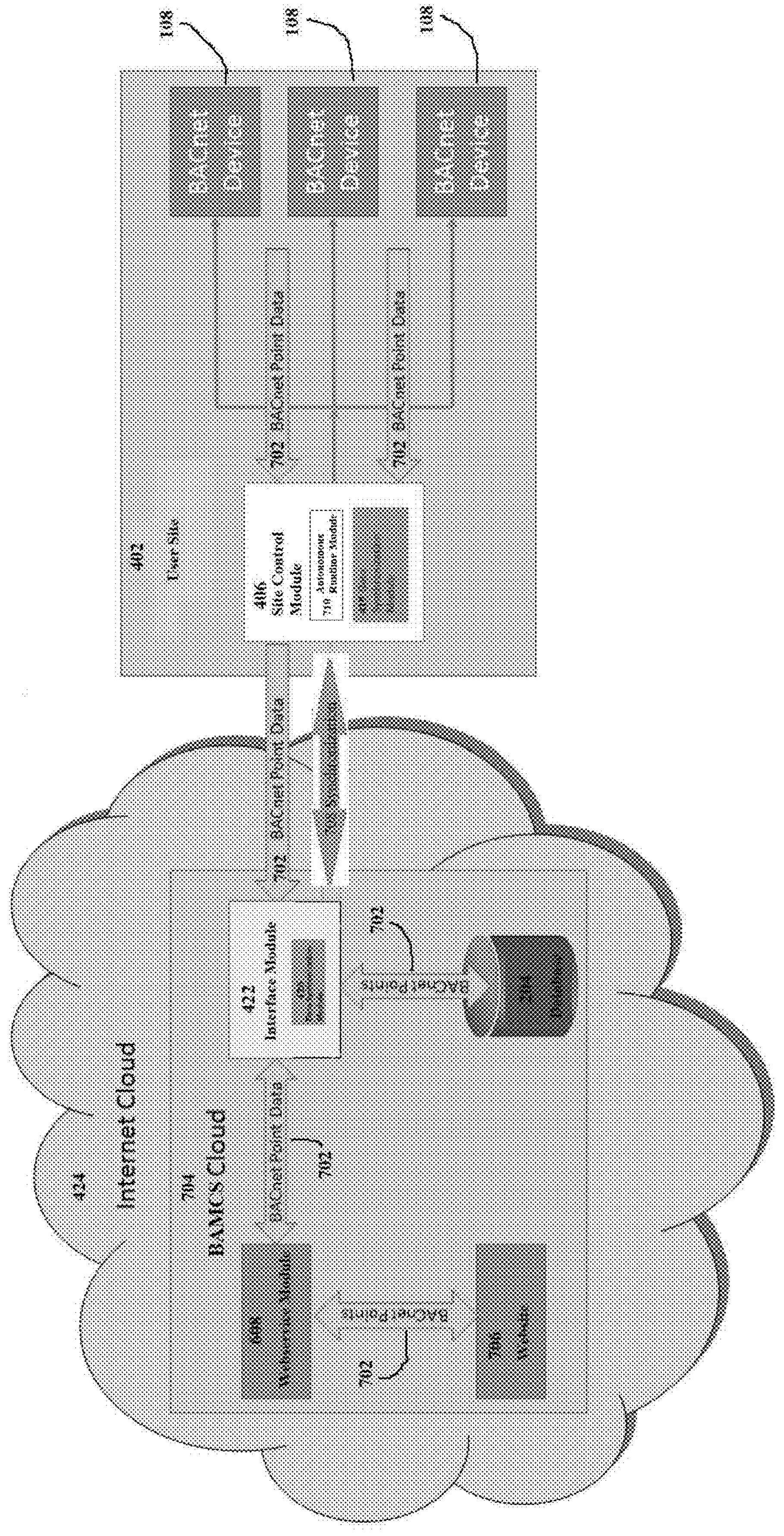
FIG. 7 is a schematic diagram showing an exemplary data flow path for a building automation monitor and system, according to an embodiment.

FIG. 7 is a schematic diagram showing an exemplary data flow path for a building automation system, according to an embodiment. Although the embodiment shown in FIG. 7 describes the data flow using BACnet data, other communication protocols can also be used. BACnet points are objects within BACnet devices. Objects can be information and/or settings in devices. Various devices have a wide variety of different information and functions they can support. By way of non-limiting example, these objects can include analog inputs, analog outputs, binary inputs, binary outputs, schedulers, or other information. As further non-limiting examples, a thermostat device could have a cooling setpoint as one object and a measured room temperature as another object. An air handler device could have an air flow rate object. It will be obvious to one skilled in the art that various settings or pieces of information can be objects. BACnet point data 702 can be communicated from the BACnet devices 108 to the site control module 406. Although this data is described as BACnet data, it should be clear that other communication protocols and data are expressly incorporated. The BACnet point data 702 can then be communicated to the remote interface module 422 that can be part of a BAMCS cloud 704 within the interne cloud 424. By way of non-limiting example, the remote interface module 422 can be installed and run in Windows Server OS in the cloud. The BAMCS cloud 704 can include the remote interface module 422, an interface data synchronization module 426, an interface database 428, a webservice module 608, and a BAMCS website 706. Data Synchronization Module 419 in Site Control Module 406 and Data Synchronization Module 426 in Interface Module 422 can work together to make sure the data in the interface database 428 is synchronized with the 702 BACnet points data from the Site Control Module 406. Synchronization modules 419 and 428 can send synchronization information 708 back and forth between the interface module 422 and site control module 406 to synchronize the two databases.

The interface module 422 can store the BACnet point data 702 in the interface database 428. The interface module 422 can also interface with a plurality of user sites and site control modules. The interface database 428 can maintain lists of building automation devices 108 assigned to each site control module 406. A user can monitor a building automation system by accessing the point data 702 through the BAMCS website 706. The BAMCS website 706 can obtain the point data 702 through the webservice module 608. The webservice module 608 can obtain the point data 702 from the interface module 422. The interface module 422 can lookup device information in the database 428 and can request information about specific devices 108 from the site control module 406. The site control module 406 can request information from the specified device 108. By way of non-limiting example, this point data 702 can include various settings, parameters, or alarm information that can communicate to the user a temperature within a site, a thermostat setting, lighting conditions, or other building information. Information and requests for information can travel through this data path from a user through the BAMCS website 706 to the device 108, and also from the device 108 to the website 706. A user can also monitor or control multiple sites, such as different floors in a single building or multiple buildings. By way of non-limiting example, when a user uses the website 706 to look up the thermostat setting at a particular site, such as a particular floor of a building, the interface module 422 can look up information in the database 428 about the requested device at the requested site, and can direct the request to the correct site control module which can then request the desired information from the correct device. The requested information can then be passed back from the device, through the communication protocol translation module 502 and the business logic processor module 610 and back to the website 706 where the user can obtain the desired information. The interface module 422 can have duplex communication channels to other modules, so that there can always be a request and response or a stream of data flowing back and forth.

A user can also control the building automation systems through the website 706. By way of non-limiting example, a user can adjust a thermostat or turn a light on through the data path described above. The BAMCS can be programmed to perform various building automation functions autonomously, including changing a thermostat setting at a given time or turning a light if a condition is met, such as a door opening. A site control module 406 can store and execute these instructions autonomously without (free of) a connection to the internet or the interface module 422. A site control module can have an Autonomous Runtime Module 710, and Autonomous Runtime Module 710 can manage the 406 Site Control Module when it needs to run disconnected from the 422 Interface Module, such as, for example, if the internet service is interrupted or the Interface Module 422 is otherwise disconnected from the Site Control Module 406. The Autonomous Runtime Module 710 can allow the Site Control Module 406 to run autonomously, and continue to control devices and collect and manage data as it has been configured. The scheduling functions can continue to run and the site control module 406 can continue to change and/or control devices accordingly. Trend data can continue to be collected with present value updates, and the data can be sent to the interface module 422 when the connection is re-established. Alarms can continue to monitor devices and control activity for breaches of high and low values and changes in status, and can create notifications on the network as necessary, and can send data to the interface module when a connection is re-established. The database 428 can also maintain a user profile that can include all of the automation settings such as, for example, daytime thermostat settings, nighttime thermostat settings, etc. These settings can be downloaded from the BAMCS cloud 704 to the site control module 406 to restore the settings if necessary, for example if the site control module 406 were to be involved in a flood, fire, or other disaster. Similarly, user profile settings can be saved and restored if a user moves to a different site such as a different floor of a building or a different building. By downloading the user profile settings from the BAMCS cloud 704, the site control module at the new place can autonomously control thermostat settings according to the user's preferences without requiring reprogramming.

The BAMCS may also learn the preferences of a user or a building occupant. By way of non-limiting example, the system may learn that when a certain employee stays at his desk late at night he may turn on additional lighting. The BAMCS can learn this pattern and can turn on the additional lighting automatically when that employee stays at his desk late at night.

A user's home can also be a site with a site control module 406. A site control module can turn at least one system on or off or adjust the environment at a specified time that can be before a user is expected to arrive home, after a user is expected to go to bed, etc. A home with a site control module 406 can also be programmed to adjust the environment depending on whether the user is home. By way of non-limiting examples, a user's cell phone can provide GPS information to the interface module 422 which can then inform the site control module when the user is home, or moving towards home, or within a specified radius of home, etc. Alternately the user's cellphone or other electronic device could communicate directly to the site control module that the user is home, or the site control module can determine that the user is home by detecting the presence of the user's cell phone or other electronic device on the in-home internet connection when the user returns home and the user's cell phone or other electronic device engages with the in-home internet connection.

A site control module 406 within a home can also adjust various building automation systems depending on which member of the household is at home at a given time. Different members of a household can have distinct user profiles, and the site control module 406 can implement the appropriate user profile depending on who is home. If multiple users are home at the same time, compromise profiles can be created, or a hierarchy or profiles can be established to determine which profile will be implemented.

Because the BAMCS cloud 704 maintains a user's profile, a user who travels to a hotel equipped with BAMCS site control module can enjoy the same automation settings that the user prefers in his home, without (free of) having to reprogram the site control module each time. The site control module for the hotel room can download the user's preferences from the BAMCS cloud 704 and implement them automatically. A user's automation preferences can also include turning on a television to a favorite program, on the correct channel at the correct time, without the user needing to find the correct channel number which may be different from the channel numbers at the user's home.

Figure 8:
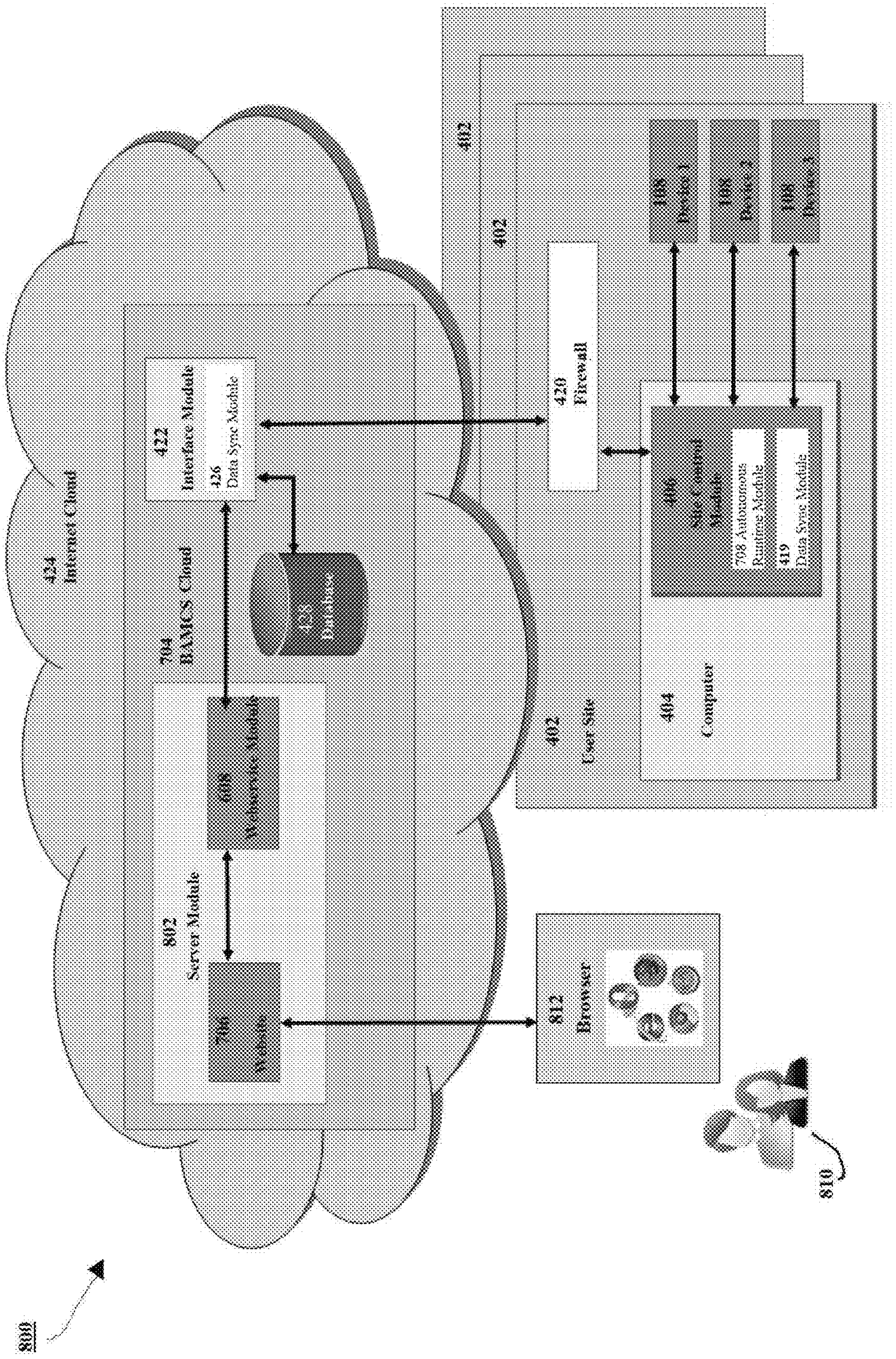
FIG. 8 is a schematic diagram showing an overview of an exemplary building automation monitor and control system with a remote interface module, according to an embodiment.

FIG. 8 is a schematic diagram showing an overview of an exemplary BAMCS with a remote interface module, according to an embodiment. The BAMCS 800 can have a plurality of user sites 402 and a BAMCS cloud 704. The BAMCS cloud 704 can have a remote interface module 422, a database 428, and a server module 802. The server module 802 can have the website 706 and webservice module 608. In the embodiment shown in FIG. 8, a user site 402 can have a plurality of BACnet devices 108, however a user site can have a greater or smaller number of BACnet devices, NEST devices, X10 devices, devices with alternate protocols, or combinations of various device protocols. A user site 402 can also have a computer 404 with a site control module 406 configured for BACnet device protocols and/or other device protocols. A user site 402 can also have a firewall 420. The BAMCS 800 can have a plurality of user sites 402 and can have different device protocols in use at different user sites. As shown in FIG. 8, a user 810 can use an internet browser 812 to access the BAMCS website 706. The term browser can include standard web browser devices including computers, tablets, smartphones, or other electronic devices that can provide a user interface to access the BAMCS, which can also include dedicated applications (apps) that can provide a user interface to access the BAMCS.

Using the internet browser 812, the user 810 can monitor and/or control the individual BACnet devices 108 through the website 706 from anyplace with an internet connection. The user 810 can remotely obtain and share data obtained through the on-site site control module 406 from the on-site BACnet devices 108. These devices 108 can be in the fields of HVAC control, fire detection and alarm, lighting control, security, smart elevators, utility company interface, or others. A user can also remotely monitor and/or control alarms, event management, trending, scheduling, or other features, through a browser over the internet. A user's browser window can display status information for the above systems including temperatures, security status, alarms, or others. A user 810 can enter a control instruction into the browser 812, such as, for example, an instruction for a light to be turned off immediately, or turned off at a specified time, or turned off every day at the specified time, or for having a thermostat set to different temperatures at different specified times, or closing and opening a window shade at specified times, etc. The control instruction can be entered into the website 706, and passed through the webservice module 608 to the interface module 422. The interface module can look up information about the site and/or the device and send the control instruction to the correct user site 402 where the control instruction passes through the firewall 420 to the site control module 406. The site control module 406 can either send an immediate instruction to the device 108 for the light to be turned off, or the site control module 406 can store the instruction to be implemented at the appropriate time.

After a user 810 provides specific automation instructions to the website 706 through the browser 812 these instructions can become part of a user profile which can be stored in the interface database 428. The profile and instructions can be transmitted to the site control module 406 where they can also be stored in a site database 204 at the user site 402. The data synchronization modules 419 and 426 can work together to synchronize the data in the databases 204 and 428. The site control module 406 can have an autonomous runtime module 710 that can allow the site control module 406 to store and autonomously implement all preferences and instructions saved in a user's profile, so that the building automation system can continue to run autonomously if the internet connection between the user site 402 and the BAMCS cloud 704 is interrupted. In the event of a sustained internet outage, a user 810 can monitor and control the building automation systems at the site through the on-site computer 404, or through an alternate computer connected to the LAN. In alternate embodiments an optional cellular connection can enable a user to control the local building automation systems through the cellular connection in the event of a sustained internet outage. In the event of damaged or lost memory at the site control module 406, the user profile can be downloaded to the site control module 406 from the interface database 428.

If the user chooses to move from one site to another site, for example, to a different floor of the same building, the user profile can be downloaded from the interface database 428 to the site database 204 of the site control module 406 at the user's new site. Because the BAMCS can discover all devices at a site, and can communicate with the devices in various languages, the instructions in a user profile can be seamlessly implemented at different sites, even if the different sites have devices that speak different languages. By way of non-limiting example, a building automation system with multiple sites could be a single building with different sites in different areas of the building, a single building with different sites on different floors of the building, a campus of buildings with different sites within different buildings, or a collection of buildings around the world monitored and controlled by a single user with various sites around the world, or other possible configurations.

Figure 9:
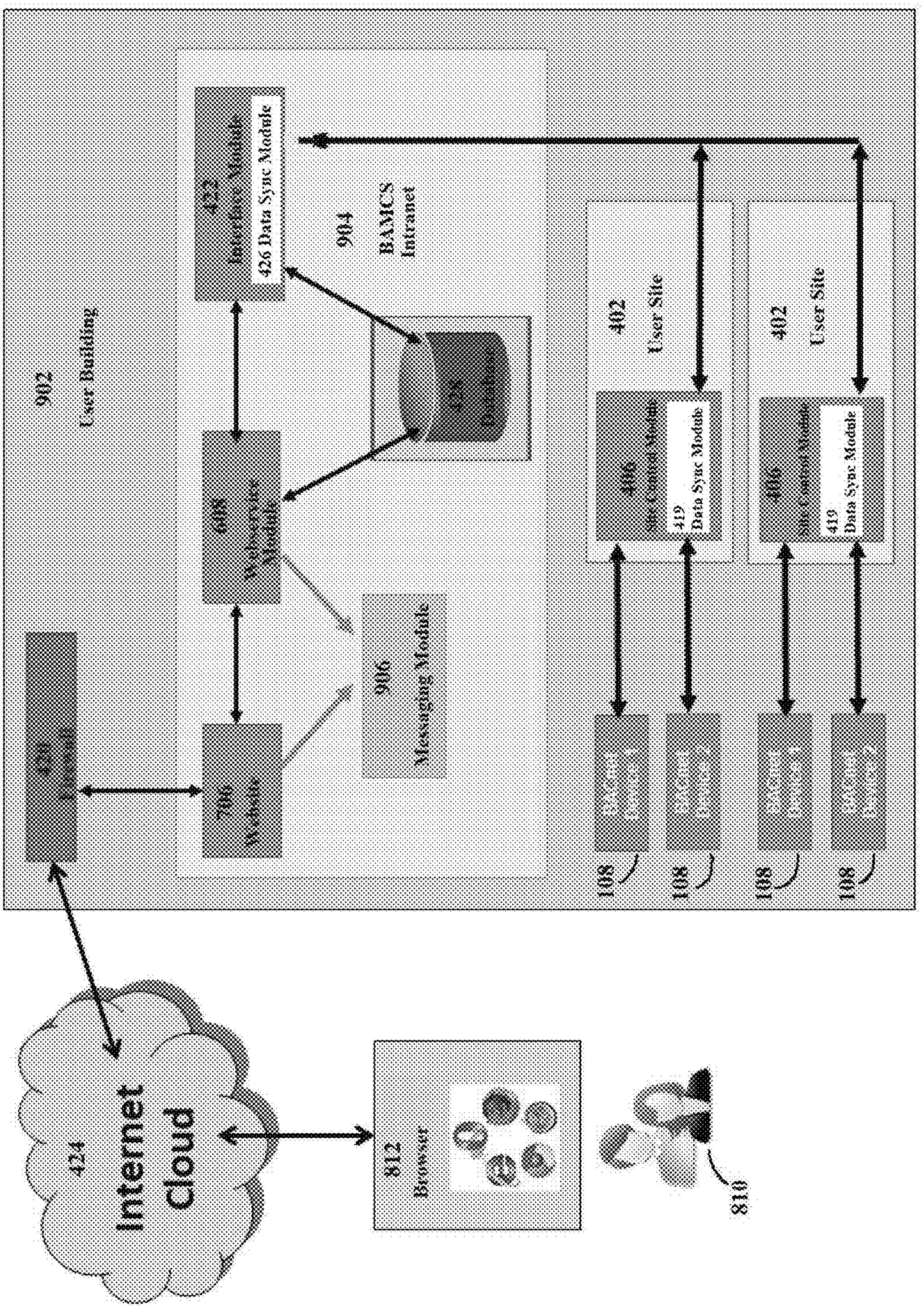
FIG. 9 is a schematic diagram showing an exemplary data flow path for a building automation monitor and control system with a local interface module, according to an embodiment.

FIG. 9 is a schematic diagram showing an exemplary data flow path for a building automation system with a local interface module, according to an embodiment. In the embodiment of FIG. 9, a BAMCS intranet 904 can be located in a user building 902. The BAMCS intranet 904 can have a local interface module 422, an Interface Data Synchronization Module 426, an Interface Database 428, a webservice module 608, a website 706, and a messaging module 906. The user building 902 can have a plurality of user sites 402, and each user site can have a plurality of BACnet devices and a site control module 406. The interface Data Synchronization Module 426 can manage the relationship between the objects in the user sites 402 and the interface database 428.

The user 810 can monitor and/or control a BACnet device within the building 902 from anyplace with an internet connection through the browser 812. A user 810 accessing the website 706 can select a particular site from among the user's sites, such as a particular floor of a user's building, and can select a particular function such as turning on a particular light or instructing the light to be turned on at a particular time. Control instructions can be transmitted over the internet from the browser 812 to the user building 902 using the website 706 on the BAMCS intranet 904.

By way of non-limiting example, the browser 812 can access the website 706 over the internet through the network firewall 420 by initially using port 80 and then using port 443 after authentication. The website 706 can be in communication with the webservice module 608, and the webservice module 608 can use the database 428 and the interface module 422 to obtain monitoring information that can be presented to the user 810 on the website 706, and the webservice module 608 can receive instructions from the user 810 through the website 706 and can transmit those instructions to the interface module 422. By way of non-limiting examples, the website 706 can be in communication with the webservice module 608 using port 8002 WebAPI Web Services, and/or the web service module 608 can be in communication with the interface module 422 using WCF.

The interface module 422, using database 428, can determine which device needs to be instructed and/or have information requested from it, which site the device is at, and what communication protocol the device speaks, and can translate the instructions into the appropriate protocol using the communication protocol translation module 502. The interface module 422 can transmit the instructions in the correct communication protocol to the site control module 406 so that the instruction can be implemented. By way of non-limiting example, the interface module 422 can communicate with the site control module 406 using Web Socket over SSL (port 443). The site control module 406 at the user site 402 can then communicate instructions, requests for information, and/or other communications to the specified device identified by the interface module 422. By way of non-limiting example, the site control module 406 can communicate with a BACnet device using BACnet TCP/IP or MSTP.

If the user has requested information, such as whether a light is on or the temperature at the site, the requested information can then be communicated back to the user following the same data path. The information can be communicated from the device 108 to the site control module 406 to the interface module 422. The interface module 422 can use the communication protocol translation module 502 to translate the communication into an API layer and use the business logic processor module 610 to add the software layer. The business logic processor module 610 can add a software layer that can perform the behavior and functionality of the system. By way of non-limiting examples, the business logic processor module 610 can embody the logic for the application to know when a connection to a site has dropped, when to save a record to the database for a device that was just discovered, when to create an audit record, and other behaviors and functions of the system. It can hold the information and functionality on how to allow a site user to access a site or prevent a user from updating device properties based on privilege settings. The business logic processor 610 can know about license details and what to allow and what to prevent from happening. The software layer, including any of the above functionalities, can then be communicated from the interface module 422 to the webservice module 608 and on to the website 706 where it is communicated through the firewall 420, over the internet, to the browser 812 so that it can be received by the user 810.

Additionally, the website 706 and/or webservice module 608 can communicate with a messaging module 906 to provide requested information to a user directly through text messages, emails, automated phone calls, or other communication mediums. By way of non-limiting example, a user who accesses the BAMCS through a cellphone app can request that a large volume of information, such as repeated measurements over time, be sent directly to the user as a spreadsheet via email, directly to the user's server, or other means.

Figure 26A:
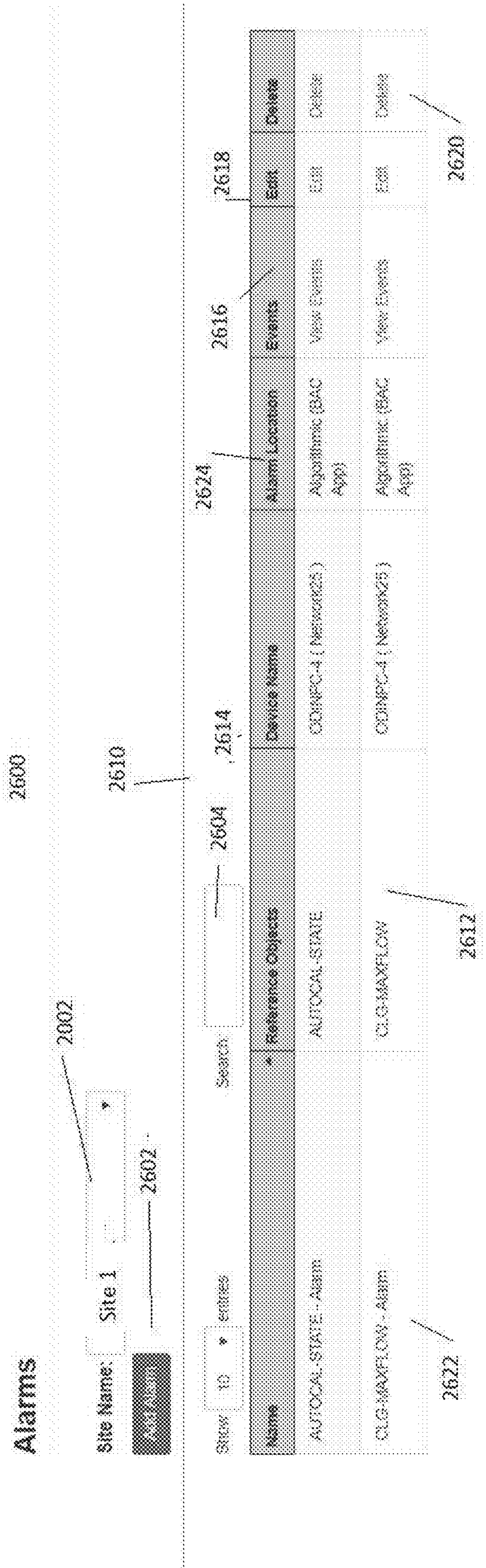
FIG. 26*a* is an exemplary diagram of a screen that manages alarms, according to an embodiment.

The website 706 and/or webservice module 608 can also provide information, including alarms, messages, or other notifications, autonomously through text messages, emails, automated phone calls, or other communication mediums. These alarms or messages can be created by a device or by the functionality of the system. By way of non-limiting examples, these communications can indicate that a measurement from a device is outside of a parameter that can be set by the user, or an alarm has been triggered, or the security system has been triggered, or the fire system has detected a possible fire, or other possible events. By way of non-limiting example, a user can set temperature parameters with upper and/or lower limits for an office area or a refrigeration unit, and can request that the BAMCS system autonomously notify the user if the temperature is outside of these parameters. The user can use the website 706 to set various parameters and/or alarms and provide instructions for the user to be notified by specified communication medium(s). The messaging module can also be programmed through the website to trigger an alarm if a specified event occurs, for example a security breach or possible fire. The alarm can be triggered, through the internet or other communication means, at a remote place such as a remote monitoring facility, at a security company, at a local police department near the site, at the site itself, at all sites within a particular building, on an app on a user's phone, another person's phone, or other places. FIG. 26*a* is an exemplary screen showing a list of configured alarms for a given site, explained more fully below.

VI. Monitor and Control System Applications

The BACnet devices, and devices using alternate communication protocols, can speak different primitive languages encoded in binary. The BAMCS can translate the various primitive languages into a single API layer, add a software layer on top of the API layer and incorporate business logic and business objects, and allow the user to remotely monitor and control the devices by conveniently accessing the software layer with a user-friendly user interface from anyplace in the world with internet access. The BAMCS can allow the user to monitor and control these various devices that may speak different languages and may be located on different floors, different buildings, or different continents, through a single user interface. The user can monitor the status of one or more device, request information collected by one or more device, provide instructions to a device that can be implemented immediately or stored by the BAMCS to be implemented at a later time or when certain conditions are met, and/or other building automation activities that can include but are not limited to data sharing, alarm and event management, trending, scheduling, and remote device and network management. The user can monitor and control any compliant device including HVAC control, fire detection and alarm, lighting control, security, smart elevators, utility company interface, and/or other compliant devices. The user's instructions can be saved and implemented at different or multiple sites that may use different communication protocols, without the user having to provide instructions multiple times or program devices using different protocols.

The site user can have the ability to set up schedules that can run to modify and update device settings according to certain monthly/weekly/daily/timely intervals. These schedules can be maintained by the application and can also sent to the Site Controller Module to be run. If a disconnection occurs to the Site Controller Module, it can automatically continue to run these schedules accordingly. These schedules may be either intrinsic or algorithmic in nature. Intrinsic schedules can be managed and run at the device if it allows. If the device does not allow intrinsic schedules then algorithmic schedules can be created and saved at the site control module and can be managed and run by the site control module. The location for the schedules can be the site control module and/or the device itself The site user may also configure and run trend logs. Trend logs can track values over time for devices and their points (objects). These can also be managed intrinsically and/or algorithmically. If a device allows an intrinsic trend log to be created then it can be sent to the device and can be run and managed at the device. A trend log can be managed at (located at) the Site Controller Module and/or the device. The Trend Logs can also be saved in the BAMCS database for later retrieval and view as charts, printed as charts, or exported as spreadsheet data.

VII. License Structure

The BAMCS can be manufactured and supported by a BAMCS service provider. The BAMCS service provider can rely on licensed dealers to sell the BAMCS service to users, prepare user licenses and user profiles, install and implement the system at user sites, and provide other value added services to a user. The users can pay a user license fee that can be a subscription fee to the dealer, and the dealer can pay a dealer fee, that can be a percentage or other fixed amount of the user license fee, to the BAMCS service provider.

There can be multiple license types. A remote site license can allow a user to have a site control module, that can be connected over the internet to a remote interface module, also known as a remote BAMCS application service. The remote BAMCS application service can be on a cloud or other remote server. A local intranet license can allow a user to have a local BAMCS application service running on a local intranet that can be, by way of non-limiting example, within a user's building, campus of buildings, or various buildings located in different places and sharing a common intranet. A local site license can allow a user to have a site control module that can be connected a local BAMCS application service running on the user's local intranet at the user's site.

Figure 10:
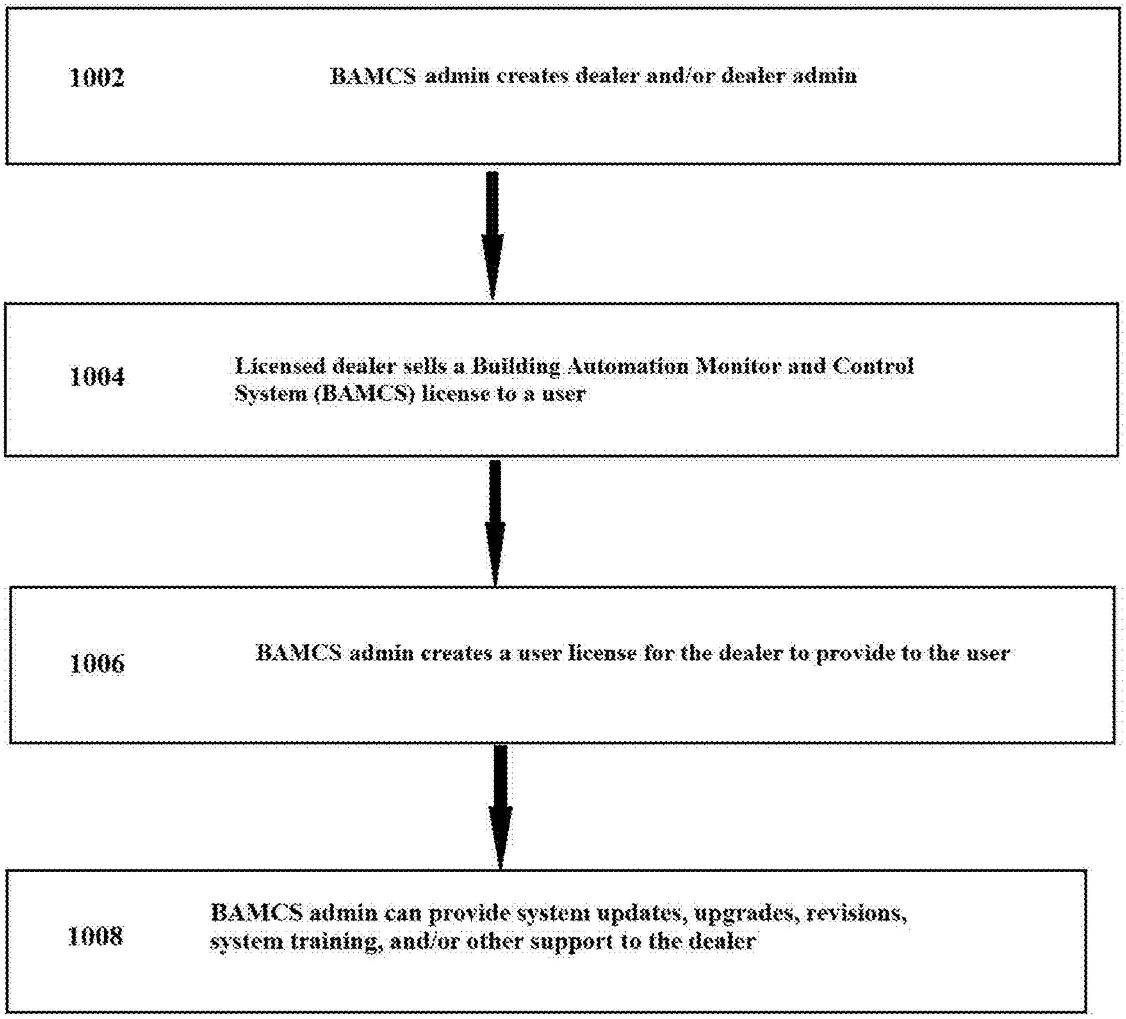
FIG. 10 is diagram of an exemplary relationship between a service provider and a dealer, according to an embodiment.

FIG. 10 is diagram of an exemplary relationship between a BAMCS service provider and a dealer, according to an embodiment. A BAMCS service provider admin (administrator) is an overall top-level administrative user who can create a dealer and/or a dealer admin. In 1002, a BAMCS service provider admin creates a dealer and/or a dealer admin. By way of non-limiting example, the service provider admin can be an actual BAMCS service provider, an employee of the BAMCS service provider, an agent of the BAMCS service provider, or any entity appointed as BAMCS service provider admin by any entity with the authority to do so. A dealer admin (administrator) can be a top-level administrative user for a given dealer who can create other dealer admins, dealer users, and site admins (administrators), and can create sites and grant site access to dealer users and site administrators. A dealer admin can be an actual dealer, an employee of the dealer, an agent of the dealer, or any entity appointed as dealer admin by any entity with the authority to do so. By creating a dealer and/or dealer admin, that dealer can become licensed and can be activated in the BAMCS. A dealer license can entitle a dealer to sell user licenses to site users. A dealer website, that can be part of or accessed through website 706, can provide a separate interface for the dealer to access the building control automation system. A dealer user can be a user-level role with no administrative privileges who can be able to view any site that a dealer is managing. Dealer users, site admins, and site users can only view and manage a site when they have been granted access to that site. By activating the dealer and dealer admin, the dealer admin can access the dealer website. The dealer admin can register multiple dealers to the building control automation system, for example multiple salesmen working for the same dealer company. In 1004, the licensed dealer can sell a BAMCS user license to a site user in exchange for a user fee that can be a subscription fee. The dealer can give a portion of this user fee back to the BAMCS service provider or service provider admin. A dealer can sell multiple BAMCS user licenses to a single user to be used in multiple user sites. In 1006, the BAMCS service provider admin can create a user license that the dealer can provide to the user. This user license can allow the user to access and use the BAMCS. In 1008, the service provider admin can provide system updates, upgrades, and revisions for the BAMCS product, and can provide those system updates, upgrades, revisions, system training, and/or other support to the dealer.

Figure 11:
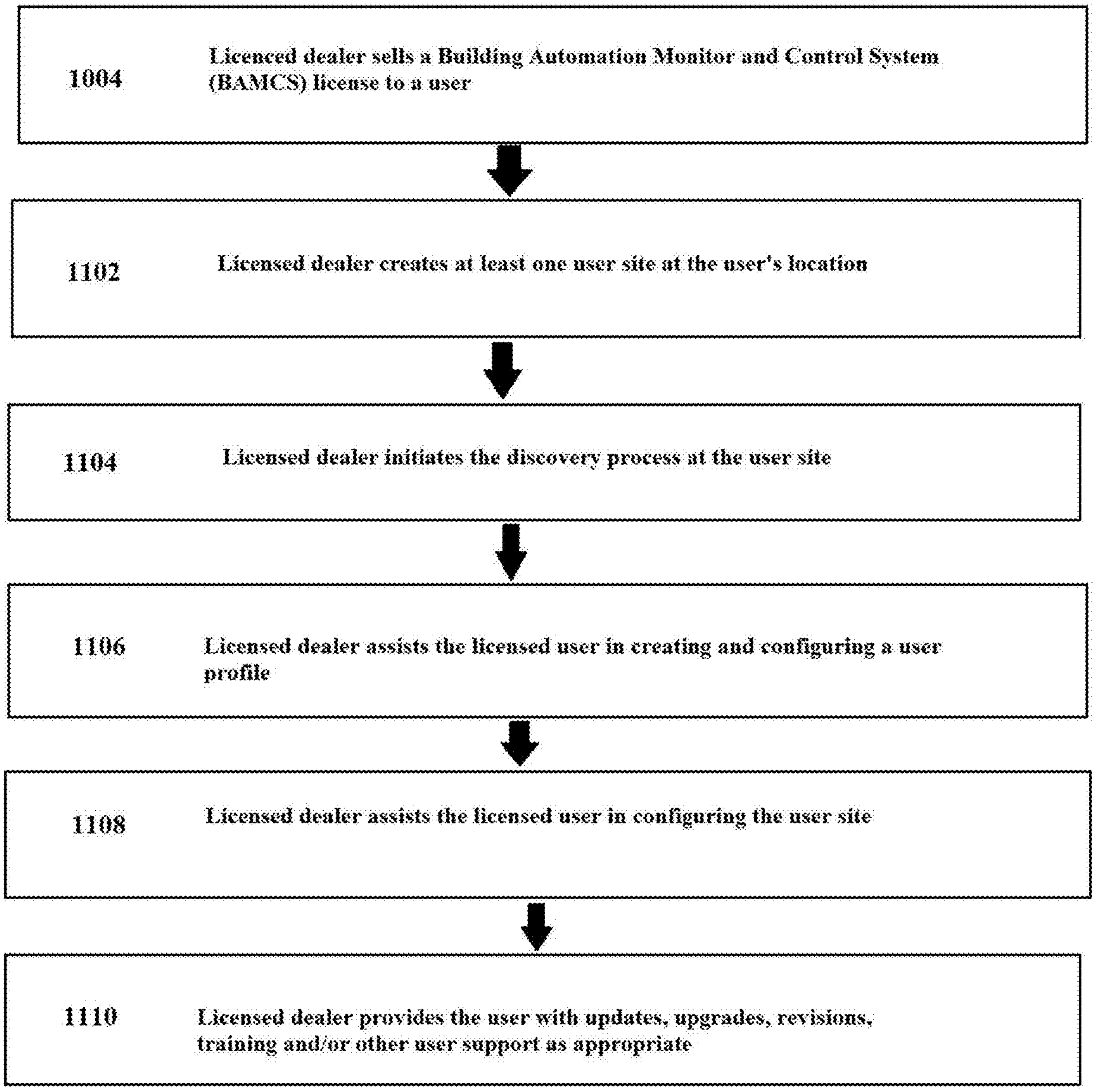
FIG. 11 is a diagram of an exemplary relationship between a licensed dealer and a user, according to an embodiment.

FIG. 11 is a diagram of an exemplary relationship between a licensed dealer and a user. In 1004, the licensed dealer can sell a BAMCS user license to a user in exchange for a user fee that can be a subscription fee. In 1102, the licensed dealer can create at least one user site 402 at a licensed user's building. Creating a user site 402 can include installing various BACnet devices 108, and/or devices using other communication protocols, and can include connecting those devices to the Local Area Network (LAN) within the user's building. Creating a user site can also include installing and/or setting up a site control module 406, and can include connecting the site control module 406 to the LAN. Creating a user site can also include putting the site control module 406 in communication with the interface module 422. The site control module can be put in communication with the interface module 422 if user has received a license for the user site 402, and the license can be activated when the site control module 406 is in communication with the interface module 422. A user can be created under a dealer, and a dealer admin can grant site access to the user. A dealer can create an unlimited number of sites and the dealer can grant the user access to any or all of those sites. In 1104, the licensed dealer can begin the device discovery process. The device discovery process can discover all of the devices connected to the LAN. In 1106, the dealer can assist the licensed user in using the website 706 to create and configure a user profile. In 1108, the dealer can assist the licensed user in configuring the user site. Configuring the user site can include setting various preferences, parameters, schedules, alarms, and/or other site configurations. In 1110 the dealer can provide the user with BAMCS updates, upgrades, revisions, training, and/or other user support. In alternate embodiments, the user can create and configure his own user profile without assistance from the dealer, the user can initiate the discovery process through the website without assistance from the dealer, and/or the user can configure the user site without assistance from the dealer.

Figure 12:
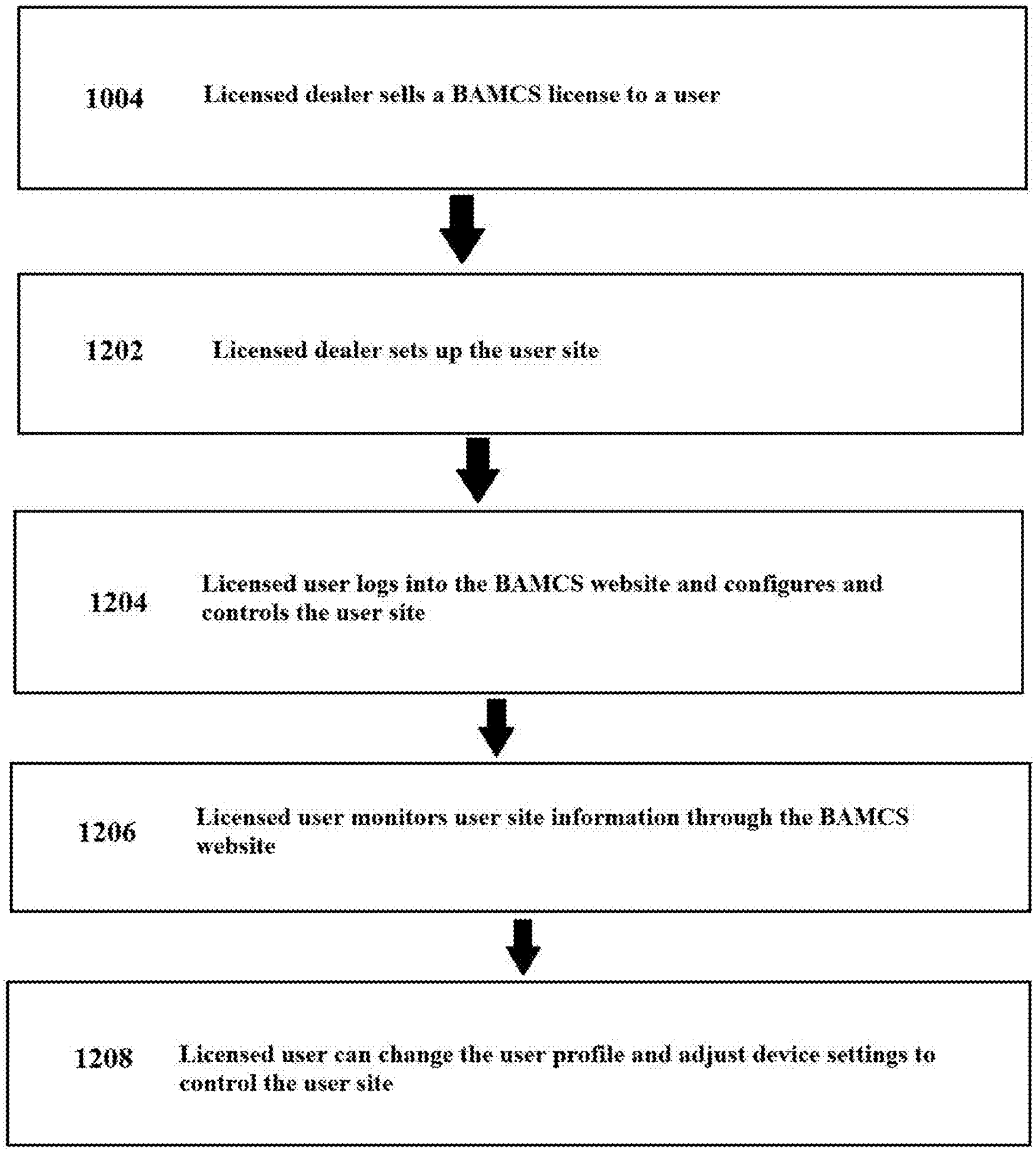
FIG. 12 is a diagram of an exemplary relationship between a licensed user and the building automation monitor and control system, according to an embodiment.

FIG. 12 is a diagram of an exemplary relationship between a licensed user and the building automation monitor and control system. In 1004, the licensed dealer can sell a BAMCS user license to a user in exchange for a user fee that can be a subscription fee. In 1202, a dealer sets up the user site 402, which can include installing the site control module 406, and can include assisting the user in creating a user profile. In 1204, the licensed user can log in to the BAMCS website 706 and can configure and control the user site 402, which can include setting various preferences, parameters, schedules, alarms, and/or other user site configurations for the various devices 108. These settings can be saved in a database, and can be implemented by the BAMCS. In 1206, the licensed user can log in to the BAMCS website 706 and can monitor and review data values, alarms, trends, schedules, and/or other information. By way of non-limiting example, logging into the BAMCS website 706 can include a browser-based webpage, dedicated smartphone app, or other means for accessing the interface module and the monitoring and controlling system. In 1208, the licensed user can adjust various settings and change the user profile as the user desires in order to manage the user site. The database can be updated to reflect the user's changes to the user profile. The user can continue to change settings to control the systems and monitor the results as often as the user desires.

VIII. Website

Figure 13:
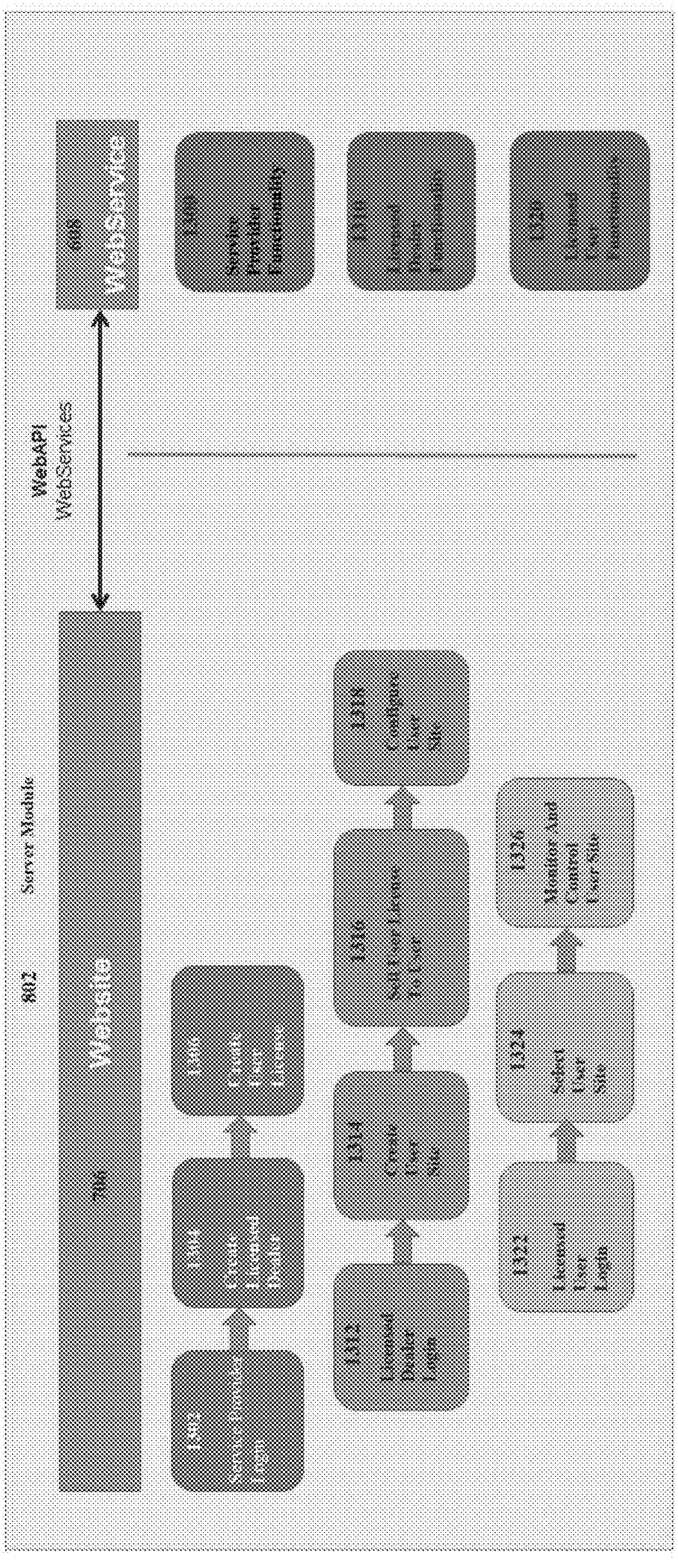
FIG. 13 is a schematic diagram of exemplary website functionality, according to an embodiment.

FIG. 13 is a schematic diagram of exemplary website functionality, according to an embodiment. Server module 802 can have a website 706 and a webserver module 608. Website 706 can be configured to provide different functionality depending on what type of authorized user logs in, because the underlying webservice 608 for the website 706 can group these functions into different types of access. The webservice 608 can allow access to BAMCS service providers for service provider admin functions at 1300, can allow access to licensed dealers for dealer functions at 1310, and can allow access to licensed users for user functions at 1320. The functionality of the website 706 is different depending on whether the webservice 608 is granting access for service providers, dealers, or users.

Service provider functionality 1300 can include a service provider login 1302, creating a licensed dealer 1304, and creating a user license 1306. At 1302 a service provider admin logs in to the website 706 and receives service provider access from the webservice 608. Creating a licensed dealer 1304 allows the service provider to create a licensed dealer/dealer admin. By creating a licensed dealer, the licensed dealer can be granted access the website 706 and can sell user licenses to users. Creating a user license 1306 allows a service provider to create a license for a new user.

Licensed dealer functionality 1310 can include a licensed dealer login 1312, creating a user site 1314, selling a user license to a user 1316, and configuring a user site 1318. After a licensed dealer has been created, licensed dealer login 1312 allows the dealer to log into the website 706, and receive licensed dealer access from the webservice 608. Creating a user site 1314 allows the licensed dealer to create a user site. A site can be a building, buildings, or network that can be managed by a single instance of a site control module. A single site control module can run on a computer with access to one or many buildings, and the group of BACnet objects managed by the single site control module are a site. There can be multiple sites configured to handle the complete workload of a user's overall BACnet network. Selling a license to a user 1316 allows the licensed dealer to sell a user license to a user. Configuring a user site 1318 allows the dealer to configure the user site. Configuring the user site can include initiating the discovery process, it can include linking an intranet license to a interface module 422 running on a user's local intranet, and it can include mapping site control modules 406 and linking them to a local interface module running on the local intranet or a remote interface module running on a cloud or remote server.

Licensed user functionality 1320 can include a licensed user login 1322, selecting a user site 1324, and monitoring and controlling a user site 1326. After the user license has been created, licensed user login 1322 allows a user to log into the website 706 and receive licensed user access from the webservice 608. Selecting a user site 1324 allows the licensed user to select from one or more user sites 402. Monitoring and controlling a user site 1326 allows the licensed user to monitor and control the selected user site 402 through the website 706.

Figure 14:
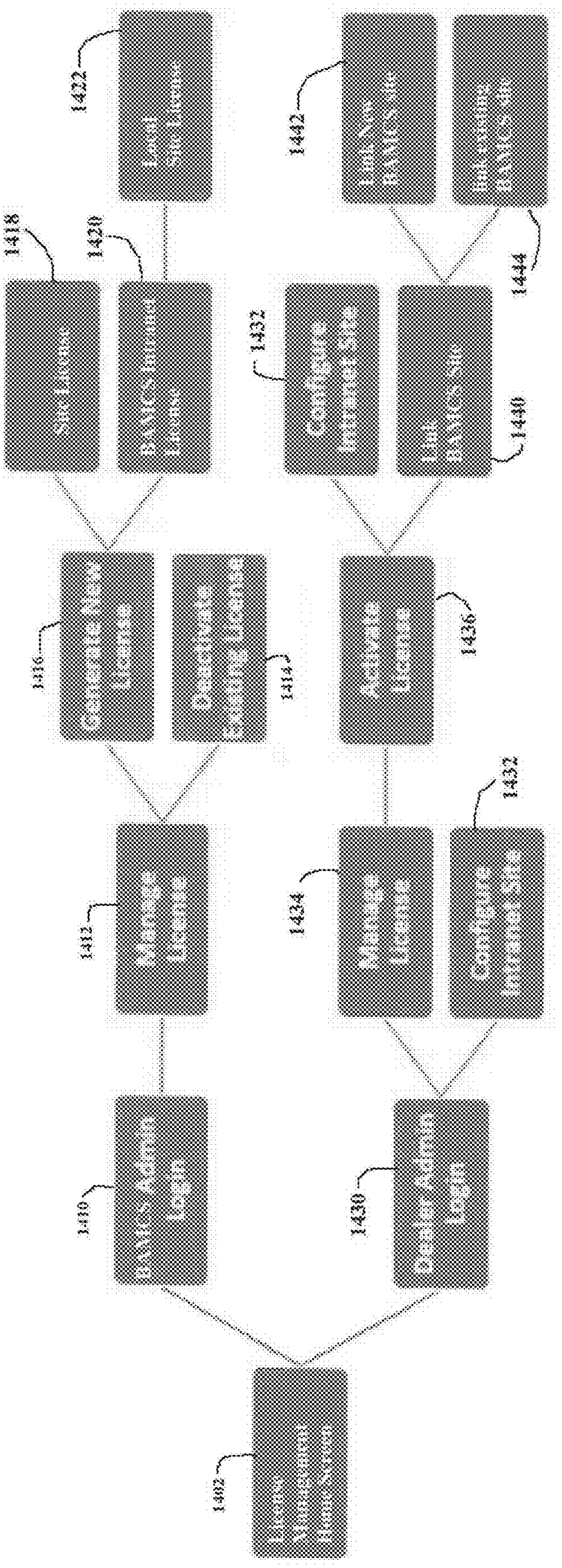
FIG. 14 is a schematic diagram of an exemplary map of screens accessed through the website for license generation and management, according to an embodiment.

FIG. 14 is a schematic diagram of an exemplary map of screens accessed through the website for license generation and management, according to an embodiment. A service provider admin or a dealer admin can access a License Management Home screen 1402 through the website 706. The License Management Home Screen 1402 can allow a service provider admin or a dealer admin to identify them-self as a service provider admin or a dealer admin.

After a service provider admin identifies himself as a service provider admin, he can log in to the license management system at the service provider admin login screen, also known as a BAMCS Admin Login screen 1410. The license management login screen can grant a service provider admin access to the license management system. After logging on as a service provider admin, the service provider admin can be granted access to the service provider Manage License screen 1412. From the service provider Manage License screen 1412, the service provider admin can access a Deactivate Existing License screen 1414. The Deactivate Existing License screen 1414 can allow a service provider admin to deactivate an existing license. An existing license is a permission that has already been granted to a user to use the BAMCS. From the manage license screen, the service provider admin can also access a service provider admin Generate New License screen 1416. The service provider admin Generate New License screen 1416 can allow the service provider admin to access the Remote Site License screen 1418. The Remote Site License screen 1418 can allow the service provider admin to grant a license to a user to connect at least one user site 402 to a remote interface module 422 of the BAMCS, as shown in FIG. 8. The service provider admin can also access the BAMCS Intranet License screen 1420. The BAMCS Intranet License screen 1420 can allow a service provider admin to grant a license to a user to use the BAMCS on a local intranet. The BAMCS Intranet License screen 1420 can also allow a service provider admin to access the Local Site License screen 1422, so that the service provider admin can grant a user a license to connect at least one user site to a local interface module running on a local intranet, as shown in FIG. 9.

The License Management Home Screen 1402 can allow a dealer admin to identify himself as a dealer admin. After a dealer admin identifies himself as a dealer admin, he can log in to the license management system at the Dealer Admin Login screen 1430. The License Management Login Screen 1402 can grant a dealer admin access to the license management system. After logging on as a dealer admin, the dealer admin can be granted access to the Configure Intranet Site screen 1432. The configure intranet site screen 1432 can allow a dealer admin to configure a user's intranet in a user's building to run the BAMCS system. Configuring a user's intranet site in a user's building can include downloading the BAMCS interface module, it can include downloading the BAMCS webservice module, it can include setting up the database, it can include entering the intranet web-socket URL and/or it can include entering the license number and license key. After logging on as a dealer admin, the dealer admin can also be granted access to the dealer admin Manage License screen 1434. The dealer admin Manage License screen 1434 can allow the dealer admin to manage an intranet license. Managing an intranet license can include activating a license, deactivating a license, and/or mapping a site. Mapping a site can include providing a websocket URL. The dealer admin Manage License screen 1434 can allow the dealer admin to access the Activate License screen 1436. The Activate License screen 1436 can allow a dealer admin to activate a user license generated by the service provider admin. The Activate License screen 1436 can also allow a dealer admin to access the Configure Intranet Site screen 1432. The Configure Intranet Site screen 1432 can allow the dealer admin to configure a user's intranet in a user's building to run the BAMCS system. The activate license screen 1436 can also allow a dealer to access the Link BAMCS Site screen 1440. The Link BAMCS Site screen 1440 can allow the dealer admin to link a user's site control module to an interface module of a BAMCS system. The Link BAMCS Site screen 1440 can allow a dealer to access the Link New BAMCS Site screen 1442 and the Link Existing BAMCS Site screen 1444. The Link New BAMCS Site module screen 1442 can allow a dealer admin to link a new user site control module 406 to an interface module 422 of a BAMCS. The Link Existing BAMCS Site screen 1444 can allow the dealer admin to link an existing user site control module 406 to an interface module 422 of a BAMCS.

Figure 15:
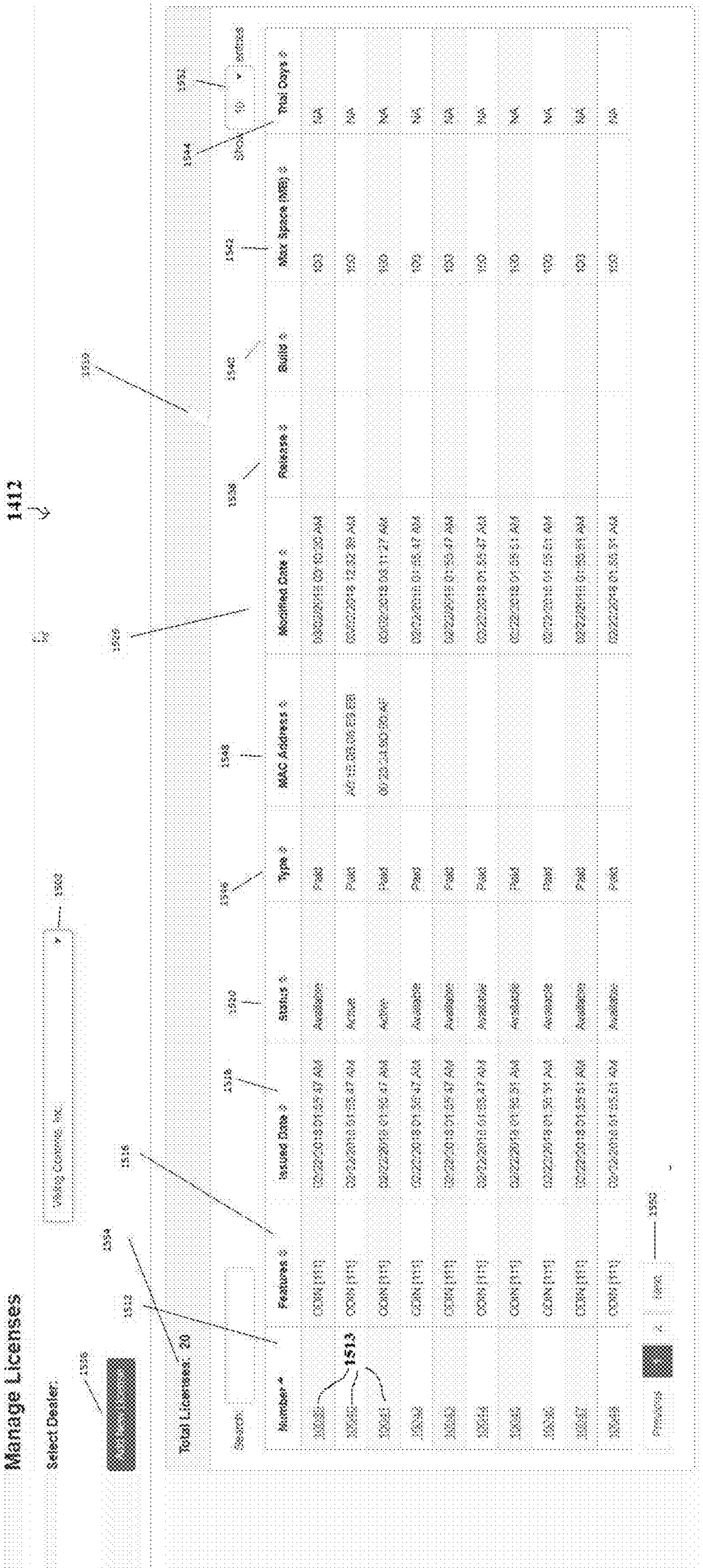
FIG. 15 is an exemplary diagram of a service provider admin license management screen, according to an embodiment.

FIG. 15 is an exemplary diagram of a service provider admin license management screen, according to an embodiment. The service provider admin Manage License screen 1412 allows the service provider admin to review and manage user licenses. User licenses can be sorted by dealer. The service provider admin license management screen can have a dealer selection box 1502, a data grid 1510, and an Add New License button 1536. Dealer selection box 1502 allows the service provider admin to select a dealer, and view all user licenses being serviced by that dealer. The exemplary dealer selection box 1502 can show names for dealers that have been set up and are available to receive new licenses. The Add New License button 1536 can allow the service provider admin to add new licenses for the selected dealer.

Multiple types of licenses can exist. A user can have a remote site license for a user site 402, wherein that user site can be connected to a remote interface module 422 located in a cloud or a remote database. A user can also have an intranet license to run a BAMCS, including an interface module, on an intranet in the user's building. A user with a BAMCS running on the user's intranet can have local site licenses for user sites that can be connected to the local interface module running on the user's intranet. A service provider admin can select a dealer, and the license data for that dealer can be fetched into the data grid 1510.

Data grid 1510 can have a column for selecting licenses, and can have various columns for different pieces of information, including but not limited to license number and status. Licenses can be displayed in rows, with the information about the licenses displayed in columns. Data grid 1510 can have a license number column 1512, a license features column 1516, an issue date column 1518, a status column 1520, a paid/trial type column 1546, a MAC address column 1548, a modified date column 1526, a build column 1530, a modified date column 1526, a release column 1528, a release column 1538, a build column 1540, a max space column 1542, and/or a trial days column 1544. A license number column 1512 can show the license numbers associated with the chosen dealer and chosen site. License numbers can be auto-generated and human readable. A manage-license hyperlink 1513 in column 1512 for each license can allow the service provider admin to click on a license to view its configuration and history, modify, upgrade, downgrade, and or cancel a license (explained more fully below). Features column 1516 can display the license features in a numerical format that can indicate whether or not various features, such as trends, schedules, and/or alarms have been turned on for that license. An issued date column 1518 can display the date each license was issued. A status column 1520 can display the status of each license. Statuses can include, but are not limited to, activation pending, applied for site, active, and deactivated. A paid/trial type column 1546 can display whether a license is a paid or trial version. A MAC Address column 1548 can display the MAC address tied to a specific active licenses. A modified date column 1526 can display the date the license was last modified. The Release column 1538 and Build columns 1540 show the software build (version) and release numbers for the BACMS which uses the license. The Max Space column 1542 shows the maximum configure space allowed for the site, and the trial days 1544 column shows the number of trial days that were specified for the license.

A service provider admin can modify the structure of an internet license. The manage license hyperlink 1513 associated with a license can allow the service provider admin to click on a license to view its configuration and history and can allow a service provider admin to modify an intranet license to upgrade and add trending, scheduling and/or alarming functions, and/or downgrade to remove functions. The service provider admin can also deactivate a license. A service provider admin can deactivate a license by clicking the manage license hyperlink 1513 corresponding to the desired license and then deactivating the license. The selected license(s) will be deactivated. A service provider admin can upgrade a license. A service provider admin can upgrade a license by clicking the manage license hyperlink 1513 and then upgrading the license to various features that can include trending, scheduling, alarming, and/or new features as they are developed. The service provider admin can also generate a new license. The service provider admin can generate a new license by clicking the generate new license button 1536. The generate new license button 1536 can bring up the generate new license screen 1416. The Generate New License screen 1416 can allow a service provider admin to select the Generate Site License screen 1418 or the generate intranet license screen 1420. The pagination controls 1550 allow the user to click to following pages or the next page if the list of license goes beyond the list that is visible. The Show number 1552 of entries control allows the user to specify more or less number of records to view on the page at once. The total licenses indicator 1554 shows the total number of license that have been created and assigned for the selected Dealer.

Figure 16:
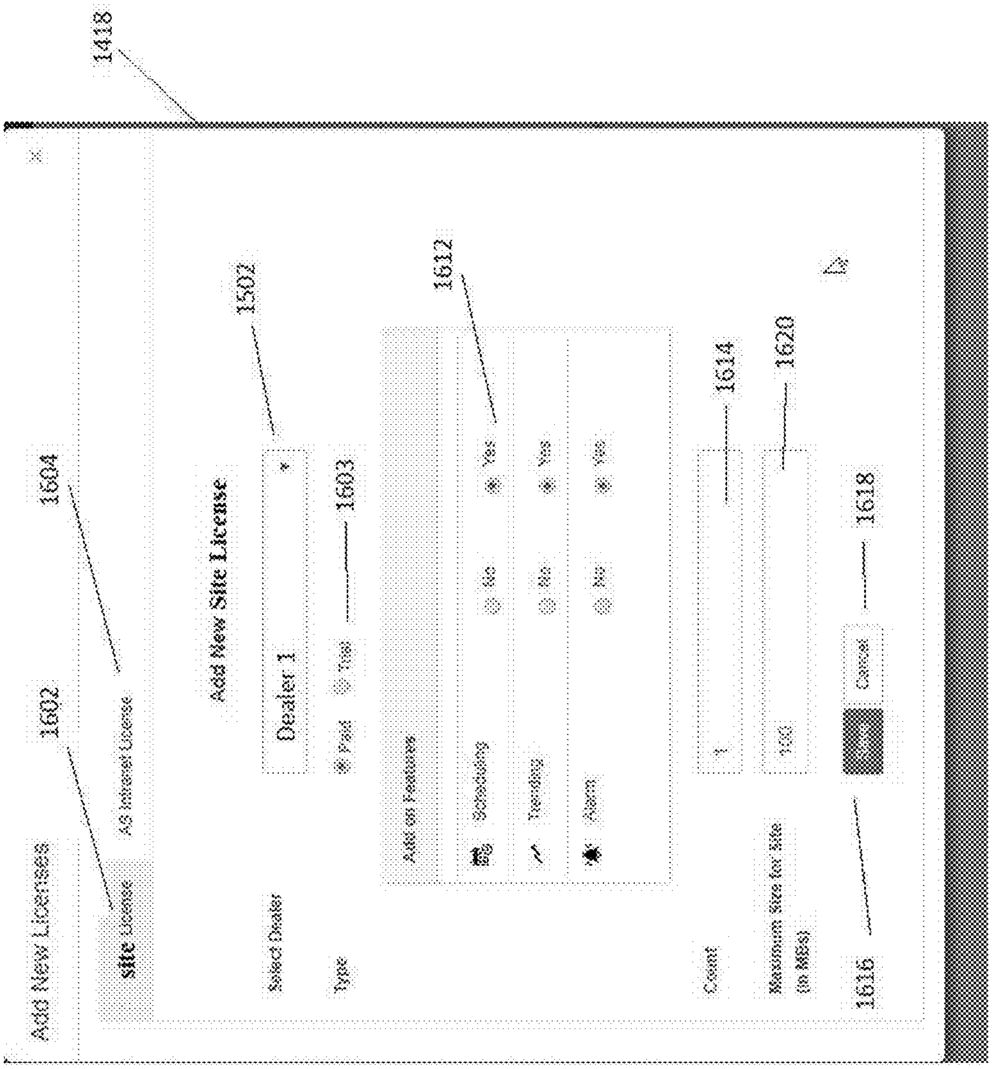
FIG. 16 is an exemplary display image of a screen for generating a new user site license, according to an embodiment.

FIG. 16 is a view of an exemplary screen for generating a new user site license, according to an embodiment. The Generate New Site License screen 1418 and the Generate Intranet License screen 1420 can have a site license tab 1602 and an intranet license tab 1604, which can allow the service provider admin to switch between the two license generating screens 1418 and 1420. When the site license tab 1602 is selected, the Generate New Site License screen 1418 is shown. When the intranet license tab 1604 is selected, the Generate New Intranet License screen 1420 can be shown (described more fully below). In various embodiments, generating a remote site license and generating a local site license can be done in the same screen or can be done in different screens.

The Generate New License screen 1418 allows a service provider admin to generate one or more new licenses that can grant a user permission to use the BAMCS system. If the site box on the previous service provider Manage License screen 1412 is set to cloud, the generate new license screen 1418 can allow the service provider admin to generate a license that can allow the user to connect to an interface module of a BAMCS located on a cloud or other remote server, as shown in FIG. 8. If the site box on the previous service provider Manage License screen 1412 is set to an intranet site, the generate new license screen 1418 can allow the service provider admin to generate a license that can allow the user to connect to an interface module of a BAMCS located on that selected intranet site, as shown in FIG. 9.

The Generate New License screen 1418 can have a dealer selection box 1502, a feature selection box 1612, type selection buttons 1603, a Maximum Size for Site box 1620, a license count box 1614, a save button 1616, and a cancel button 1618. The service provider admin can exit the Generate New License screen 1418 without generating a license by clicking the cancel button 1618. The dealer name can be preselected in the dealer selection box 1502 as the dealer name from the service provider admin license management screen 1412. The service provider admin can also be allowed to select a different dealer from a drop-down menu. The service provider admin can use the feature selection box 1612 to select features including but not limited to scheduling, trending, and audit logger. By selecting features, the service provider admin can grant access to the selected features to a licensed user. The service provider admin can use the license count box 1614 to select the number of licenses that will be generated under the selected dealer. Type selection buttons 1603 can allow the dealer to select a paid license or a trial license. The service provider can specify if the licenses being created are paid licenses or trial licenses. The service provider can specify how much disk storage is allowed per site by changing the maximum size value in the Maximum Size for Site box 1620. The service provider admin can generate the licenses by clicking the save button 1616. When the service provider admin clicks the save button 1616, the selected number of licenses with the selected features will be allocated to the selected dealer. Each license can have a separate license key. After the site licenses are generated by the service provider admin, the dealer admin can see the allocated site licenses in his allocated licenses list.

Figure 17:
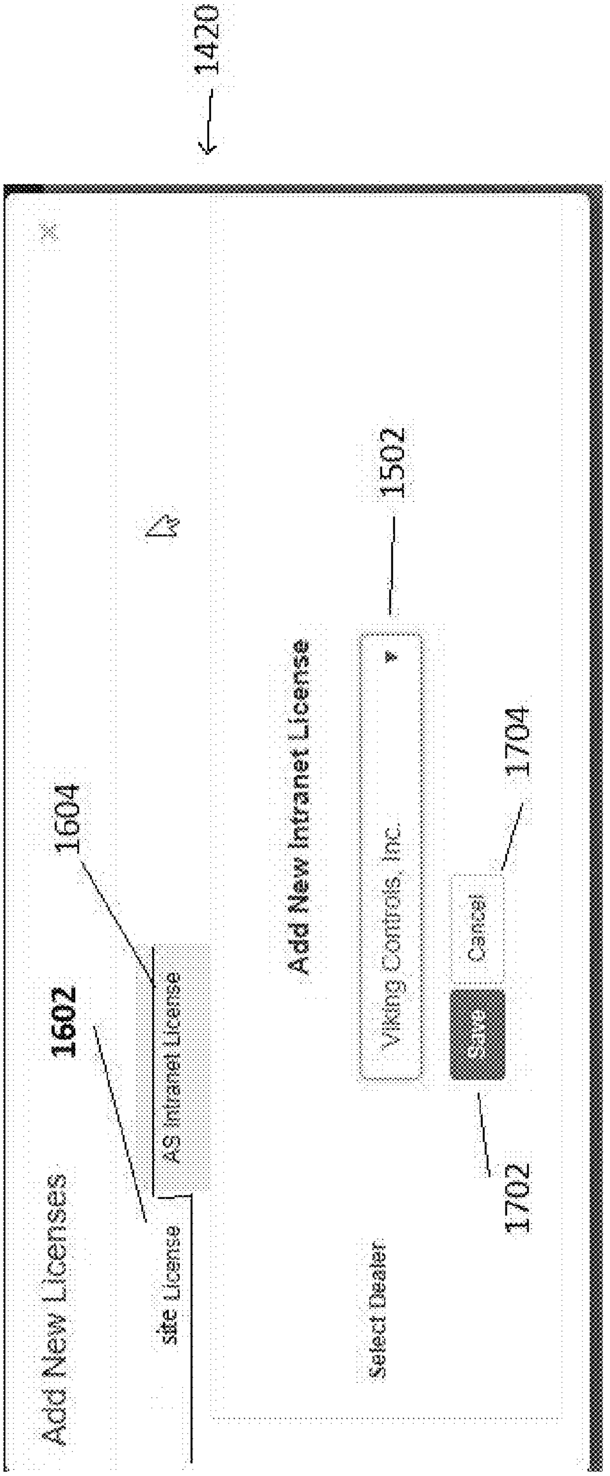
FIG. 17 is an exemplary diagram of a screen for generating a new intranet license, according to an embodiment.

FIG. 17 is an exemplary screen for generating a new intranet license, according to an embodiment. The Generate New Internet License screen 1420 can allow a service provider admin to generate a new intranet license that can allow a user to operate at least a portion of a BAMCS on the user's local intranet. The service provider admin can access the Generate New Intranet License page 1420 by selecting the intranet license page from the Generate New License screen 1416, or by clicking on the intranet license tab 1604 from the Generate New Site License screen 1418. The Generate New Intranet License page 1420 can have a dealer selection box 1502, a save button 1702, and a cancel button 1704. The service provider admin can click the cancel button 1704 to leave the Generate New Intranet License screen 1420 without generating a new license. The service provider admin can use the dealer selection box 1502 to select a dealer. The service provider can click the save button 1702 to generate a new intranet license for the selected dealer. When the service provider admin clicks the save button 1702, a new intranet license can be generated, and the generate new local site license screen 1422 can appear. The new intranet license will be available in the dealer admin Manage License screen 1434.

Figure 18:
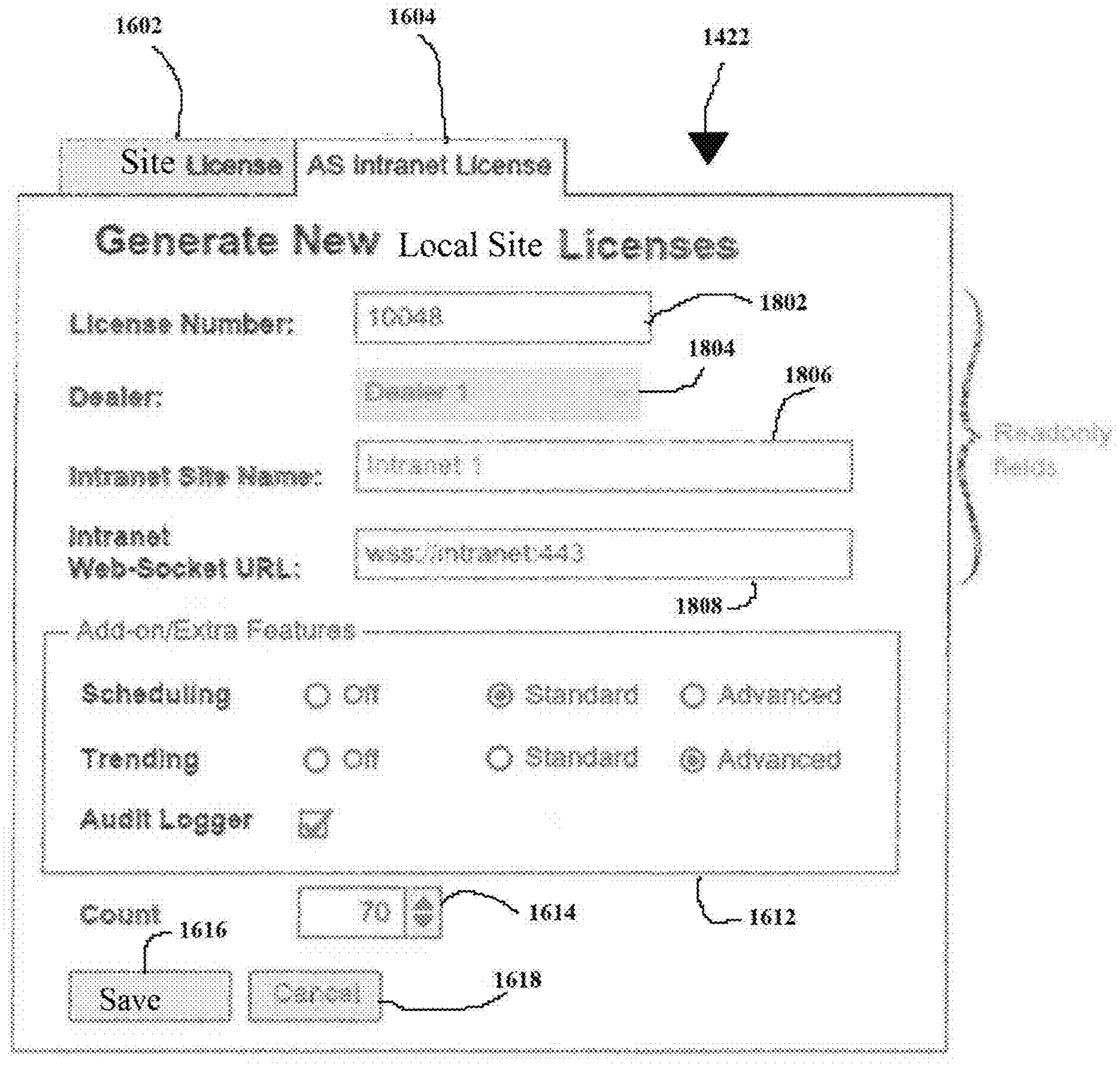
FIG. 18 is an exemplary diagram of a screen for generating a new local site license, according to an embodiment.

FIG. 18 is an exemplary diagram of a screen for generating a new local site license, according to an embodiment. The Generate New Local Site License screen 1422 can allow a service provider admin to generate at least one new local site license associated with the new intranet license generated in the Generate New Intranet License screen 1420. The Generate New Intranet License screen 1422 allows the service provider admin to generate a license for a user to connect a site control module to an interface module of a BAMCS running on a local intranet. The generate new local license screen 1422 can have a license identification number box 1802, a dealer box 1804, an intranet site name box 1806, an intranet web-socket URL box 1808, a features box 1612, a count selector 1614, a save button 1616, and a cancel button 1618. The license number box 1802 can display an identification number for the intranet license allowing the user to run a BAMCS on a local intranet. This can be the intranet site that the local site licenses will be associated with after they are generated by this Generate New Local License screen 1422. The dealer box displays the name of the dealer who can be servicing the intranet license shown in box 1802 and/or the local site license that will be generated through the generate new local site license screen 1422. The intranet site name box 1806 displays the name of the intranet site associated with the license shown in license number box 1802. This is the name of the intranet site that the local licenses can be associated with after they are generated. The intranet Web-socket URL box 1808 displays the web-socket URL for the license shown in boxes 1802 and 1806. The license number box 1802, dealer box 1804, intranet site name box 1806, and intranet web-socket URL box 1808 can be read-only, and not allow the service provider admin to enter or change information that appears in them. The local licenses that can be generated through the new local license screen 1422 can allow a user to connect to the associated local intranet BAMCS shown in boxes 1802 and 1806 with the web-socket URL shown in box 1808. In some embodiments, these local site licenses that are associated with the identified intranet site may not allow a user to connect to a different local intranet BAMCS or a remote BAMCS, however in various embodiments these local site licenses may allow a user to connect to his choice of local or remote BAMCS, or can be modified to allow the user's site to be connected to an alternate BAMCS.

As explained above in regard to FIG. 16 and the Generate New Site License screen 1418, the feature selection box 1612 allows the service provider admin to select the features for the site license. The service provider admin can use the license count box 1614 to select the number of licenses that will be generated, and associated with the intranet license displayed in boxes 1802 and 1806. The cancel button 1618 allows the service provider admin to leave the generate new local site license screen 1422 without generating a new site license. The save button 1616 can cause the selected number of license(s) with the selected features to be generated and associated with the displayed intranet license and dealer. After a license is generated, it will appear in the associated dealer's license management system.

Figure 19:
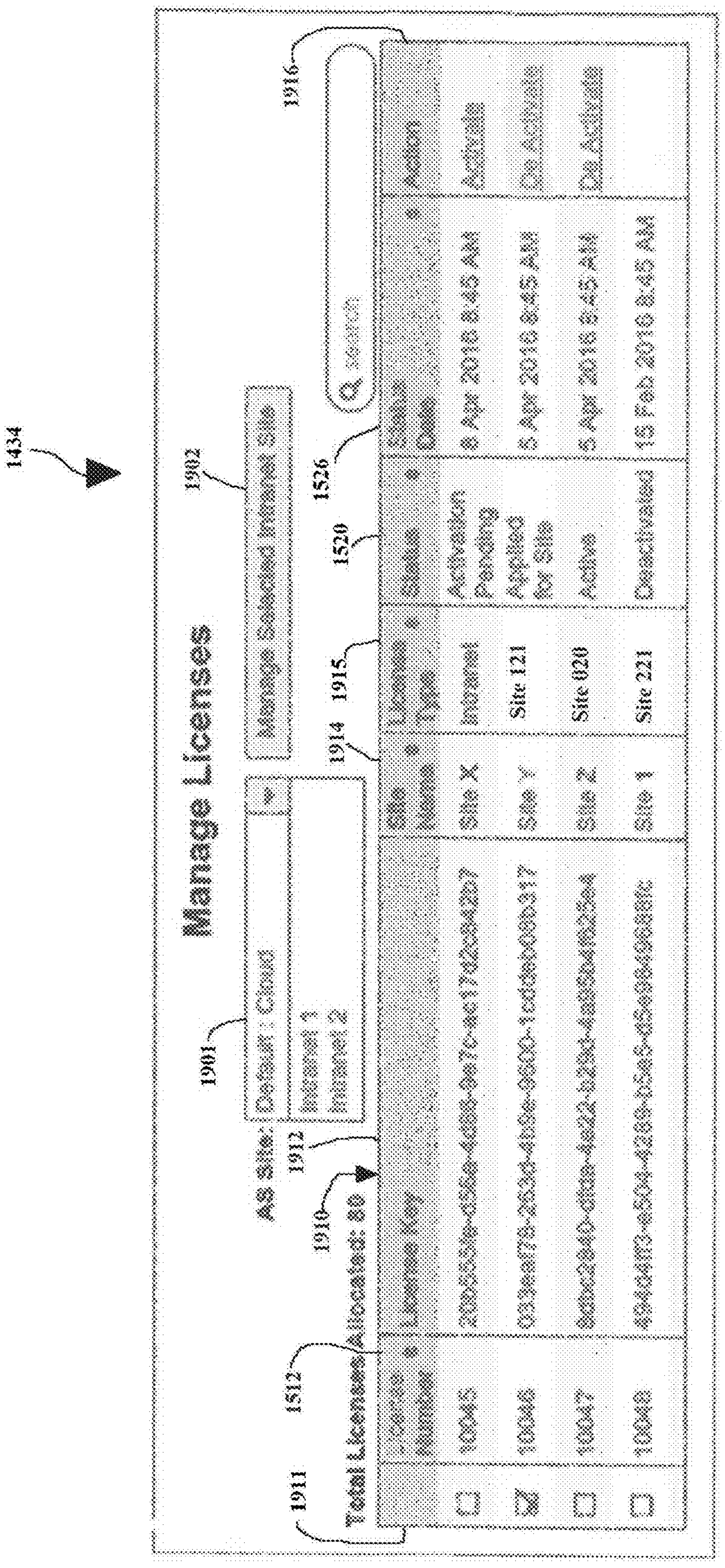
FIG. 19 is an exemplary diagram of a dealer administrator manage license screen, according to an embodiment.

FIG. 19 is a view of an exemplary dealer admin manage license screen, according to an embodiment. The dealer admin Manage License screen 1434 can display licenses created by the service provider admin in any of the above processes. The dealer admin Manage License screen 1434 can have a site selection box 1901, a manage selected intranet site button 1902, and a dealer admin data grid 1910. The site selection box can allow the dealer admin to select a site, and can allow the dealer admin to manage all license functions associated with the selected site, create groups of objects (points), assign site users, set users permissions and set up alarm notifications. A dealer admin can manage all license types using the website through the remote server. After the dealer selects a site, license(s) associated with the selected site can appear in the dealer admin data grid 1910. The displayed licenses can be an intranet license and/or site licenses that can be local site license or remote site licenses. The dealer admin data grid 1910 can have a license selection column 1911, a license number column 1512, a license key column 1912, a site name column 1914, a license type column 1915, a status column 1520, a status date, or modified date, column 1526, and an action column 1916. License selection column 1911 can allow the dealer admin to select a license. License key column can display the key generated for that license. Site name column 1914 can display the name associated with the site for which the license has been granted. License type column 1915 can indicate the type of license, such as intranet license or a remote site license. The action column 1916 can have clickable links to pages that allow the dealer to perform actions that can include, but not limited to, activate, deactivate, and map site URL. Newly generated licenses can appear in the dealer admin data grid 1910, but they may not have a license key until the dealer admin maps the site for a site control module license, or activates the license for a intranet license. To generate a license key for a site control module the dealer admin can map the site for the site control module. A dealer can reach the link new BAMCS site screen 1442 or the link existing BAMCS site screen 1444 by clicking on the map site URL action in the action column 1916.

A dealer admin can configure an intranet site by downloading the BAMCS and installing it on an on-premise server. A dealer admin can generate a license key for an intranet license by activating the intranet site. A dealer can activate the license by clicking on an activate link in the action column 1916. The dealer admin can enter the license number and license key, and can activate the license. After the intranet license has been activated, the dealer admin can link local site control modules to an interface module of a BAMCS running on the local intranet. The dealer admin can link the new or existing local site control modules to a local interface module on a local intranet from the link new BAMCS site screen 1442 or the link existing BAMCS site screen 1444. The dealer admin can link the local site control module by providing the license number and selecting the control module site name. The dealer admin can also use the link new BAMCS site screen 1442 or the link existing BAMCS site screen 1444 to link remote site control modules.

Figure 20:
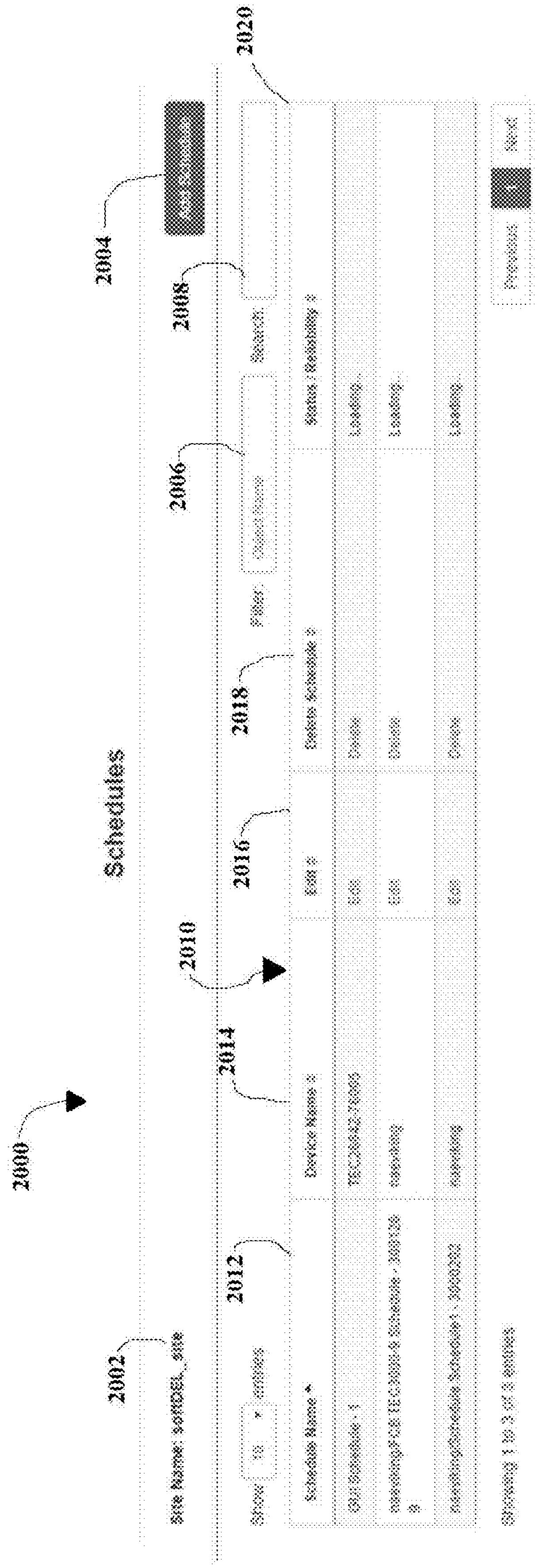
FIG. 20 is an exemplary diagram of a screen for managing schedules, according to an embodiment.

FIG. 20 is an exemplary diagram of a screen for managing schedules, according to an embodiment. A schedule can command one or more objects of a device according to a calendar or time based period. A schedule management screen 2000 can allow a user to manage a schedule, and multiple schedules can be managed through the schedule management screen 2000. A schedule management screen 2000 can have a site name identifier 2002, an add schedules button 2004, a filter function 2006, a search function 2008, and a schedule management grid 2010. A schedule management grid 2010 can have a schedule name column 2012, a device name column 2014, an edit column 2016, a delete schedule column 2018, and a status/reliability column 2020. A dealer admin, a building manager, or other user can use the schedule management screen 2000 to manage a schedule of a device at a site. A site can be selected, and the selected site name appears in the site name identifier 2002. The schedule management grid 2010 can display the existing schedules at the named site. Clicking the add schedule button 2004 can allow a dealer admin, building manager, or other user to create a new schedule. A dealer admin, building manager, or other user can use the filter function 2006 to filter the schedules shown in the schedule management grid 2010. The schedules can be filtered by object name. A dealer admin, building manager, or other user can use the search function 2008 to search for schedules in the schedule management grid 2010 by schedule name, device name, or other properties.

The schedule management grid 2010 can display various properties of one or more schedules. The schedule name column 2012 can display the names of one or more schedules. Each entry or button in a row can be associated with the schedule that is named in the schedule name column 2012 in that row. The device name column 2014 can display the name of a device associated with the schedule that is named in the schedule name column 2012. The edit column 2016 can have an edit schedule button 2022 associated with the schedule that is named in the schedule name column 2012. Clicking on the edit schedule button 2022 can allow the named schedule to be edited. The delete schedule column 2018 can have a delete schedule button 2024 associated with the named schedule. Clicking on the delete schedule button 2024 can allow the named schedule to be deleted. The status/reliability column 2020 can provide various data including the status and/or reliability of the named schedule and or the device associated with the named schedule. When a dealer admin, building manager, or other user clicks on the add schedule button 2004, or the edit schedule button 2022, a configure schedules screen can appear.

Figure 21A:
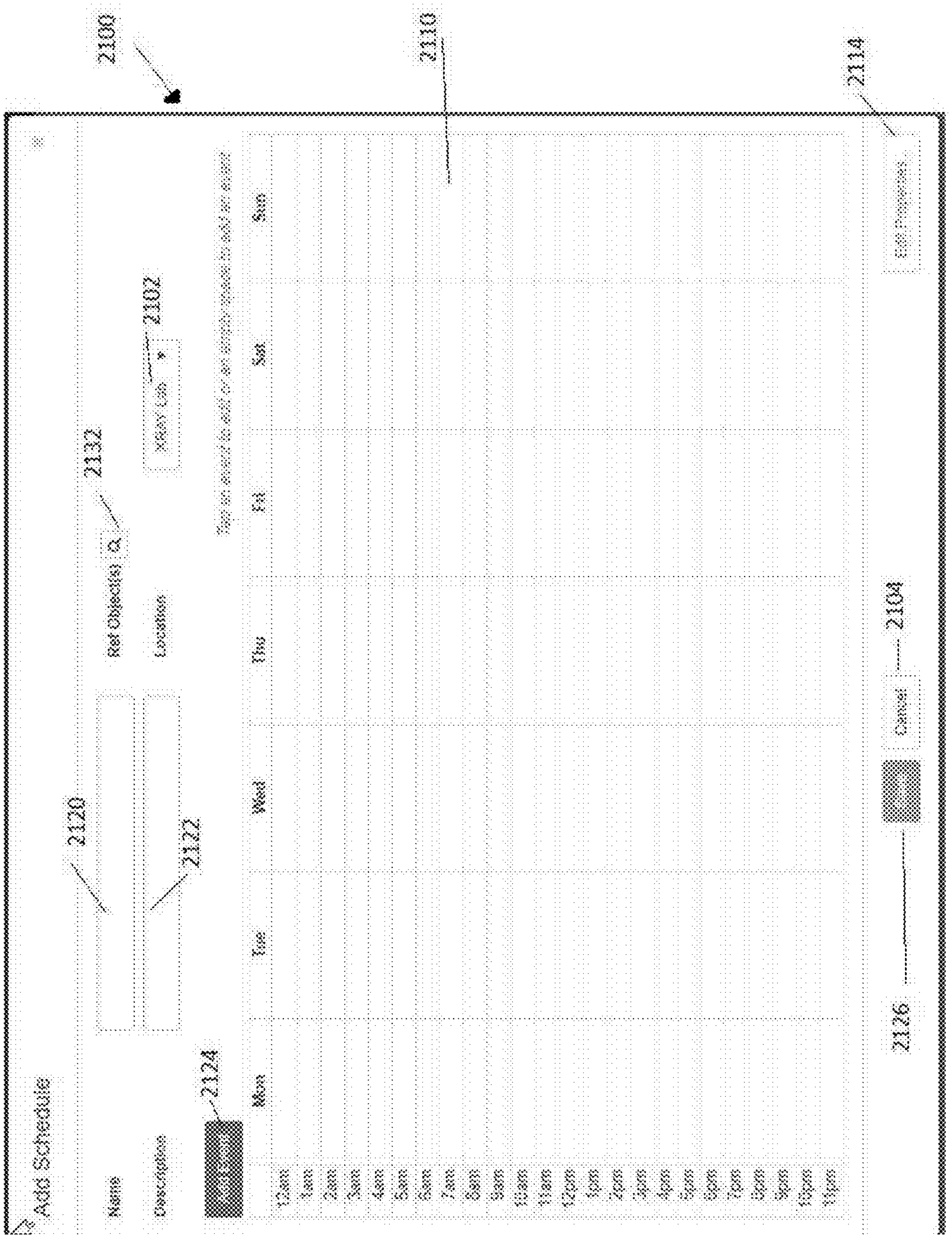
FIG. 21*a* is an exemplary diagram of a screen that can be used to configure schedules, according to an embodiment.

FIG. 21*a* is an exemplary diagram of a screen that is used to configure schedules, according to an embodiment. A configure schedules screen 2100 can allow a dealer admin, building manager, or other user to configure one or more properties of a schedule for a device. A configure schedules screen 2100 can have a Schedule Name box 2120, a Reference Object lookup 2132, a Description box 2122 and a location name identifier 2102, a cancel button 2104, and/or a weekly calendar events grid 2110. A location name identifier 2102 can provide the name of the location where the schedule can run or be managed, and the location can be a device or a site control module. The Add Event 2124 button can be used to create an event for a particular day, time and reoccurrence. The cancel button 2104 can allow the dealer admin, building manager, or other user to return to the previous screen without saving the configuration of the schedule. The Save Button 2126 can be used to save the configuration of the schedule. The edit properties button 2114 can allow a dealer admin, building manager, or other user to enter the Edit Properties screen, and edit the properties an existing schedule.

Figure 21B:
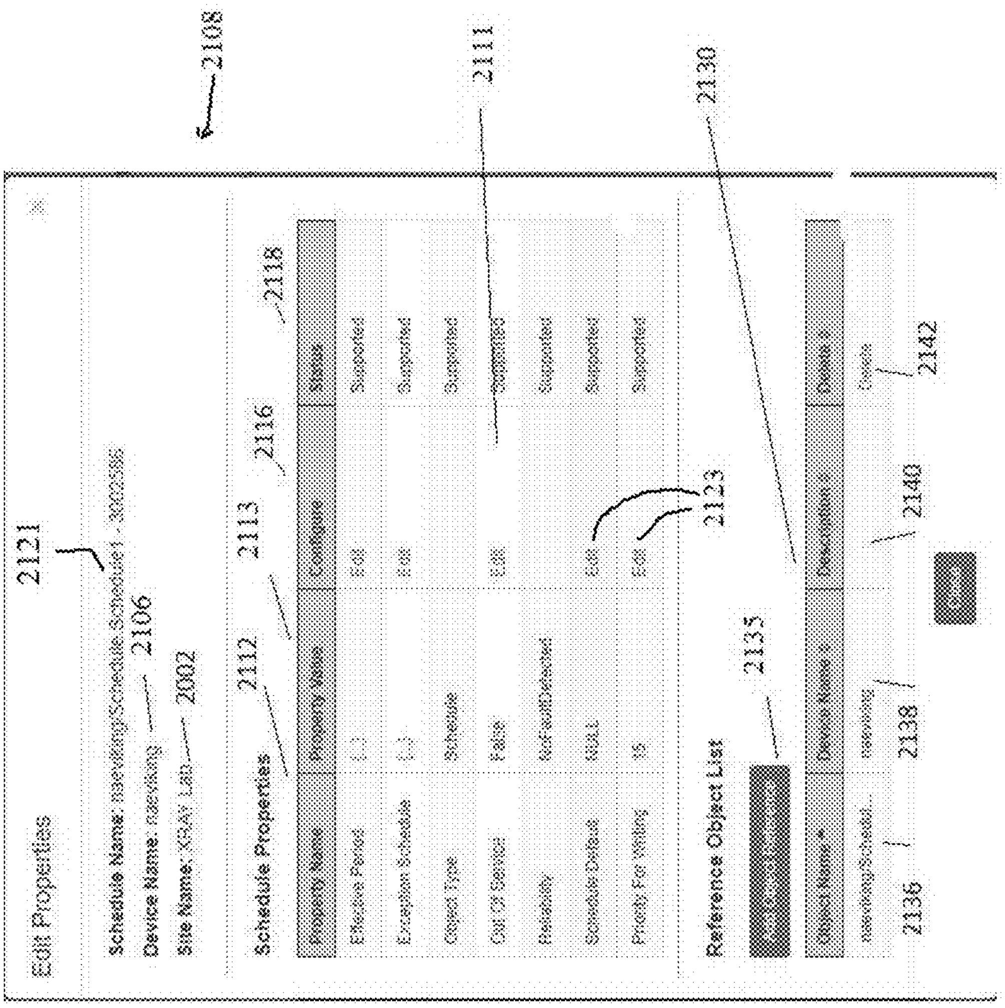
FIG. 21*b* is an exemplary diagram of an edit properties screen that can be used to configure properties of a schedule, according to an embodiment.

FIG. 21*b* is an exemplary diagram of an edit properties screen that can be used to configure properties of a schedule, according to an embodiment. An edit properties screen 2108 can have a schedule name identifier 2121, a device name identifier 2106, a site name identifier 2002, an object properties grid 2111, an add object reference button 2133, and a reference object grid 2130. The device name identifier 2106 identifies the device for which the schedule is being configured. The object properties grid 2111 can have a property name column 2112, a property value column 2113, a configure column 2116, and/or a status column 2118. The property name column 2112 can display the names of one or more properties of the schedule being configured. The properties can include effective period, exception schedule, object name, object type, out of service, reliability, weekly schedule, schedule default, and/or priority for writing. The property value column 2113 can display the values of the one or more properties of the schedule being configured. Configuring a schedule can include providing and/or changing property values of various properties. The configure column 2116 can have an edit property button 2123 that can be associated with the property listed in that row. The edit property button 2123 can allow the property value to be provided and/or changed. The status column 2118 can display information about the availability of intrinsic support for the property in that row. Properties that are supported on the device can run intrinsically on the device, and unsupported properties can run algorithmically on the site control module.

The reference object grid 2130 can include an add object reference object button 2133, an object name column 2136, a device name column 2138, a reference object description column 2140, and/or a delete reference object column 2142. The reference object grid 2130 can include information about a device for which a schedule can be configured, such as the device that is named in the device name identifier 2106.

The name of the device can appear in the device name column 2138. The reference object name column 2136 can include the reference object name, which can be a human-provided name that can supplement the device name. The reference objects description column 2140 can provide a description of the reference object. The delete reference object column 2142 can allow the dealer admin, building manager, or other user to delete the reference object in that row. The add reference object button 2132 can allow a new reference object to be added. Clicking the add reference object button 2132 can cause a screen to appear that is used for choosing reference objects to have scheduled.

Figure 21C:
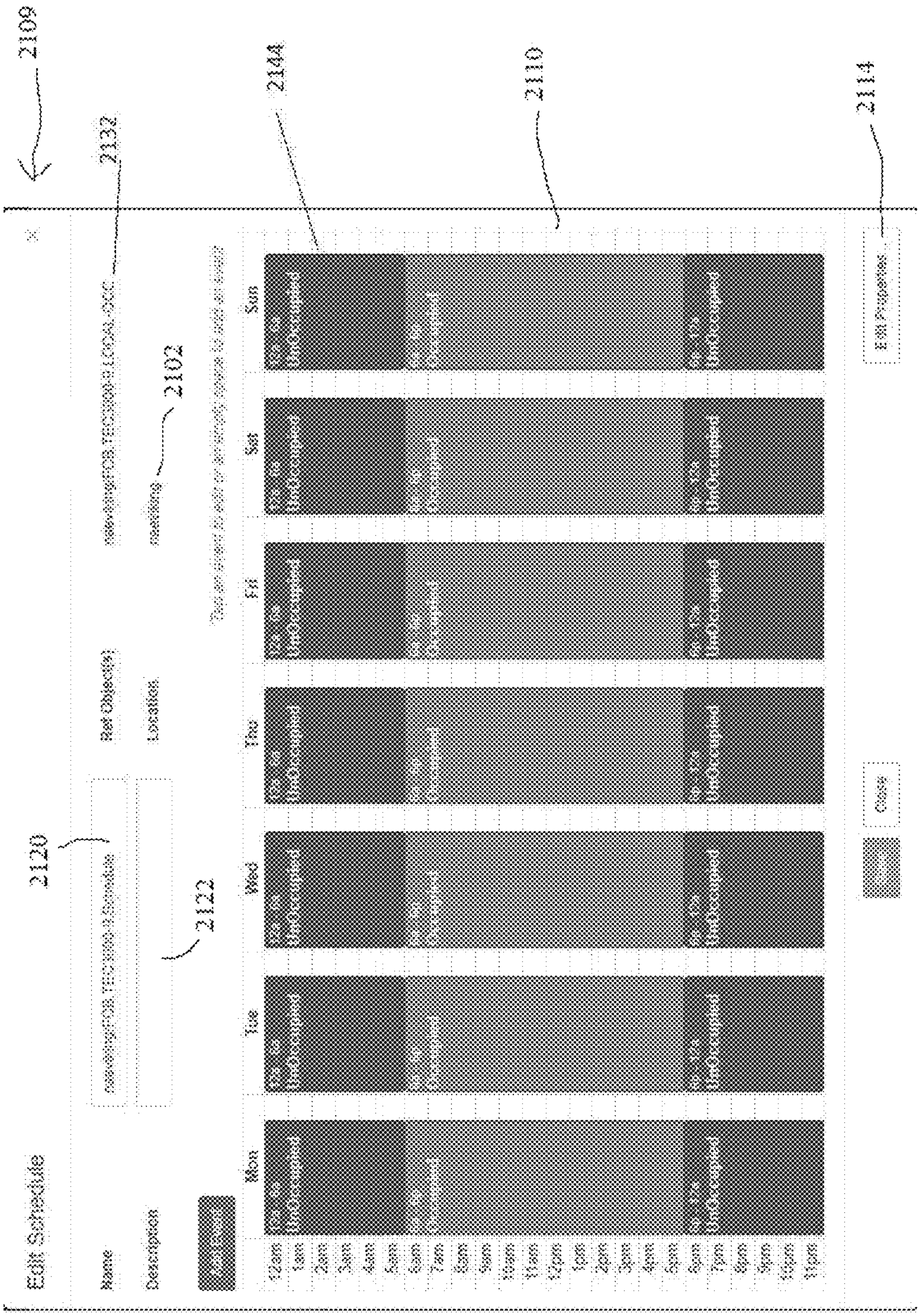
FIG. 21*c* is an exemplary diagram of an edit schedule screen that can be used to edit an existing schedule, according to an embodiment.

FIG. 21*c* is an exemplary diagram of an edit schedule screen that can be used to edit an existing schedule. An Edit Schedule screen 2109 can have a schedule name box 2120, a description box 2122, a reference object identifier 2135, and/or a location identifier 2102. An Edit Schedule screen 2109 can have a weekly calendar events grid 2110. The schedule's events 2144 are shown in weekly calendar events grid 2110 for the schedule being edited. Event 2144 can show the time range that the event is for and the value that the event will send to the reference object 2132. Clicking on an event 2144 can cause an Edit Event box to appear.

Figure 21D:
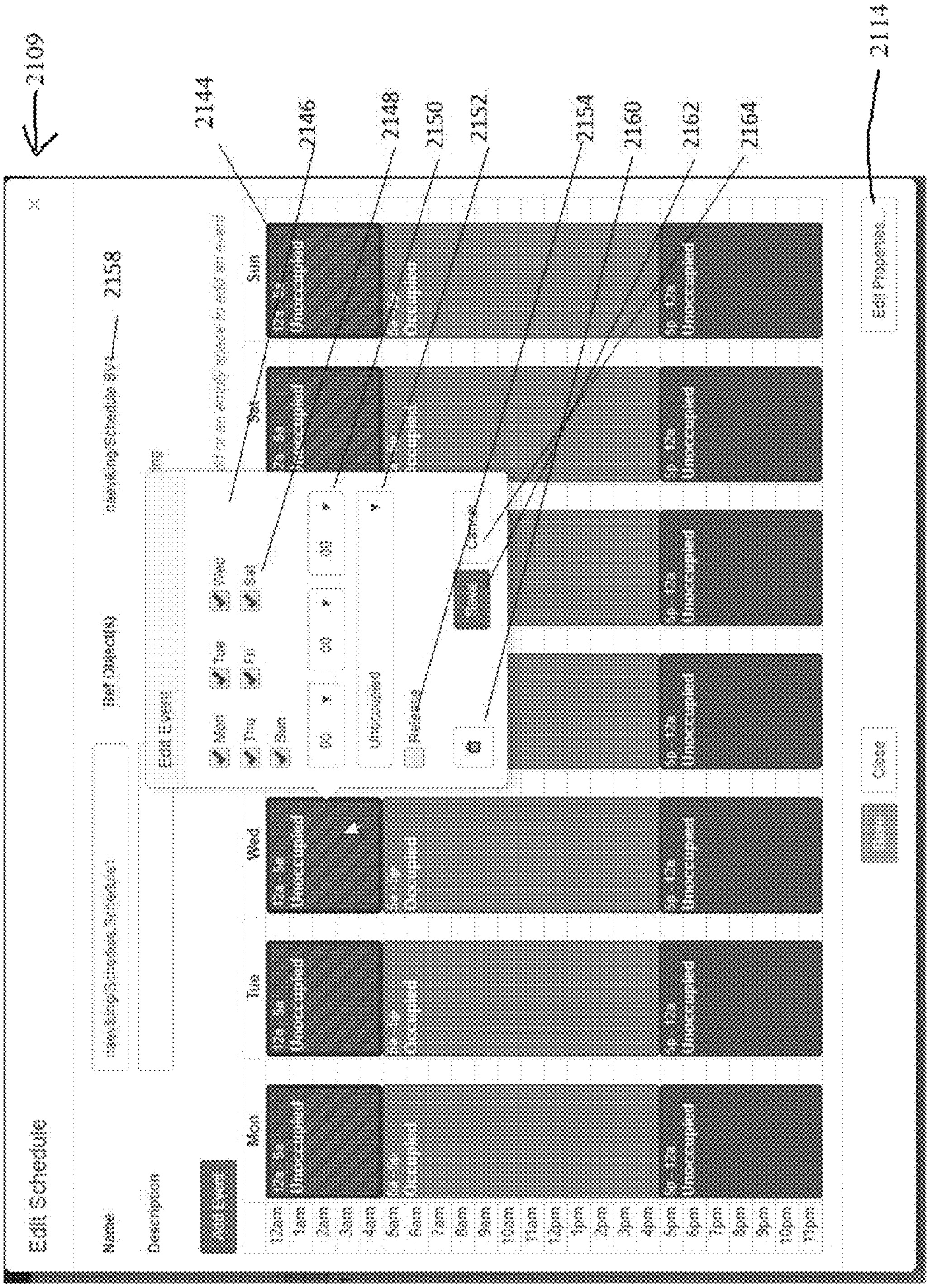
FIG. 21*d* is an exemplary diagram of an edit event screen that can be used to show and/or edit a particular event in a schedule, according to an embodiment.

FIG. 21*d* is an exemplary diagram of an edit event screen that can be used to show and/or edit a particular event in a schedule. When the user clicks on a particular event 2144, the event can highlight on the screen, and Edit Event popup box 2146 can display on the screen. Edit event popup box 2146 can include days of the week checkboxes 2148, time selection boxes 2150, value selection box 2152, a send release (reset) BACnet code checkbox 2154, a trash button 2160, save button 2162, and/or cancel button 2164. The user can change the days that the event 2144 applies to by checking or unchecking the days of the week checkboxes 2148. The user can change the time that the event applies to by using the time selection boxes 2150. The user can use the value selection box 2152 to set the value to be sent to the reference object shown in the reference object identifier 2158. The user can use the release (reset) BACnet code checkbox 2154 to send a release (reset) BACnet code to the reference object shown in the reference object identifier 2158. The user can delete the event using the trash icon 2160, or can save the configuration using the save button 2162, or cancel out of the dialog box using the cancel button 2164.

Figure 22:
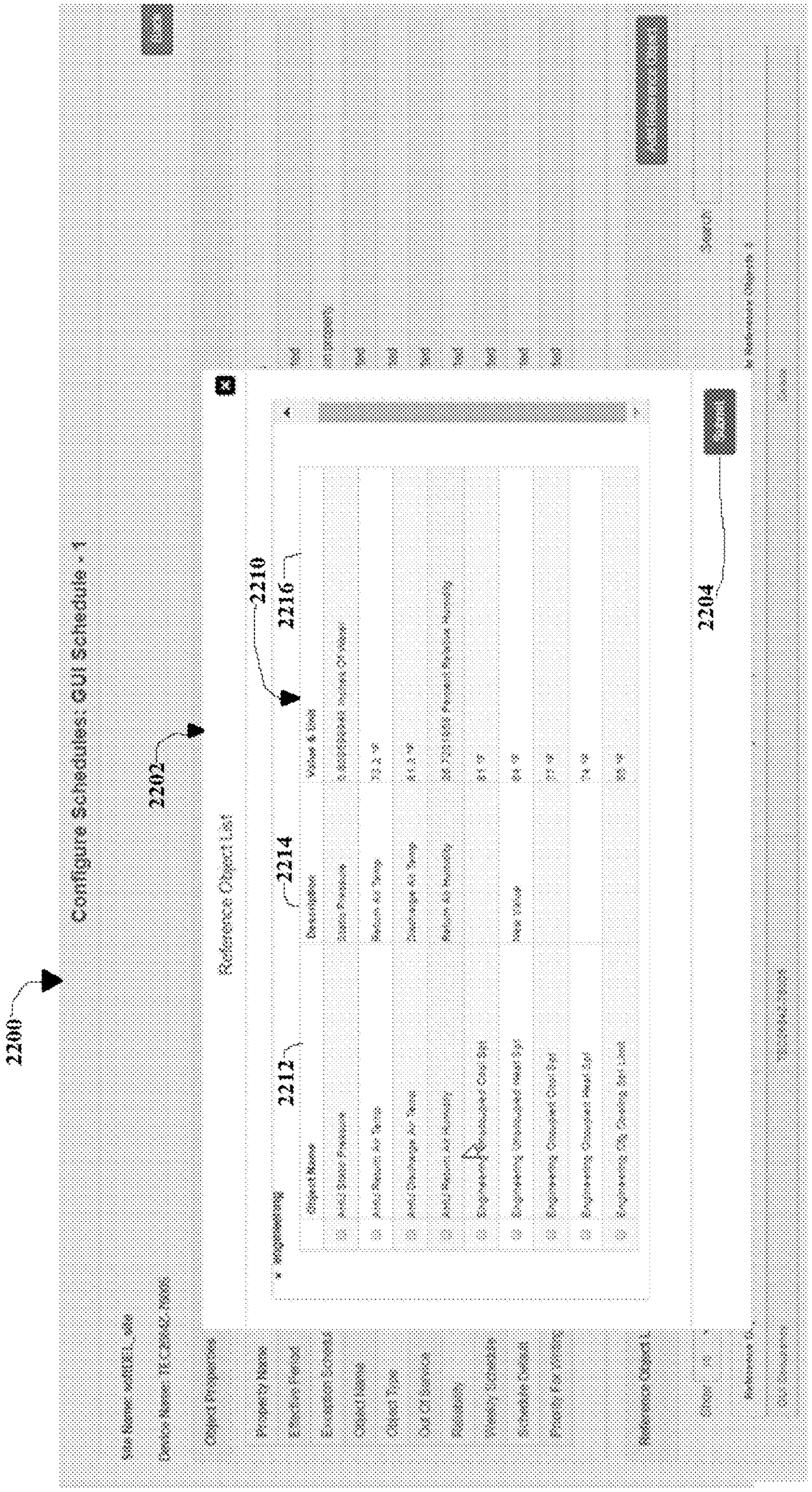
FIG. 22 is an exemplary diagram of a screen that can be used to choose reference objects to have scheduled, according to an embodiment.

FIG. 22 is an exemplary diagram of a screen that is used to choose reference objects to have scheduled, according to an embodiment. A reference object selection screen 2200 can allow a dealer admin, building manager, or other user to choose reference objects to have scheduled. The reference object selection screen 2200 can include a reference object list 2202 that can be a reference object grid 2210, and a submit button 2204. The reference object list 2202 can include a list of objects that can be selected for scheduling. The reference object grid 2210 can include an object name column 2212, a description column 2214, a value and unit column 2216, and/or a selection box column 2218. The object name column 2212 can include a list of at least one object, by name, that can be selected for scheduling. The object names can be human-provided names for specific objects. The description column 2214 can include a description of the objects named in the object name column. These descriptions can include, for example, static pressure, return air temperature, discharge air temperature, return air humidity, and/or other descriptions of other objects. The value and unit column 2216 can include the value and unit of the object named in the object name column 2212 for that row. This column can include temperature data, humidity data, pressure data, and/or other data.

A dealer admin, building manager, or other user can select an object to be scheduled by clicking on the selection box in the selection box column 2218 that is in the same row as the desired object to be scheduled. After an object to be scheduled is selected by clicking on the associated selection box, the submit button 2204 can be clicked to submit the selected object for scheduling. In alternate embodiments, the name of the object to be scheduled can be clicked, or other means for selecting an object to be scheduled can result in the object being selected to be scheduled. The configure schedules screen 2100 can then appear with the selected object for the selected device and the selected site provided, so that the object can be scheduled.

Figure 23:
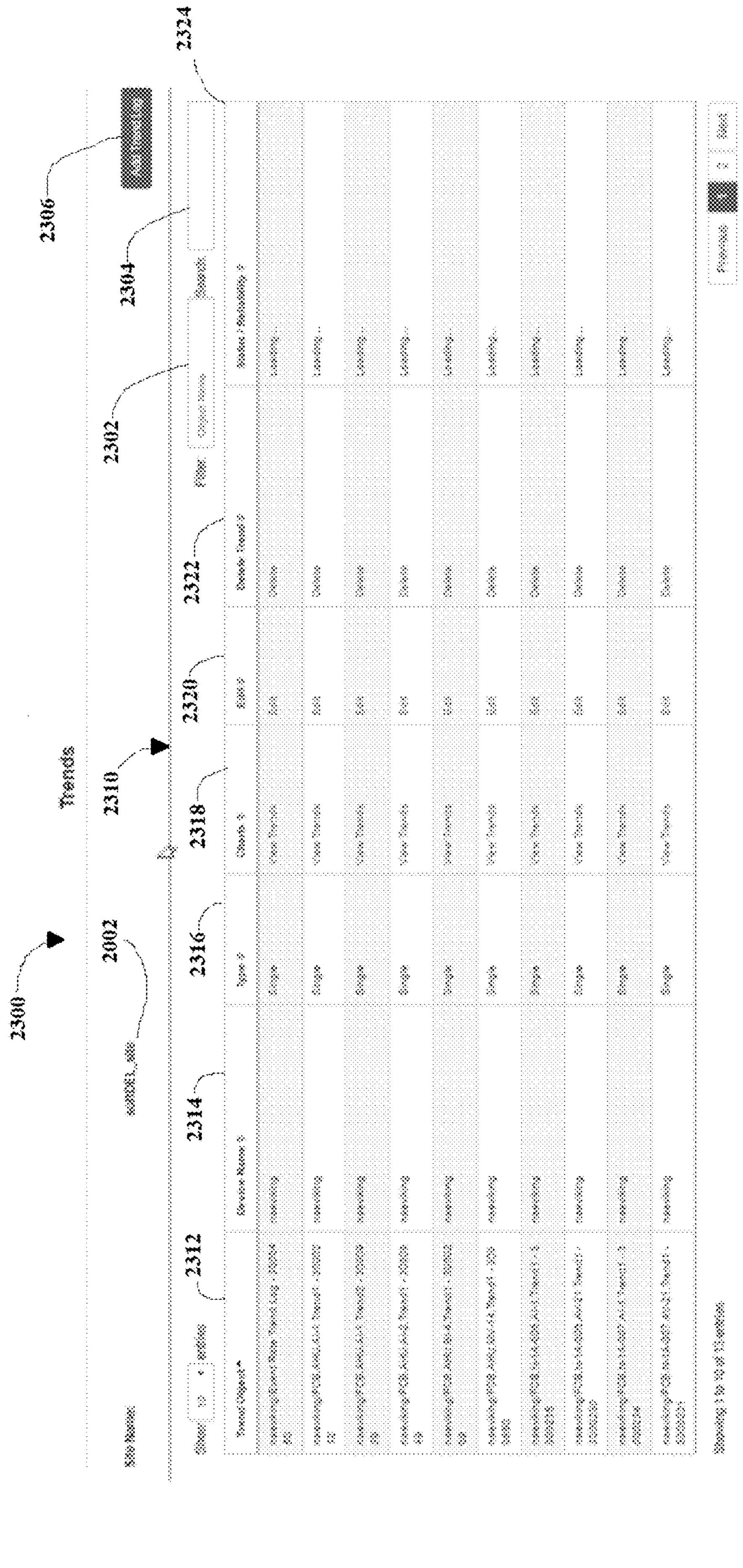
FIG. 23 is an exemplary diagram of a screen for managing trend logs, according to an embodiment.

FIG. 23 is an exemplary diagram of a screen for managing trend logs, according to an embodiment. A trend log is a collection of device object property values that are saved over time. A building manager or other user can then view the trend log data to see how a device object is behaving over time. A manage trend logs screen 2300 can allow a dealer admin, building manager, or other user to manage trend logs for various objects. A manage trend logs screen 2300 can have a site name identifier 2002, a filter box 2302, a search box 2304, an add trend log button 2306, and/or a manage trends grid 2310. The site name identifier 2002 can include the name of the site where the trend logs are being managed. The filter box 2302 can allow the manage trends grid to be filtered by object name. The search box 2304 can allows the manage trends grid to be searched by keyword, device name, and/or other data. The add trend log button 2306 can allow the dealer admin, building manager, or other user to add a trend log that can appear in the manage trends grid 2310.

The manage trends grid 2310 can have a trend object column 2312, a device name column 2314, a type column 2316, a charts column 2318, an edit column 2320, a delete trend column 2322, and/or a status/reliability column 2324. The trend object column 2312 can include the names of trend logs for at least one object. Trend logs can include information indicating object data over time. The device name column 2314 can include the name of the device associated with the object trend shown in column 2312. The type column 2316 can describe the type of trend shown in column 2312. The chart column 2318 can include clickable links that can allow the dealer admin, building manager, or other user to view a chart containing object data over time for the object trend shown in column 2312. The edit column 2320 can have clickable links that can allow the dealer admin, building manager, or other user to edit the trend object shown in column 2312. The delete trend column can have clickable links that can allow the dealer admin, building manager, or other user to delete the trend log for the trend object shown in column 2312. The status/reliability column 2324 can contain additional information about the status, reliability, and/or other information about the trend log of that row.

Figure 24:
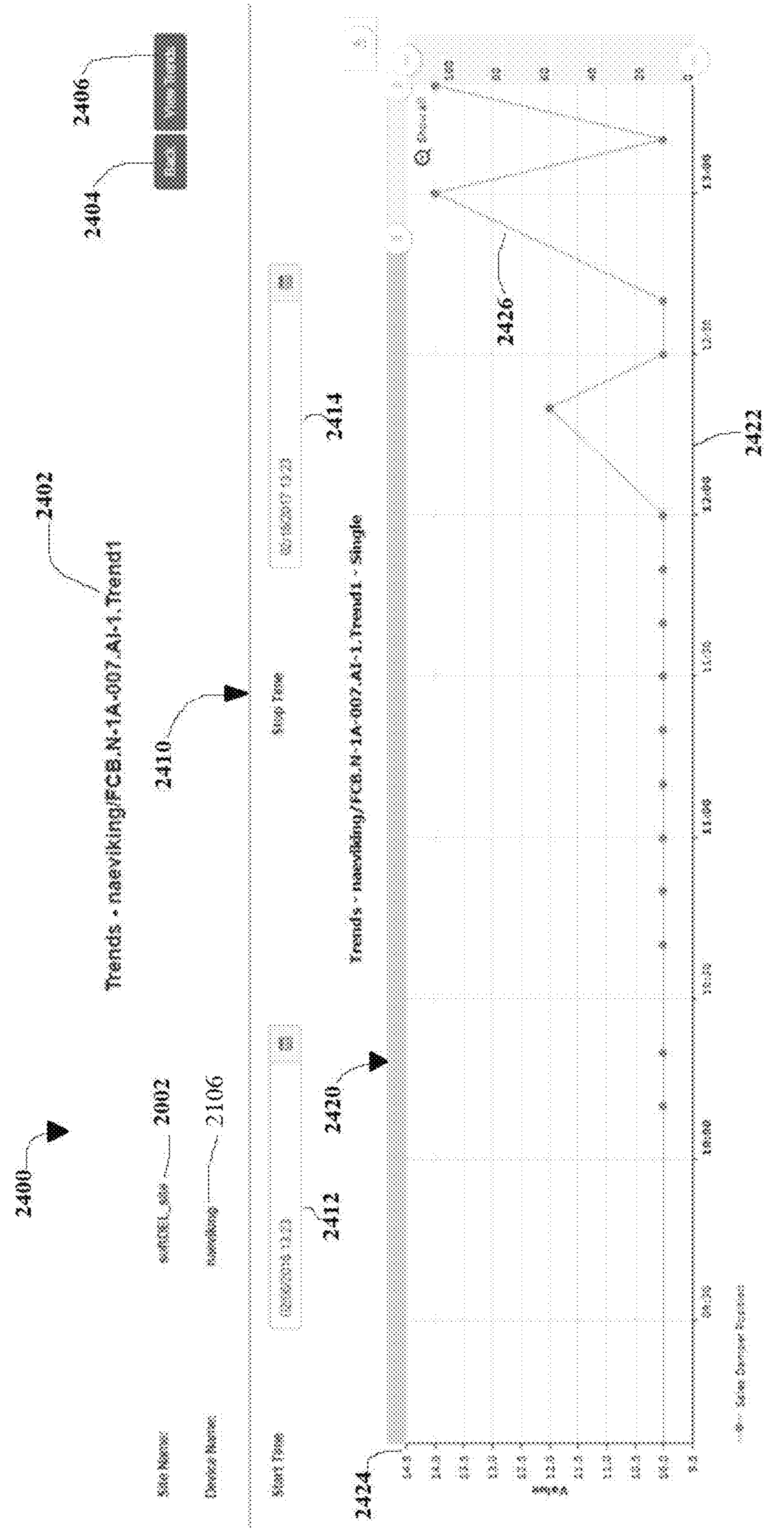
FIG. 24 is an exemplary diagram of a screen showing a trend log graph depicting an illustration of saved trend point, according to an embodiment.

FIG. 24 is an exemplary diagram of a screen that shows a view of a trend log graph depicting the illustration of saved trend values according to an embodiment. A trend log graph screen 2400 can display trend data for an object. The trend log graph can show the object data over time for the selected object. By way of non-limiting example, the object data could be a measured temperature, a heat set point, a humidity measurement, or other device object data. An exemplary trend log graph screen 2400 can have a trend name identifier 2402, a site name identifier 2002, a device name identifier 2106, a back button 2404, a view trends button 2406, and a trend graph box 2410.

The trend name identifier 2402 can show the name of the trend that has been selected to be displayed in the trend graph box 2410. The trend being displayed in the trend graph box can be the trend identified in column 2312 that was selected by clicking the view trends button in the charts column 2318 in the manage trend logs screen 2300. The device name identifier 2106 can show the name of the device for which the object trend data is identified in the trend name identifier. The site name identifier 2002 can show the name of the site where the device named in the device name identifier 2106 is located. The back button 2404 can allow the dealer admin, building manager, or other user to return to the manage trend logs screen 2300. The view trends button 2406 can allow the dealer admin, building manager, or other user to view the selected trend.

The trend graph box 2410 can display data for the selected trend that is identified in the trend name identifier 2402. The trend graph box 2410 can have a start time selection box 2412, a stop time selection box 2414, and a trend graph 2420. The start time selection box 2412 and the stop time selection box can allow the dealer admin, building manager, or other user to select or change the range of time displayed in the trend graph. After the start time and stop time have been set, the view trends button 2406 can be clicked, and the trend graph 2420 can be updated with trend data for the selected range of time. The trend graph 2420 can include indications on a first axis 2422 of the dates and/or times when the displayed object data was collected for various data points. The trend graph 2420 can include indications on a second axis 2424 of the values for the displayed object data. The trend graph 2420 can include a trend line 2426, bar graph, scatter plot, or other means for displaying the data which can include the object value and the time the object value was recorded for multiple object data points.

Figure 25A:
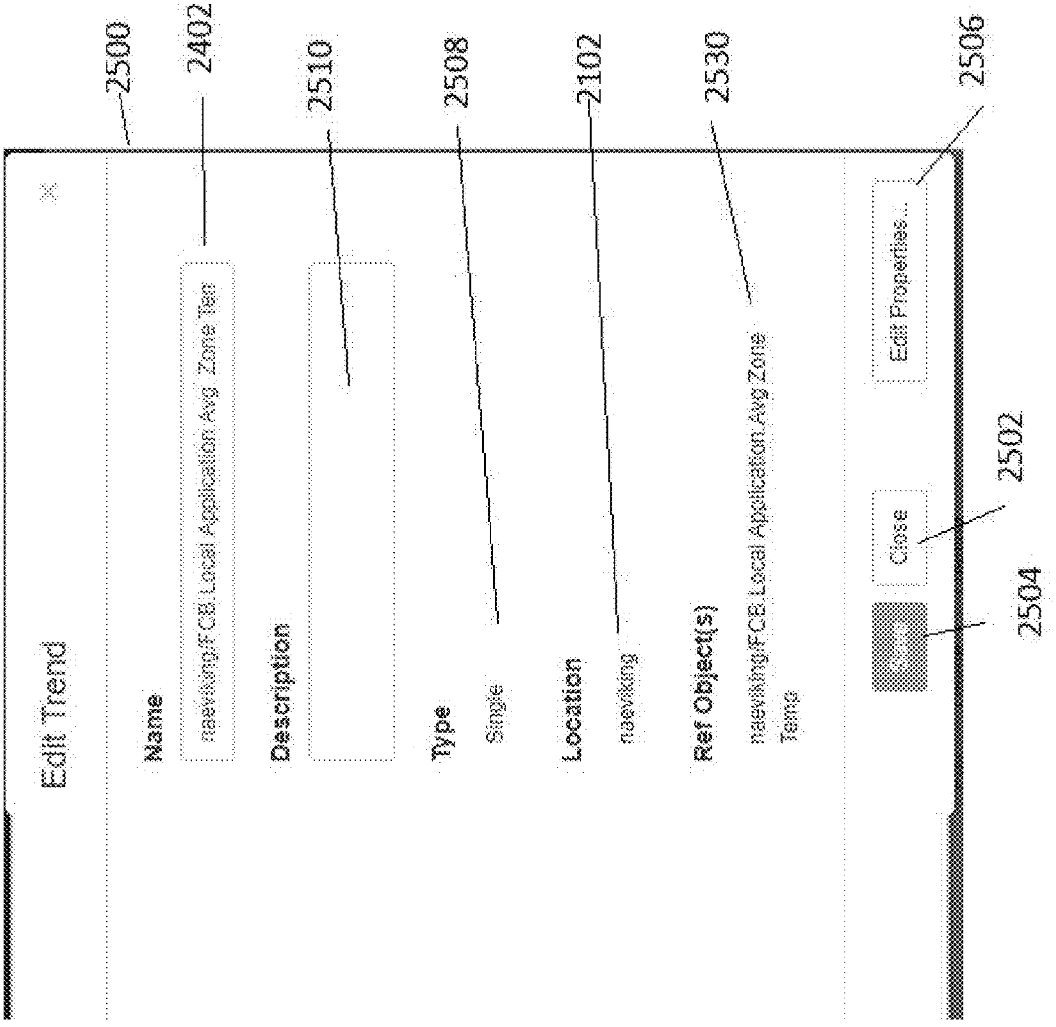
FIG. 25*a* is an exemplary diagram of a screen that can be used to configure a trend log, according to an embodiment.

FIG. 25*a* is an exemplary diagram of a screen that is used to configure a trend log, according to an embodiment. A configure trend log screen 2500 can allow a dealer admin, building manager, or other user to configure a trend log for an object. The configure trend log screen 2500 can be entered by clicking the edit button in the edit column 2320 of the manage trend logs screen 2300. A configure trend log screen 2500 can include a trend name identifier 2402, a location name identifier 2102, a close button 2502, a description (of the trend) edit textbox 2510, a trend type identifier (single or multiple) 2508, and a reference object area 2530. The trend name identifier 2402 can display the name of the trend that can be selected to be configured by clicking the edit button associated with a desired trend object for configuration on the manage trend logs screen 2300. The location name identifier 2102 can identify the name of the location where the object trend will be run and managed. The type identifier 2508 can identify the type of trend, such as, for example, a single type with only one reference object, or a multiple type with more than one reference object to be tracked. The close button 2502 can allow the dealer admin, building manager, or other user to return to the manage trend logs screen 2300. The save button 2504 can allow the dealer admin, building manager or other user to save the configuration and return to the manage trend logs screen 2300. The Edit Properties button 2506 can open up the property configure trend log screen 2550 shown in FIG. 25*b*.

Figure 25B:
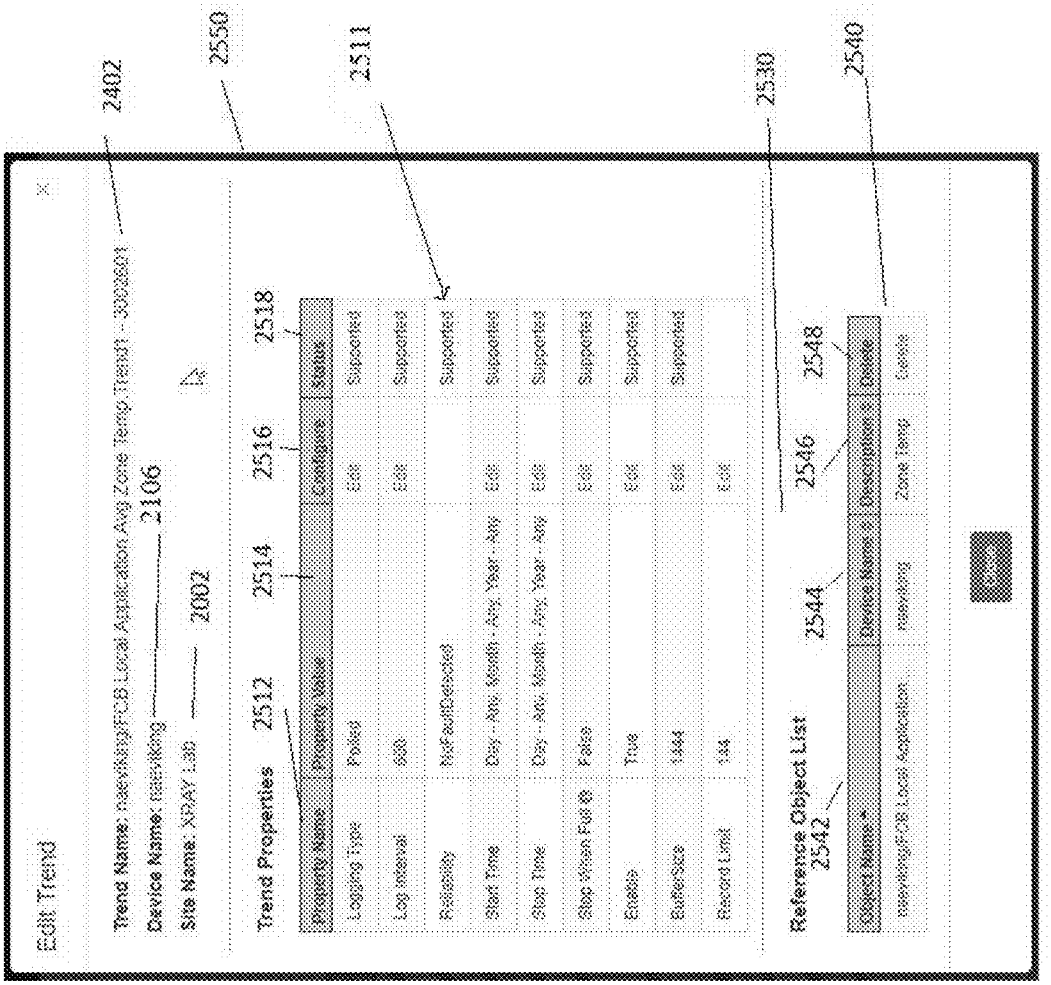
FIG. 25*b* is an exemplary diagram of a property configure trend log screen that is used to configure the properties of a trend log, according to an embodiment.

FIG. 25*b* is an exemplary diagram of a property configure trend log screen that is used to configure the properties of a trend log, according to an embodiment. A property configure trend log screen 2550 can allow a dealer admin, building manager, or other user to configure the trend log properties for a trend log. A property configure trend log screen 2550 can have a trend name identifier 2402, a device name identifier 2106, a site name identifier 2002, a trend properties grid 2511, a reference object area 2530, and a reference object grid 2540. The trend properties grid 2511 can have a property name column 2512, a property value column 2514, a configure column 2516, and/or a status column 2518. The property name column 2512 can include at least one property of the trend to be configured. As examples, these properties can include, but are not limited to, COV (change of value) increment, logging type, log interval, object name, object type, reliability, start time, stop time, stop when full, enable, and/or other properties. The property value column 2514 can include the values associated with the properties named in the property name column 2512. The configure column 2516 can include clickable links that can allow the object property of that row to be edited. The status column 2518 can display status and/or other data of the property in that row.

The reference object area 2530 can display the reference object for which the trend log is being configured, and can display reference objects for which a trend log can be selected to be configured. The reference object area can include a reference object grid 2540. The reference object grid 2540 can include reference object name column 2542, a device name column 2544, a reference objects description column 2546, and a delete reference objects 2548. The reference object name column 2542 can display the name of at least one reference object for which a trend log can be configured. The device name column 2544 can display the name of the device which the reference object displayed in column 2542 is associated with. The reference objects description column 2546 can display a description of the reference object named in column 2542. The delete reference objects column 2548 can include a clickable link that can allow the reference object in that row to be deleted.

FIG. 26*a* is an exemplary diagram of a screen that manages alarms, according to an embodiment. An alarm is a notification of a device object value that has changed to an alarm condition as defined in the alarm configuration. The manage alarm screen 2600 can allow a dealer admin, building manager, or other user to manage alarms that can be associated with reference objects. The manage alarm screen 2600 can have a site name identifier 2002 and allow the selection of other sites in a drop down box, an add alarm button 2602, a search box 2604, and an alarm grid 2610. The site name identifier 2002 can identify the site for which alarms can be managed, and the site name drop down box can allow the selection of other sites. The add alarm button can allow additional alarms objects to be added to the alarm grid 2610, so that alarms can be associated with the additional reference objects and the alarms can be managed. The search box 2604 can allow the alarm grid to be searched by keyword, object name, device name, and/or other data.

The alarm grid 2610 can include a reference object column 2612, a device name column 2614, an event column 2616, an edit alarm column 2618, an alarm name column 2622, an alarm location column 2624, and/or a delete alarm column 2620. The reference object column 2612 can display the reference objects for which alarms can be set and/or managed. The device name column 2614 can display the name of the device for which the reference object in that row is associated. The event column 2616 can include a clickable link that allows the events associated with the object displayed in that row to be displayed. The delete alarm column 2620 can include a clickable link that can allow the alarm associated with the reference object in that row to be deleted. The Alarm Name column 2622 shows the name of the Alarm, and the Alarm Location 2624 specifies the location for the alarm. The location can be algorithmic for alarms that will be run by the site control module, and the location can be intrinsic for alarms that will run intrinsically on the device itself.

Figure 26B:
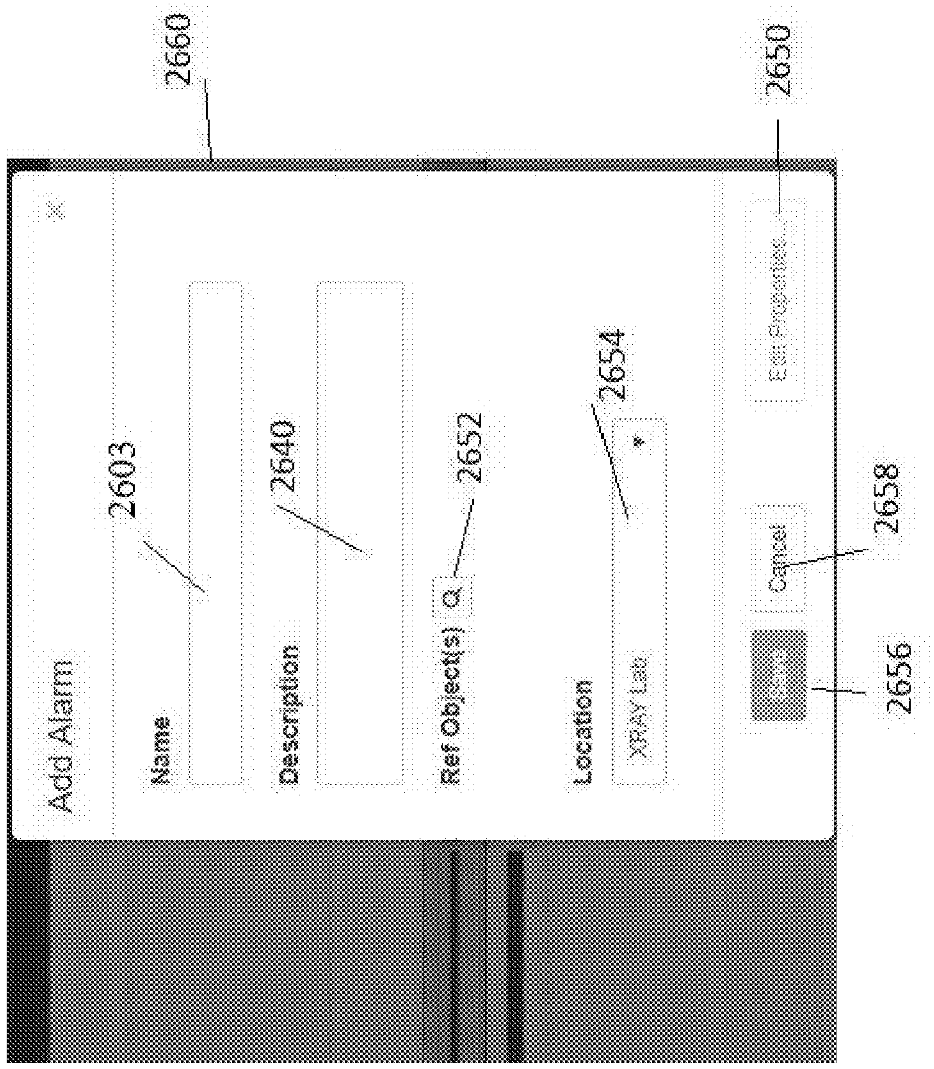
FIG. 26*b* is a view of an add alarm screen, according to an exemplary embodiment.

FIG. 26*b* is an exemplary diagram of an Add Alarm screen, according to an exemplary embodiment. An Add Alarm screen 2660 is displayed when either Add Alarm button 2602 or Edit 2618 is selected. Add Alarm screen 2660 can have an alarm name box 2603, an alarm description box 2640, a reference object selection button 2652, a location drop down box 2654, a save button 2656, a cancel button 2658, and/or an edit properties button 2650. Edit properties button 2650 can display the properties dialog box 2670 and can allow the user to view and update the Alarm properties. Alarm Name entry box 2603 can allow the user to specify a "user friendly" name for the Alarm. Description entry box 2640 can allow the user to specify a longer more detailed description of the alarm. The Ref Object selection icon 2652 can allow the user to select the reference object that will be measured by the alarm. The location drop down box 2654 can allow the user to select the location for the alarm if the device can support the alarm intrinsically. If the device cannot support the alarm, the location can be the site control module. The Save button 2656 can save the configuration to the database and can allow the user to then select edit properties 2650 to further refine the Alarm's configuration. The Cancel button 2658 will close the dialog and return the user to the previous screen without saving the configuration.

Figure 26C:
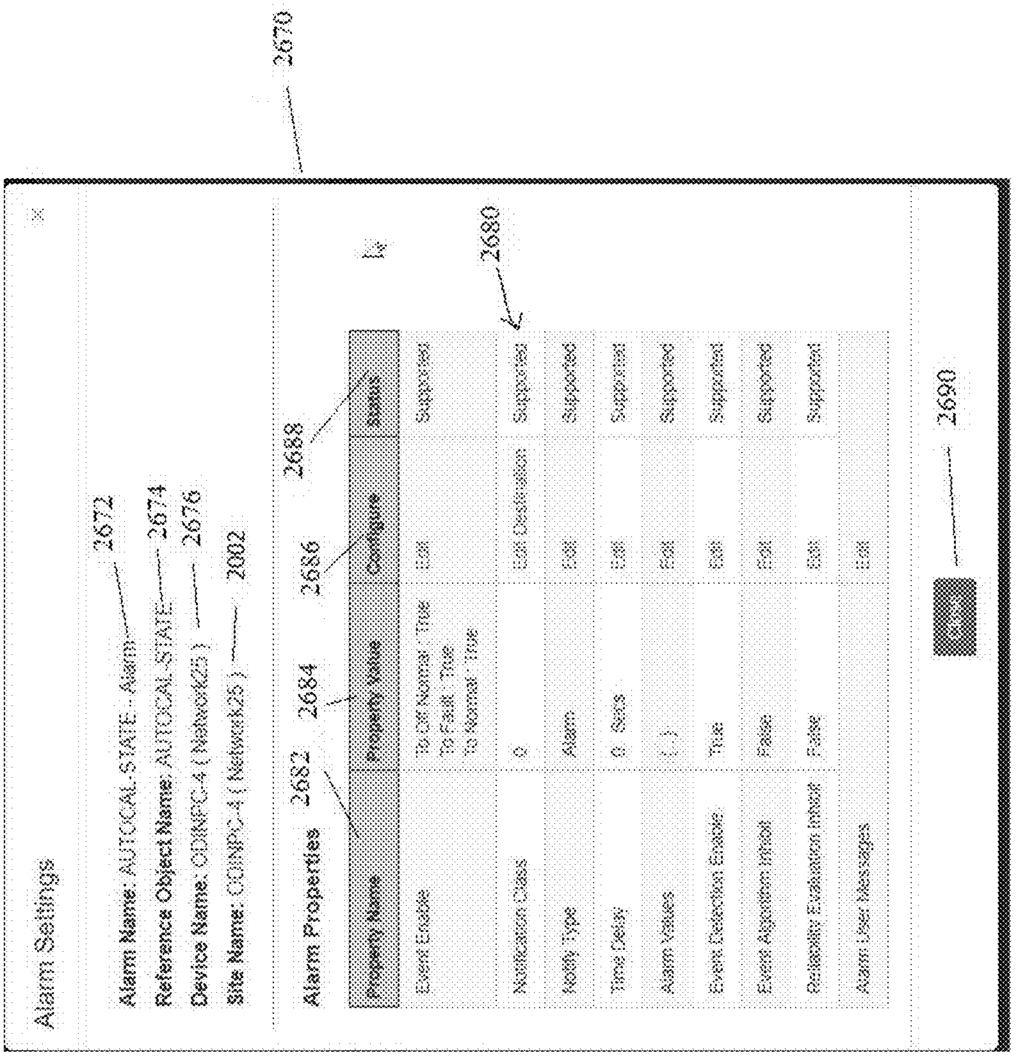
FIG. 26*c* is a view of an alarm settings screen, according to an illustrative embodiment.

FIG. 26*c* is an exemplary diagram of an Alarm Settings screen, according to an illustrative embodiment. Alarm settings screen 2670 can be displayed when the Edit Properties button 2650 is pressed. Alarm settings screen 2670 can have an alarm name identifier 2672, a reference object name identifier 2674, a device name identifier 2676, a site name identifier 2002, and an alarm properties grid 2680. Alarm properties grid 2680 can display the Alarm properties to view and edit. Site Name 2002 can indicate the site the Alarm is set for. Device name identifier 2676 can indicate which device the Alarm is set for. Reference object name identifier 2674 can display the object that is being measured against the alarm configuration. Alarm name 2672 can be a user friendly name for the alarm. An alarm property grid 2680 can have a property name column 2682, a property value column 2684, a configure column 2686, and a status column 2688. Property name column 2682 can show the property name, property value column 2684 can show the values that are set for the property, Configure column 2686 can allow the ability to configure the property with an edit hyperlink, and status column 2688 can show the status of the property, which can include whether the property is fully supported or not. Close Button 2690 can return the user to the previous screen.

Figure 27A:
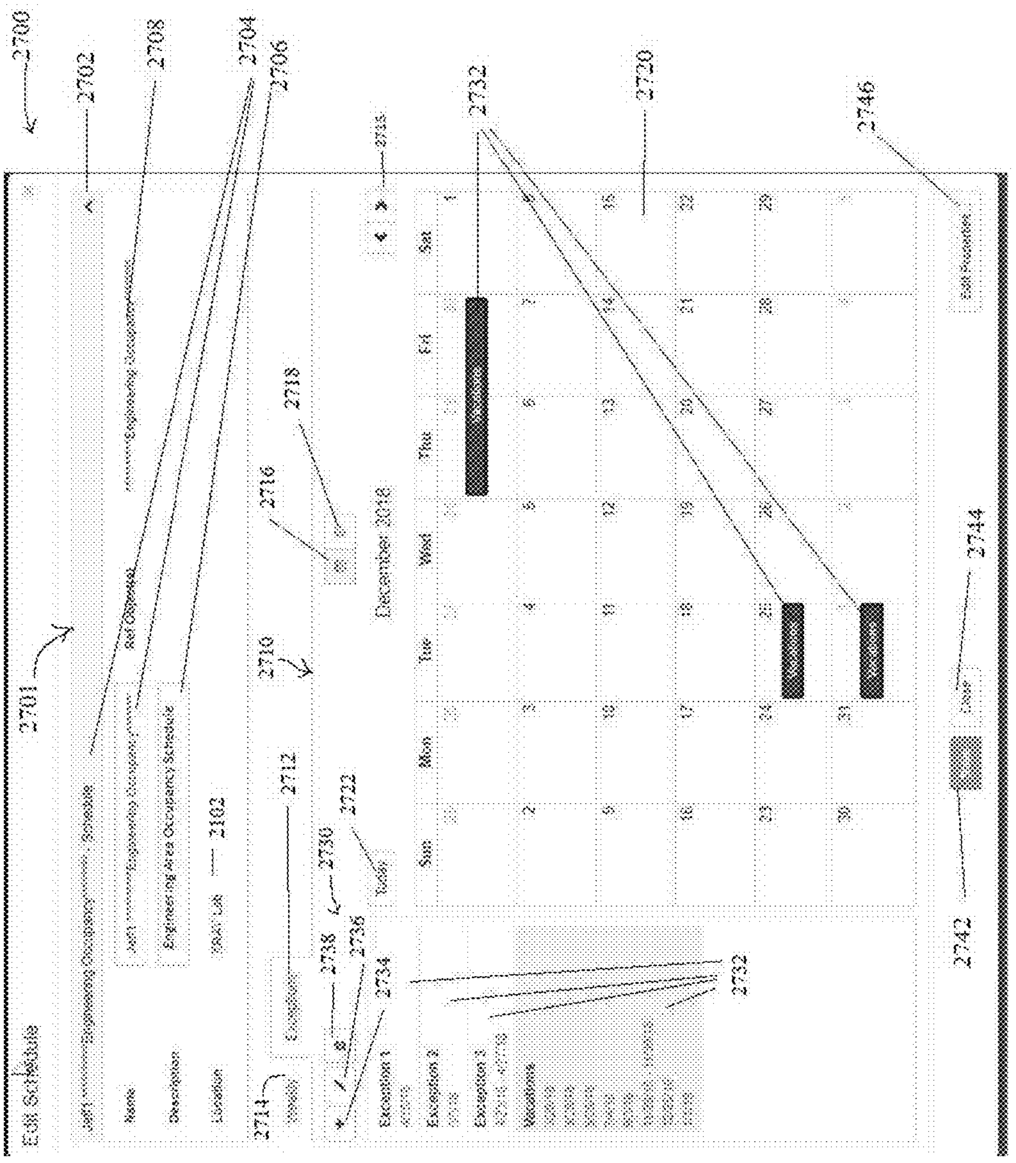
FIG. 27*a* is a view of an exception schedule user interface calendar screen, according to an exemplary embodiment.

FIG. 27*a* is a view of an exception schedule user interface calendar screen, according to an exemplary embodiment. Exception schedules can be created, for example, for holidays, vacations, plant closings, or other exceptions to normal schedules. An exception schedule calendar screen 2700 can have a header area 270, a calendar area 2710, a save button 2740, a close button 2742, and an edit properties button 2746. A header area can have a collapse/expand button 2702, a schedule name identifier 2704, an exception description box 2706, a location name identifier 2102, and/or a reference object identifier 2708. Schedule name identifier 2704 can identify the name of the exception schedule. Description identifier 2706 can provide a description of the exception schedule that can be provided by the user. Location identifier 2102 can display the location where the schedule is run. Reference object identifier 2708 can display the name of the reference object that can be manipulated by the exception schedule. Collapse/expand button 2702 can allow a user to collapse or expand the header area 2701.

Calendar area 2710 can have an exception tab 2712 and a weekly tab 2714. Exception tab 2712 can display a calendar button 2716, an exception event button 2718, a calendar grid 2720, a today button 2722, month selection buttons 2724, and/or exception area 2730. A user can select a month to be displayed on the calendar grid 2720 by using the month selection buttons 2724, and a user can select todays date by pressing the today button 2722. Event button 2718 can display the daily event screen shown in FIG. 27*b*. Exception area 2730 can display existing exception events 2732, and can have a create new exception event button 2734, an edit exception event button 2736, and a delete exception event button 2738. A user can click the new exception event button 2734 to create a new exception event. After a new exception event has been created, it can be displayed in the exception event area 2730 and the exception event can be seen on the calendar grid 2720 for the date range specified. A user can click into each event to show the daily event screen shown in FIG. 27*b*. A user can edit existing exception events by clicking the existing exception event to highlight the existing exception event and clicking the edit exception event button 2736 to edit the highlighted exception event 2732. A user can delete a highlighted exception event by clicking the delete exception event button 2738.

Figure 27B:
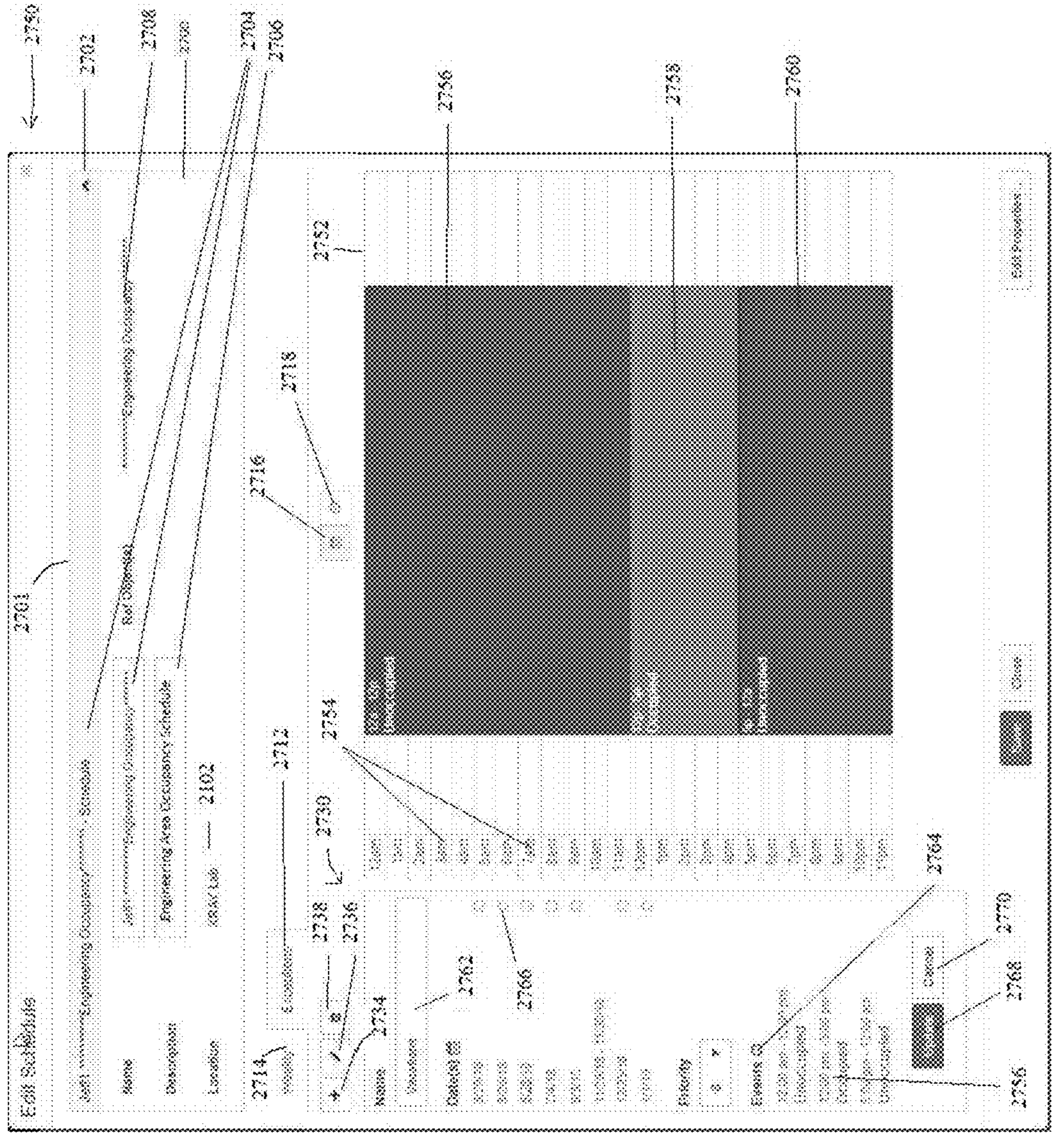
FIG. 27*b* is a view of a daily exception event screen, according to an exemplary embodiment.

FIG. 27*b* is a view of a daily exception event screen, according to an exemplary embodiment. A user can switch between the calendar view and the daily view by using the calendar button 2716 and the exception event button 2718. A daily exception event screen 2750 can have a daily chart area 2752 and an exception area 2730. The daily chart area can have a time value area 2754 and an exception event 2756. An exception event 2756 can show the time range and the value being sent to the reference object 2708. For example, exception event 2756 can have an occupied period 2758 with an occupied value between 12 pm and 5 pm, and exception event 2756 can have an unoccupied period 2760 with an unoccupied value between 5 pm and 12 am. The time of day for the periods of the exception event can be shown in the time value area 2754, and a user can click the time value area 2754 to create a new exception event period. When a user clicks the time value area 2754 to create a new exception event period, the edit exception event dialog box shown if FIG. 27*c* can pop up.

Figure 27C:
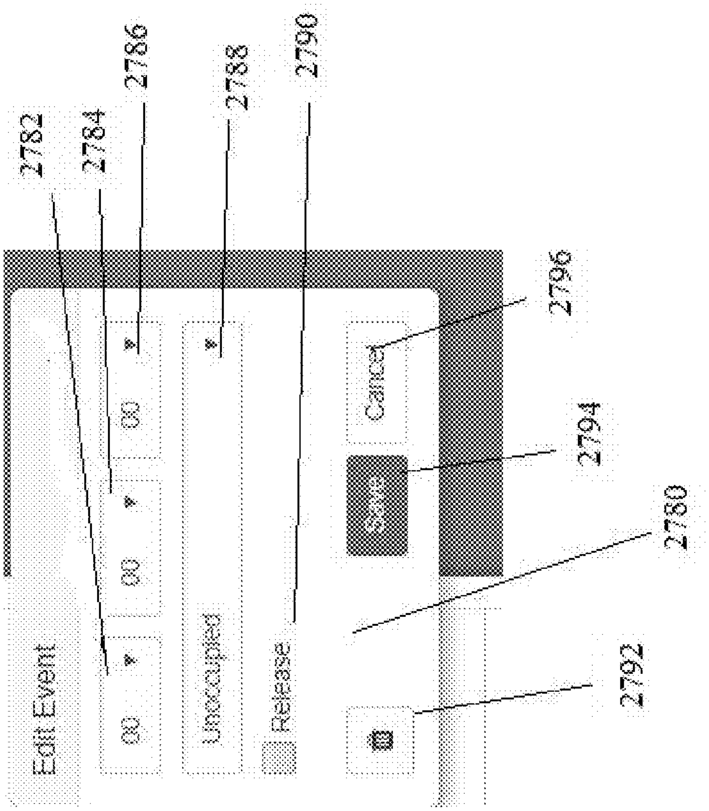
FIG. 27*c* is a view of an edit exception event dialog box, according to an exemplary embodiment.

A user can create new exception events by clicking the create new exception events button 2734. A user can then provide a name for the new exception event in the exception event name box 2762 and can select the time value for the exception event by clicking in the time icon 2764. The user can then select the time values for the new exception event by clicking in the time value area 2754. When the user clicks in the time value area to create an exception event period for the new exception event, the edit exception event dialog box can pop up, as shown in FIG. 27*c*. A user can click the reoccurrence icon 2766 to make an exception event reoccurring. The exception event area 2730 can also have an update button 2768 and a cancel button 2770. The user can click the update button 2768 to save the new or edited exception event, or can click the cancel button to cancel the new exception event or edits to the exception event.

FIG. 27*c* is a view of an edit exception event dialog box, according to an exemplary embodiment. An edit exception event dialog box 2780 can have time selection boxes that can include hour selection box 2782, minute selection box 2784, and/or second selection box 2786 that can allow a user to select the hour, minute, and second for the exception event. Edit exception event dialog box 2780 can have a value selection box 2788 that can allow the user to select the value to be set to the reference object for the time selected in the time selection boxes 2782, 2784, and 2786. The user can use the release button 2790 to send a release value to reset the object. The user can delete the exception event using the delete button 2792, save the exception event using the save button 2794, or cancel out of the update using the cancel button 2796.

IX. Data Storage and Management

Figure 28:
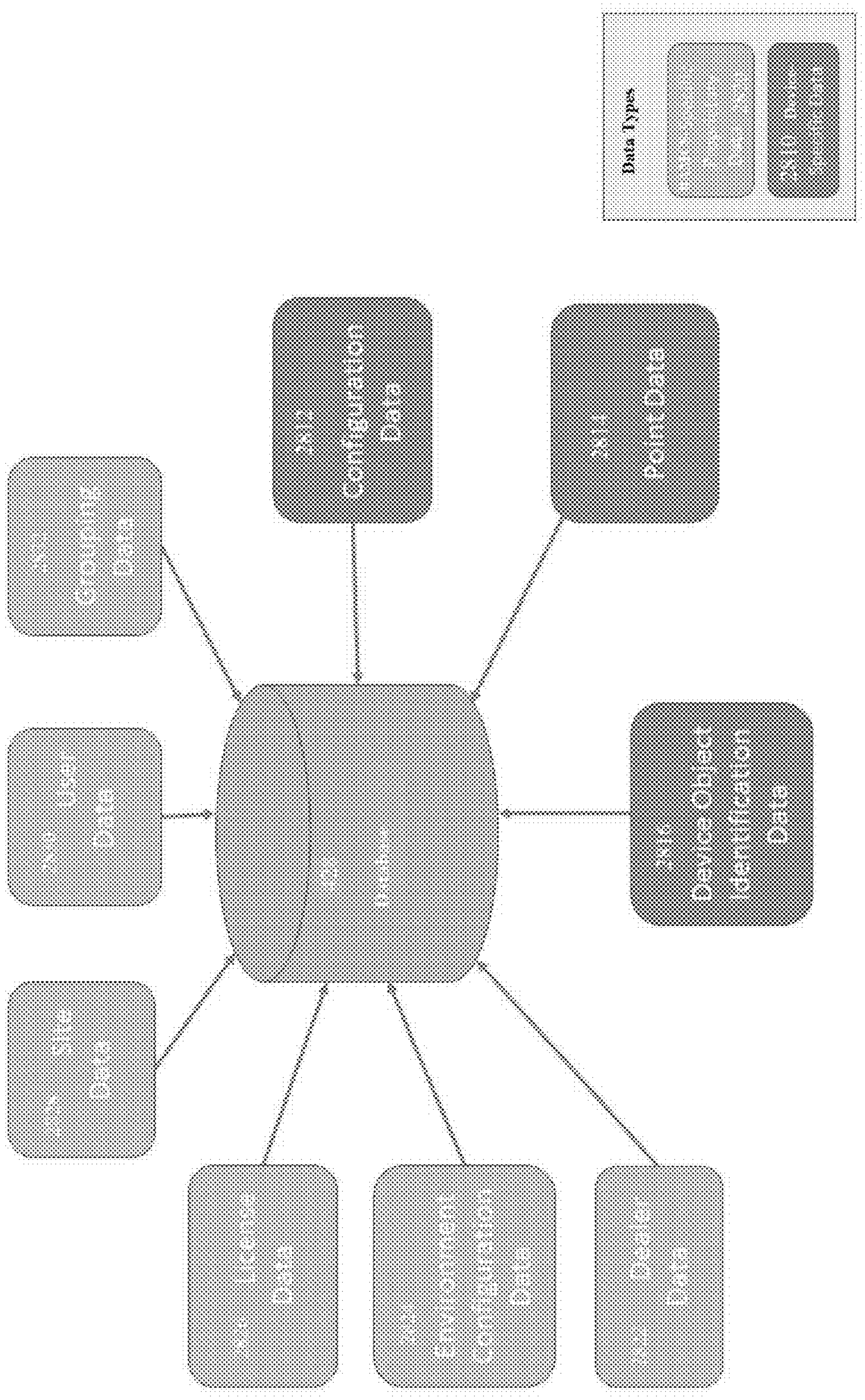
FIG. 28 is a schematic diagram of an exemplary data management structure, according to an embodiment.

FIG. 28 is a schematic diagram of an exemplary data management structure, according to an embodiment. The BAMCS can store, manage, and retrieve multiple types of data in databases 204 and/or 428. This data can be divided into device-specific data 2810 and BAMCS-specific data 2820. The device specific data 2820 can include device configuration data 2812, device point data 2814, and device object identification data 2816. The BAMCS-specific data 2820 can include dealer data 2822, environment configuration data 2824, license data 2826, site data 2828, user data 2830, and grouping data 2834.

Figure 29:
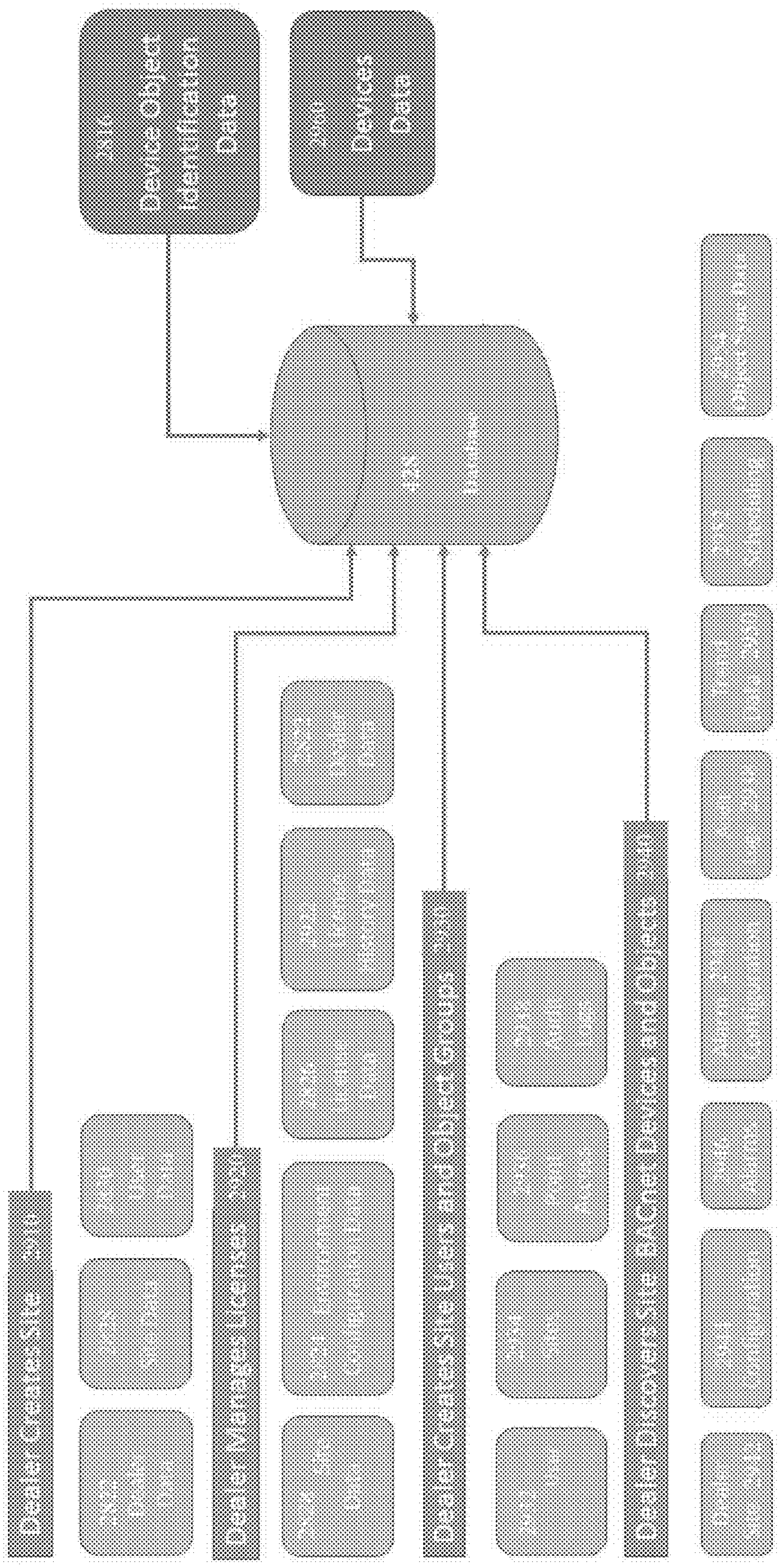
FIG. 29 is a schematic diagram of an exemplary data management structure for the BAMCS-specific data, according to an exemplary embodiment.

FIG. 29 is a schematic diagram of an exemplary data management structure for the BAMCS-specific data, according to an exemplary embodiment. When a dealer performs a site creation 2910, database 428 can associate various data with the site creation 2910, including dealer data 2822, site data 2828, and user data 2830. When a dealer performs license management 2920, the database 428 can associate various data with the license management 2920, including site data 2828, environmental configuration data 2824, license data 2826, license history data 2922, and dealer data 2822. When a dealer performs site user and object group creation 2930, the database can associate various data with the site user and object group creation 2930, including the user 2932, sites 2934, point access 2936, and audit logs 2938. When a dealer performs site BACnet devices and objects discovery 2940, the database can associate various data with the site BACnet devices and objects discovery 2940, including dealer site 2942, configuration 2944, alarms 2946, alarm configuration 2948, audit logs 2938, trend data 2950, and scheduling 2952. This data is specific proprietary data, including the dealer data 2822, site data 2822, user data 2830, environmental configuration data 2824, license data 2826, license history data 2922, the user 2932, sites 2934, point access 2936, audit logs 2938, dealer site 2942, configuration 2944, alarms 2946, alarm configuration 2948, trend data 2950, scheduling 2952, and object synchronization data 2954. The database can also maintain Device object identification data 2816 and devices data 2960. This device object identification data 2816 and devices data 2960 can be specific to BACnet, X10, NEST, and/or other protocols.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments of the apparatus and method of the present invention, what has been described herein is merely illustrative of the application of the principles of the present invention. For example, as used herein the terms "process" and/or "processor" should be taken broadly to include a variety of electronic hardware and/or software based functions and components (and can alternatively be termed functional "modules" or "elements"). Moreover, a depicted process or processor can be combined with other processes and/or processors or divided into various sub-processes or processors. Such sub-processes and/or sub-processors can be variously combined according to embodiments herein. Likewise, it is expressly contemplated that any function, process and/or processor herein can be implemented using electronic hardware, software consisting of a non-transitory computer-readable medium of program instructions, or a combination of hardware and software. Additionally, as used herein various directional and dispositional terms such as "vertical", "horizontal", "up", "down", "bottom", "top", "side", "front", "rear", "left", "right", and the like, are used only as relative conventions and not as absolute directions/dispositions with respect to a fixed coordinate space, such as the acting direction of gravity. Additionally, where the term "substantially" or "approximately" is employed with respect to a given measurement, value or characteristic, it refers to a quantity that is within a normal operating range to achieve desired results, but that includes some variability due to inherent inaccuracy and error within the allowed tolerances of the system (e.g. 1-5 percent). Accordingly, this description is meant to be taken only by way of example, and not to otherwise limit the scope of this invention.

What is claimed is:

1. A system for accessing, monitoring, and controlling building automation components comprising:

a site-based server with a network interface for communicating with a plurality of automation components arranged to communicate using at least one automation protocol, the site-based server having a site database that stores automation component data, and the site-based server having a site data synchronization module;

an application server having a user interface module, the user interface module having interface elements that allow access, monitoring, and control of discrete ones of the automation components through a network, the application server having an application server database that stores the automation component data and the application server having an application server data synchronization module, the application server data synchronization module and the site data synchronization module cooperate to synchronize automation component data in the application server database and the site database, thereby increasing reliability of the data; and a protocol translation module for translating the various automation protocols into a different language and from the different language to the various automation protocols.

2. The system of claim 1, wherein the at least one automation protocol includes BACnet protocol.

3. The system of claim 1, wherein the at least one automation protocol includes NEST API.

4. The system of claim 1, wherein the at least one automation protocol includes Modbus RTU.

5. The system of claim 1, wherein the at least one automation protocol includes LON.

6. The system of claim 1, wherein the at least one automation protocol includes X10.

7. The system of claim 1, wherein the different language is a user interface compatible data set.

8. The system of claim 1, wherein the different language is a second automation protocol.

9. The system of claim 1, wherein the network includes a dealer having a subscription arrangement with the user.

10. The system of claim 1, wherein the network includes a back-end server that communicates with the dealer and maintains account information with respect to dealers and users.

11. The system of claim 1, further comprising a discovery module that discovers the devices on the network.

12. The system of claim 1, wherein the application server data synchronization module assigns unique identifiers to the automation component data and object data, and wherein the application server data synchronization module and the site data synchronization module use two-way communication to synchronize the automation component data, the object data, and the unique identifiers in the site database and the application server database.

13. The system of claim 12, wherein the application server receives real-time updates from the site-based server about the components and/or the objects using the synchronized unique identifiers, so that the data being managed in the application server database and the site database is synchronized and current.

14. The system of claim 12, wherein the site-based server further comprises an autonomous runtime module that uses the synchronized data in the site database to control the automation components and maintain functionality when the application server is not connected to the site-based server.

15. The system of claim of 14, wherein the site-based server runs trend logs, schedules, and/or alarms for automation components that do not run trend logs, schedules, and/or alarms for themselves, and continues to run trend logs, schedules, and/or alarms for the automation components when the application server is not connected to the site-based server.

16. The system of 1, wherein running schedules for the automation components further comprises modifying and updating device settings at predetermined intervals even when the application server is not connected to the site-based server.

17. The system of claim 1, wherein the site-based server runs trend logs, schedules, and/or alarms for automation components that do not run trend logs, schedules, and/or alarms for themselves.

18. The system of claim 1, further comprising a plurality of site-based servers, wherein the application server accesses, monitors, and controls multiple sites at the same time.

19. The system of claim 1, wherein the application server can allow multiple users to access the site-based server, and can prevent certain users from changing settings of automation components.

20. The system of claim 1, wherein the communication protocol translation module is a universal translator that is adapted to use multiple platform operating codes to enable the application server to translate one or more languages into the various automation protocols, so that the application server can communicate with the user sites using the translated automation protocols.

21. A system for accessing, monitoring, and controlling building automation components comprising:

a site-based server with a network interface for communicating with a plurality of automation components arranged to communicate via a plurality of automation protocols, the site-based server having a site database that stores automation component data and object data associated with a site, and the site-based server having a site data synchronization module;

an application server having a user interface module, the user interface module having interface elements that allow access, monitoring, and control of discrete ones of the automation components through a network, the application server being configured to receive the automation component data and the object data associated with the site from the site-based server and assign one or more unique identifiers to the automation component data and the object data, the application server having an application server database that stores the received automation component data and object data and the one or more unique identifiers, and the application server having an application server data synchronization module, wherein the application server data synchronization module and the site data synchronization module cooperate to synchronize the automation component data and the object data in the application server database and the site database based upon the one or more unique identifiers, thereby increasing reliability of the data; and a protocol translation module for translating the various automation protocols into a different language and from the different language to the various automation protocols, wherein one or more automation protocols are selected from the list of BACnet, NEST API, Modbus RTU, LON, and X10.

* * * * *